(12) United States Patent
Bullock

(10) Patent No.: US 10,670,287 B2
(45) Date of Patent: Jun. 2, 2020

(54) BUILDING AUTOMATION AND CONTROL SYSTEM MODELING AND REPORTING

(71) Applicant: Cenergistic LLC, Dallas, TX (US)

(72) Inventor: Jack Bullock, Dallas, TX (US)

(73) Assignee: Cenergistic LLC, Dallas, TX (US)

( * ) Notice: Subject to any disclaimer, the term of this patent is extended or adjusted under 35 U.S.C. 154(b) by 369 days.

(21) Appl. No.: 15/592,008

(22) Filed: May 10, 2017

(65) Prior Publication Data

US 2018/0328611 A1 Nov. 15, 2018

(51) Int. Cl.

| | |
|---|---|
| *G06F 11/30* | (2006.01) |
| *F24F 11/30* | (2018.01) |
| *F24F 11/62* | (2018.01) |
| *F24F 11/46* | (2018.01) |
| *G01M 99/00* | (2011.01) |
| *F24F 140/50* | (2018.01) |
| *F24F 11/64* | (2018.01) |
| *F24F 11/58* | (2018.01) |
| *F24F 11/32* | (2018.01) |

(52) U.S. Cl.
CPC .............. *F24F 11/30* (2018.01); *F24F 11/46* (2018.01); *F24F 11/62* (2018.01); *G01M 99/008* (2013.01); *F24F 11/32* (2018.01); *F24F 11/58* (2018.01); *F24F 11/64* (2018.01); *F24F 2140/50* (2018.01)

(58) Field of Classification Search
CPC .. F24F 11/30; F24F 11/62; F24F 11/46; F24F 11/50; F24F 2140/50; F24F 11/64; F24F 11/58; F24F 11/32; G01M 99/008

USPC ......................................................... 702/183
See application file for complete search history.

(56) References Cited

U.S. PATENT DOCUMENTS

2010/0324962 A1* 12/2010 Nesler ................. G01R 21/133
                                                                  705/7.36
2016/0215996 A1* 7/2016 Blair .................... G08B 21/187

OTHER PUBLICATIONS

Honeywell Engineering Manual of Automatic Control for Commercial Buildings, 1997, Honeywell Inc.

* cited by examiner

*Primary Examiner* — Toan M Le
*Assistant Examiner* — Xiuqin Sun
(74) *Attorney, Agent, or Firm* — Schultz & Associates, P.C.

(57) ABSTRACT

Systems and methods for modeling, reporting, controlling and optimizing HVAC systems are provided. A server receives HVAC system data, processes the data and sends the processed data to a client device. The client device receives the processed data and then makes certain choices of analog and digital rules to apply to the data to reach conclusions about certain mechanical states of the system and flow efficiencies. The rule choices are sent to the server. The server analyzes the HVAC system based on the rules and generates a report. The report can be used to optimize the mechanical components of the HVAC system or control them directly in a feedback loop.

26 Claims, 59 Drawing Sheets

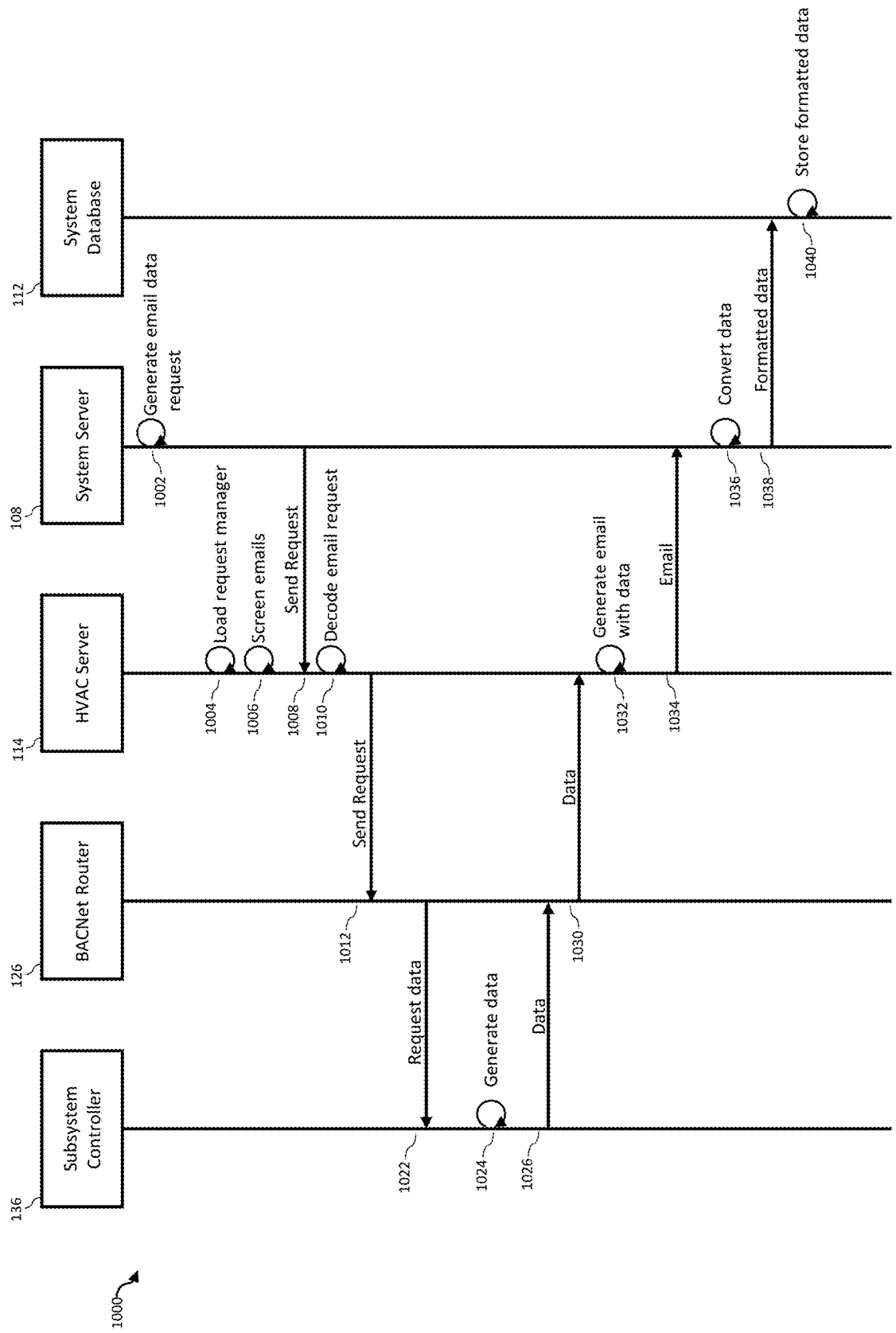
Figure 10 (All Points Log acquisition)

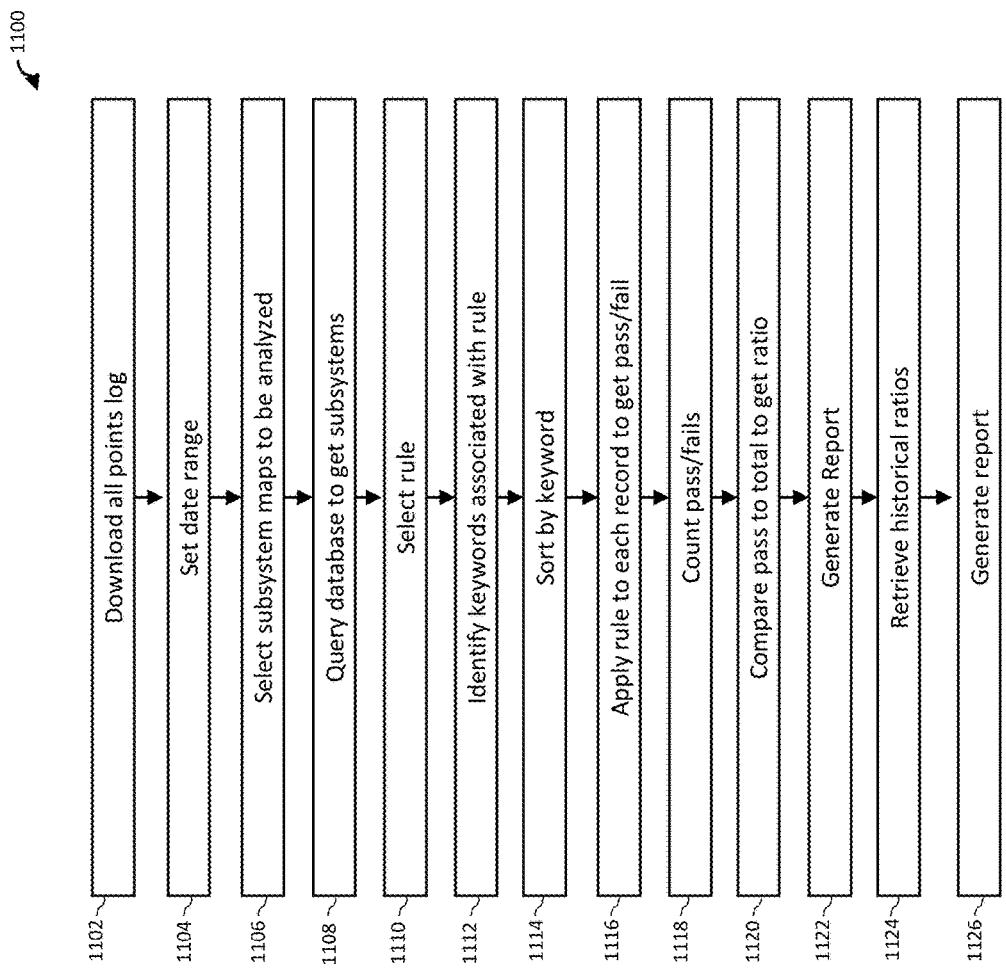
Figure 11 (Phase I)

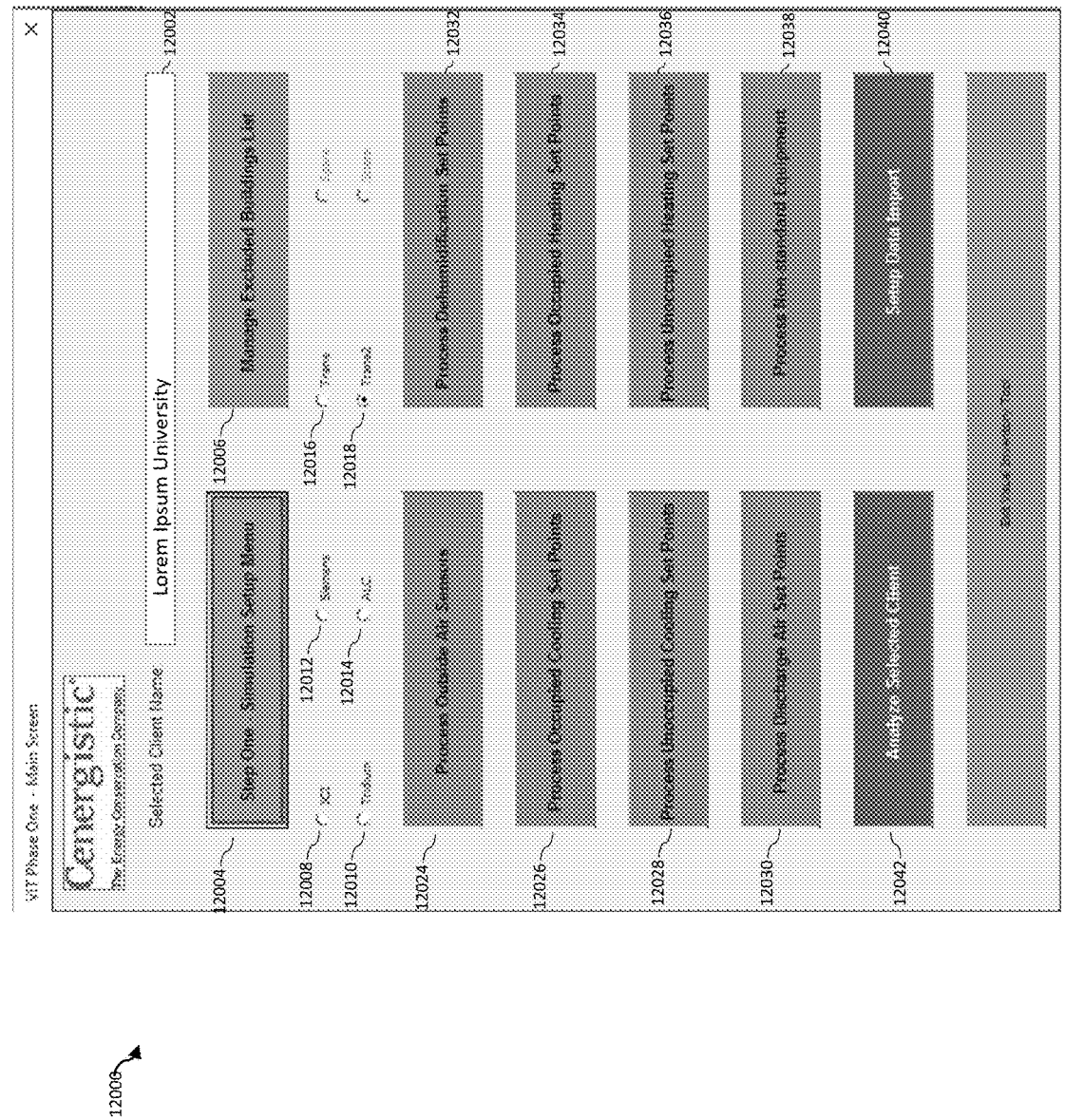
Figure 12A (Phase I Dashboard)

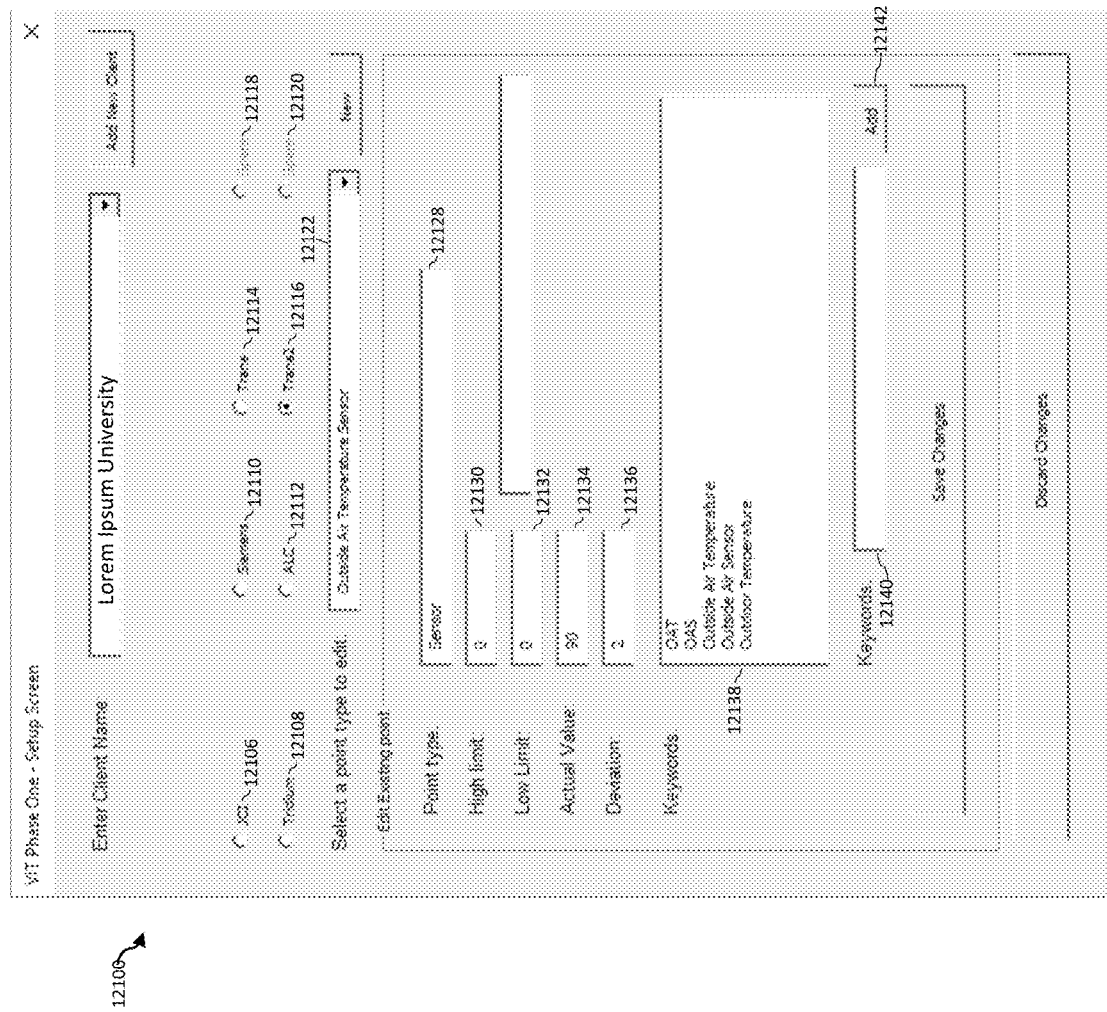
Figure 12B (Phase I Model Control)

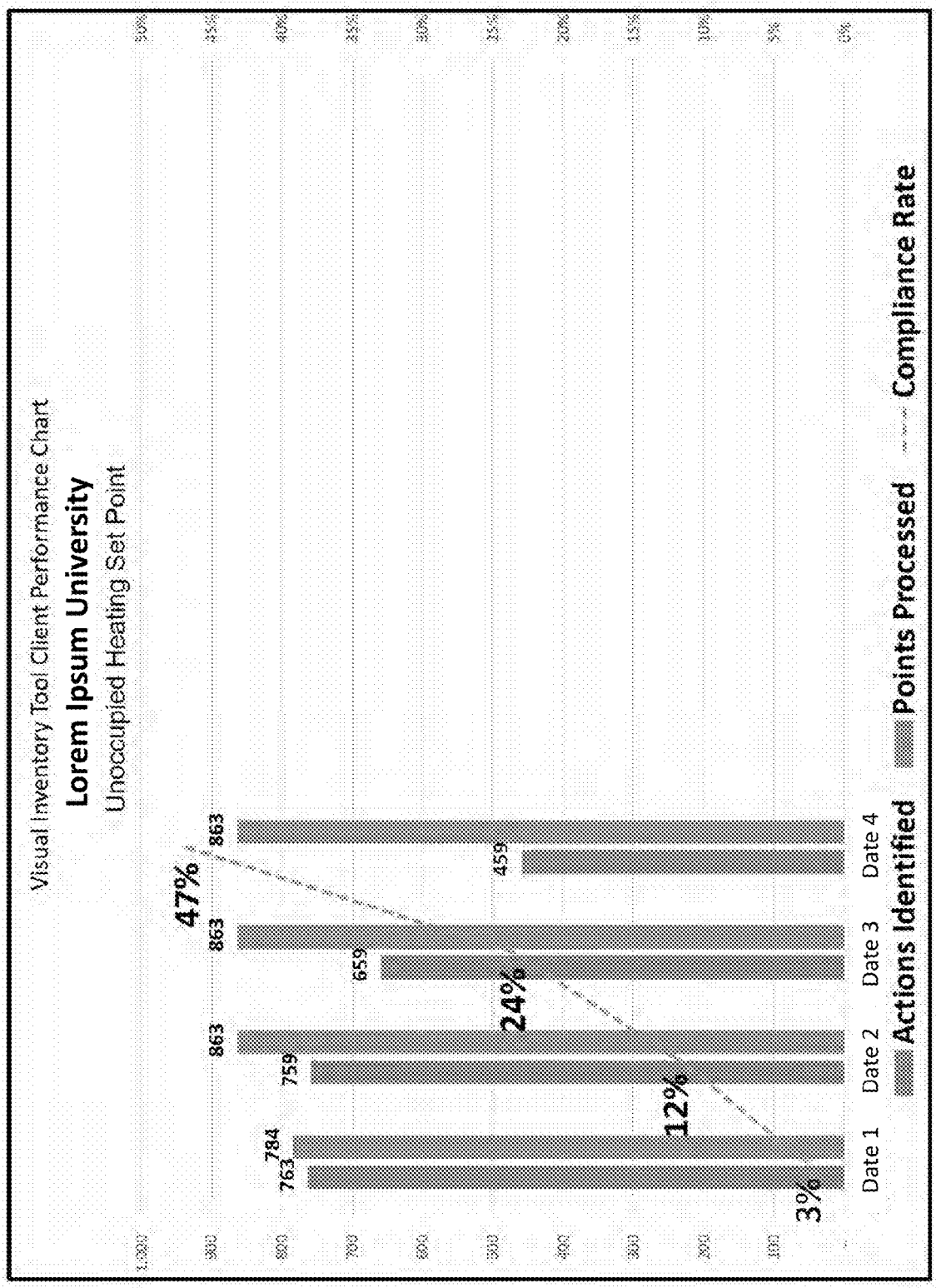
Figure 12C (Phase I Report)

Visual Inventory Tool Energy Management Action Plan (EMAP)

STATUS CODES: W: Working, Re:Rejected, Cs:Completed and Ongoing | Date Reviewed: 7/14/2016

Unoccupied Cooling Set Point Action Items

| Point Address | Point Type | Action Required | ID | Value | Target Value | Target Date | STATUS |
|---|---|---|---|---|---|---|---|
| Smithfield MS/Smithfield MS/ Kitchen Area/Unocc Cooling Setpoint | Unoccupied Cooling Set Point | Change Set Point | Unocc Cooling Setpoint | 80 | 85 | | |
| Smithfield MS/Smithfield MS/ Small Gym Area/Unocc Cooling Setpoint | Unoccupied Cooling Set Point | Change Set Point | Unocc Cooling Setpoint | 85 | 85 | | |
| North Ridge Middle School/North Ridge Middle School/ South Locker Room Area/Unocc Cooling Setpoint | Unoccupied Cooling Set Point | Change Set Point | Unocc Cooling Setpoint | 80 | 85 | | |
| MPEE EltSD/MPEE EltSD/ Kitchen Area/Unocc Cooling Setpoint | Unoccupied Cooling Set Point | Change Set Point | Unocc Cooling Setpoint | 80 | 85 | | |
| John D Spicer ES/John D Spicer ES/ AHU-9S Area/Unocc Cooling Setpoint | Unoccupied Cooling Set Point | Change Set Point | Unocc Cooling Setpoint | 80 | 85 | | |
| Holiday Heights ES/Holiday Heights ES/ South Gym Area/Unocc Cooling Setpoint | Unoccupied Cooling Set Point | Change Set Point | Unocc Cooling Setpoint | 80 | 85 | | |
| HHS ElSD/HHS ElSD/ AHU-3E1 Area/Unocc Cooling Setpoint | Unoccupied Cooling Set Point | Change Set Point | Unocc Cooling Setpoint | 80 | 85 | | |
| HHS ElSD/HHS ElSD/ Rm 218 Daikin Area/Unocc Cooling Setpoint | Unoccupied Cooling Set Point | Change Set Point | Unocc Cooling Setpoint | 75 | 85 | | |
| HHS ElSD/HHS ElSD/ Rm 218 Daikin Area/Unocc Cooling Setpoint | Unoccupied Cooling Set Point | Change Set Point | Unocc Cooling Setpoint | 75 | 85 | | |
| HHS ElSD/HHS ElSD/ Rm 223 Daikin Area/Unocc Cooling Setpoint | Unoccupied Cooling Set Point | Change Set Point | Unocc Cooling Setpoint | 75 | 85 | | |
| HHS ElSD/HHS ElSD/ Rm 214 Daikin Area/Unocc Cooling Setpoint | Unoccupied Cooling Set Point | Change Set Point | Unocc Cooling Setpoint | 75 | 85 | | |
| HHS ElSD/HHS ElSD/ Rm 236A Daikin Area/Unocc Cooling Setpoint | Unoccupied Cooling Set Point | Change Set Point | Unocc Cooling Setpoint | 75 | 85 | | |
| HHS ElSD/HHS ElSD/ Sec Video Rm Daikin Area/Unocc Cooling Setpoint | Unoccupied Cooling Set Point | Change Set Point | Unocc Cooling Setpoint | 75 | 85 | | |
| Foster Village ES/Foster Village ES/ Kitchen Area/Unocc Cooling Setpoint | Unoccupied Cooling Set Point | Change Set Point | Unocc Cooling Setpoint | 80 | 85 | | |
| Adrian ES/Adrian ES/ Multi Zone AHU Area/Unocc Cooling Setpoint | Unoccupied Cooling Set Point | Change Set Point | Unocc Cooling Setpoint | 82 | 85 | | |

Figure 12D (Phase I Report)

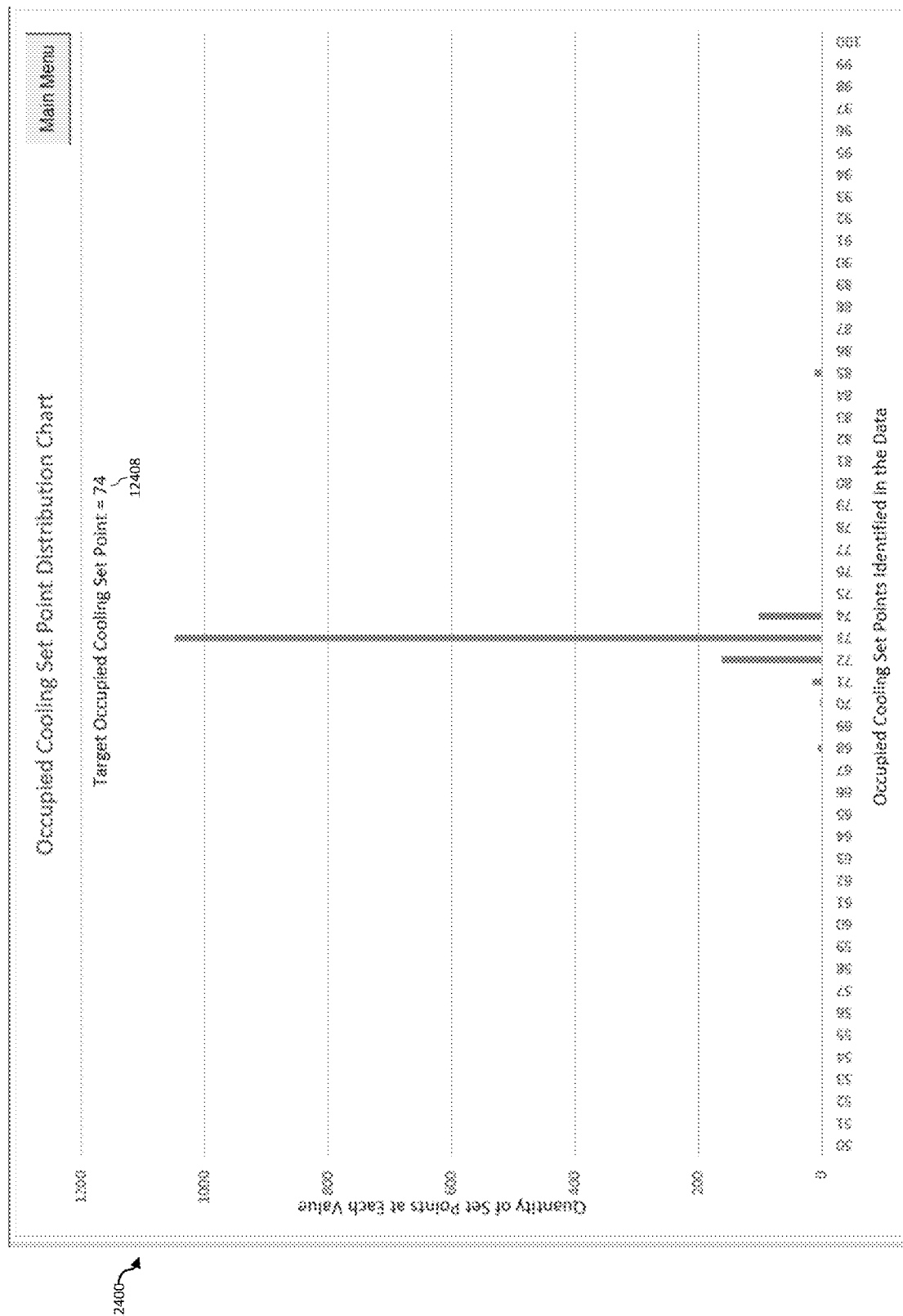
Figure 12E (Phase I Report)

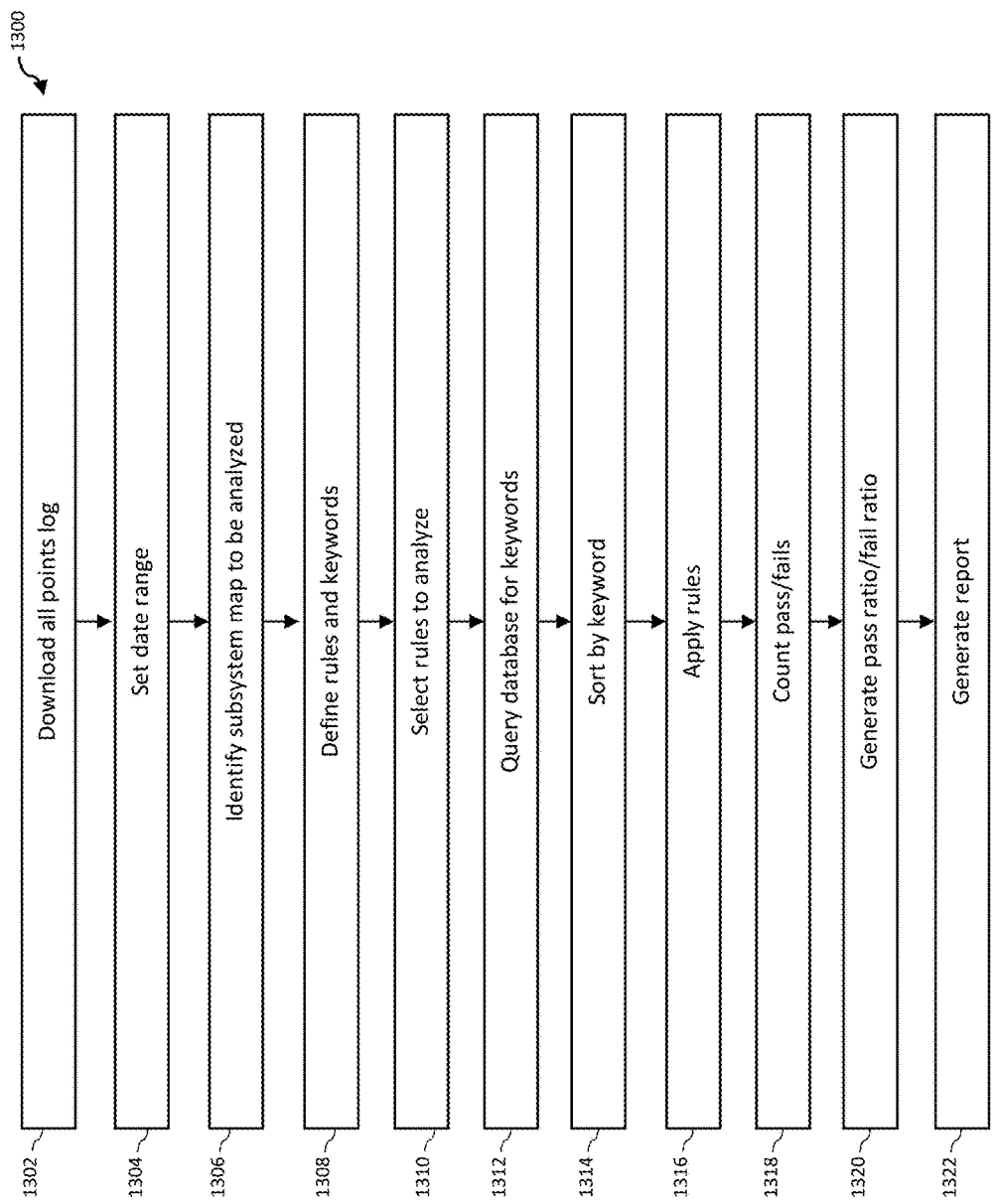
Figure 13 (Phase II)

Figure 14T (Phase II Report)

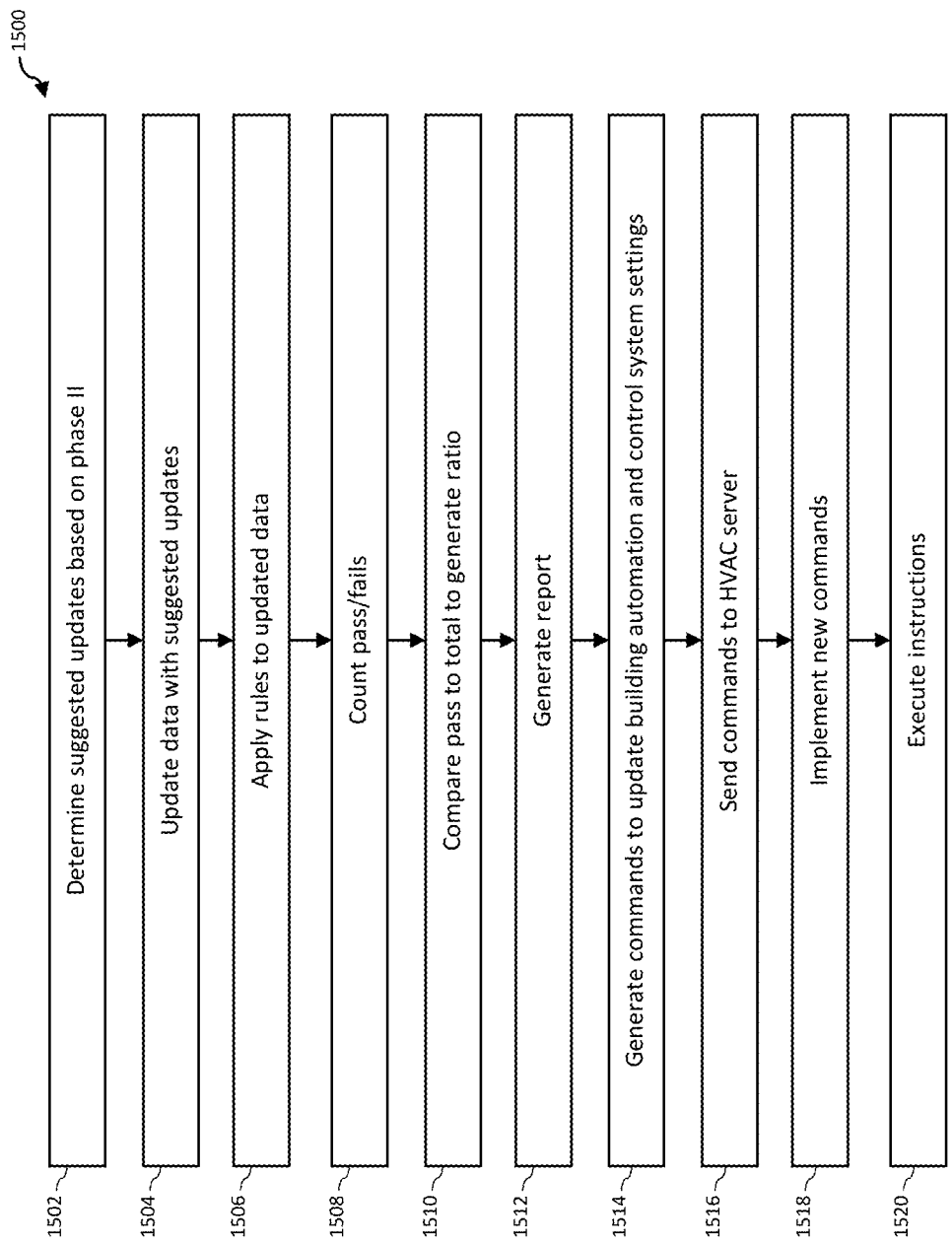
Figure 15 (Phase III)

| | A | B | C | D | E | F | G | H |
|---|---|---|---|---|---|---|---|---|
| 1 | ID | RuleName | RuleType | RuleSystemType | RuleEnable | RuleJan | RuleFeb | RuleMar |
| 2 | 6109 | R-OACFM Sensor = 0 | Analog | Air Handling Unit | True | True | True | True |
| 3 | 6135 | R-No Ventilation Calculated | Analog | Air Handling Unit | TRUE | TRUE | TRUE | TRUE |
| 4 | 6189 | R-AHU RH Setback < 60% | Analog | Air Handling Unit | TRUE | TRUE | TRUE | TRUE |
| 5 | 6190 | R-Air Side Cooling Coil Delta T < 5 - Valve Open | Analog | Air Handling Unit | TRUE | TRUE | TRUE | TRUE |
| 6 | 6207 | R-Act OAD Position < Calc OAD Position - 5 | Analog | Air Handling Unit | TRUE | TRUE | TRUE | TRUE |
| 7 | 6251 | R-Supply Fan Speed 100% Winter | Analog | Air Handling Unit | TRUE | TRUE | TRUE | TRUE |
| 8 | 6262 | R-Duct Static Pressure Set Point Control - High | Analog | Air Handling Unit | TRUE | TRUE | TRUE | TRUE |

Figure 16A (Rules, Row 1, Column 1)

| | A | I | J | K | L | M | N | O | P | Q |
|---|---|---|---|---|---|---|---|---|---|---|
| 1 | ID | RuleApr | RuleMay | RuleJun | RuleJul | RuleAug | RuleSep | RuleOct | RuleNov | RuleDec |
| 2 | 6109 | True | True | True | True | True | True | True | True | True |
| 3 | 6135 | TRUE | TRUE | TRUE | TRUE | TRUE | TRUE | TRUE | TRUE | TRUE |
| 4 | 6189 | TRUE | TRUE | TRUE | TRUE | TRUE | TRUE | TRUE | TRUE | TRUE |
| 5 | 6190 | TRUE | TRUE | TRUE | TRUE | TRUE | TRUE | TRUE | TRUE | TRUE |
| 6 | 6207 | TRUE | TRUE | TRUE | TRUE | TRUE | TRUE | TRUE | TRUE | TRUE |
| 7 | 6251 | FALSE | FALSE | FALSE | FALSE | FALSE | FALSE | TRUE | TRUE | TRUE |
| 8 | 6262 | TRUE | TRUE | TRUE | TRUE | TRUE | TRUE | TRUE | TRUE | TRUE |

Figure 16B (Rules, Row 1, Column 2)

| | A | R | S | T | U | V | W |
|---|---|---|---|---|---|---|---|
| | ID | RuleEnableVar | RuleEnableType | RuleEnableValue | RulePrimaryVar | RulePrimaryType | RulePrimaryValue |
| 1 | 6109 | fOACFMSelected | True | False | fOACFMValue | True | 0 |
| 2 | 6135 | fOADamperSelected | TRUE | TRUE | fOAPercentage | TRUE | 100 |
| 3 | | | | | | | |
| 4 | 6189 | fAHURHSetBack | TRUE | FALSE | fUnoccRHSetPoint | TRUE | 60 |
| 5 | 6190 | R-Cooling Valve Open > 80 | FALSE | FALSE | fCoolDeltaT | TRUE | 0 |
| 6 | 6207 | fOADamperSelected | TRUE | TRUE | fOADamperPosition | TRUE | 100 |
| 7 | 6251 | fSupplyFanVSDSelected | TRUE | TRUE | fSupplyFanVSDValue | TRUE | 100 |
| 8 | 6252 | fDADuctPressureSelected | TRUE | TRUE | R-Duct Static Pressure Set Point Control - High | FALSE | FALSE |

Figure 16C (Rules, Row 1, Column 3)

| | A | X | Y | Z | AA | AB | AC |
|---|---|---|---|---|---|---|---|
| | ID | RuleSecondVar | RuleSecondType | RuleSecondValue | RuleThirdVar | RuleThirdType | RuleThirdValue |
| 1 | 6109 | 50 | False | 50 | 0 | False | 0 |
| 2 | 6135 | 0 | FALSE | 0 | 0 | FALSE | 0 |
| 3 | 6189 | 60 | FALSE | 60 | 0 | FALSE | 0 |
| 4 | 6190 | 5 | FALSE | 5 | 0 | FALSE | 0 |
| 5 | 6207 | fOAPercentage | TRUE | 100 | 5 | FALSE | 5 |
| 6 | 6251 | 100 | FALSE | 100 | 0 | FALSE | 0 |
| 7 | 6262 | R-Duct Static Pressure Set Point Control - Low | FALSE | FALSE | R-Duct Static Pressure Set Point Control - Low | FALSE | FALSE |

Figure 16D (Rules, Row 1, Column 4)

| | A | AD | AE | AF |
|---|---|---|---|---|
| | ID | RuleOperatorOne | RuleOperatorTwo | RuleMessageEnable |
| 1 | | | | |
| 2 | 6109 | <= | + | False |
| 3 | 6135 | = | + | FALSE |
| 4 | 6189 | < | + | TRUE |
| 5 | 6190 | < | + | TRUE |
| 6 | 6207 | < | - | FALSE |
| 7 | 6251 | = | + | TRUE |
| 8 | 6262 | OR | OR | TRUE |

Figure 16E (Rules, Row 1, Column 5)

| # | A ID | AG RuleMessage |
|---|------|----------------|
| 1 |      |                |
| 2 | 6109 |                |
| 3 | 6135 | The unoccupied relative humidity set point is set to below 60% RH. This is outside our phase one standards. Consult the Cenergistic Technical Team Tools Engineering Manual for information on how to configure the unoccupied relative humidity set point. Special note: Relative humidity sensors are extremely unreliable over time. They drift and need calibration. Any building that has space relative humidity sensors in each room that override the set back of a common air handling units should be investigated to see if one of the relative humidity sensors is keeping the air handling unit on during unoccupied periods. We have also seen the hysteresis (setpoint that the unoccupied relative humidity override is again disabled) set improperly. The system should go into unoccupied relative humidity override at 60% RH and com out of the override mode at 55% RH. Any building that is found to be running during unoccupied periods and has space relative humidity sensors should have them checked once a year. |
| 4 | 6189 |                |
| 5 | 6190 | The air side delta t on the preheat coil is less than 5 degrees with the control valve more than 80% open to full flow through the coil. This is can be caused by either a dirty coil or the control valve is not opening properly to allow flow through the coil. Consult the Cenergistic Technical Team Tools Manual to get the control valve testing procedure. Inspect the coil and complete the test procedure. |
| 6 | 6207 |                |
| 7 | 6251 | During the winter months the delta T of the heating system is wider than the delta T of the cooling system so the system doesn't need to move as much air to condition the space. A general rule of thumb is that it only takes 50% of the required air flow in the winter to heat the space. Slowing down the speed of the fan in the winter takes advantage of the affinity fan laws. The net effect of slowing the fan down is if you can slow it down 20% you will save 49% of the fan energy. A great place to start is to slow systems down in the winter 20%. This reduces the fan energy almost in half having an impact on the comfort of the space. This can be done by either seasonally setting the speed of the fan at the VSD or by seasonally adjusting the duct static pressure set point. Another option that works is to go to the VSD in the winter and set the maximum speed of the VSD to 80%. This insures that the system will not run faster than 80% in the winter months. Consult the Cenergistic Technical Team Tool Manual for information on how to take advantage of the affinity fan laws. Another good reference is the Honeywell Gray Manual Handbook on Page 263. It covers air handling unit air flow applications. |
| 8 | 6262 | The air handling system is not able to build up the desired duct static pressure in the main duct of the unit. Generally the duct static pressure is installed to measure the duct pressure at 2/3rd's of the longest duct run. At this point the system is only reading 0.24" WC of pressure when the set point is set to 1.5" WC. This is an indication of either a duct leak, sensor issue or a problem with the variable air volume terminal units this system serves. This is a major failure of this air handling unit. It should be investigated by your maintenance staff in conjunction with Cenergistic Consultant Support. Consult the Cenergistic Technical Team Tools Engineering Manual and/or Honeywell Gray Manual for support in diagnosing and resolving this issue. |

Figure 16F (Rules, Row 1, Column 6)

| | A | AH | AI | AJ | AK | AL | AM | AN | AO | AP |
|---|---|---|---|---|---|---|---|---|---|---|
| 1 | ID | RuleMessageType | RuleWeight | Detail | ProposedValue | UserCreated | DateCreated | UserModified | DateModified | Push |
| 2 | 6109 | | | False | | jbullock | 1/3/2017 | jbullock | 02-15-2017 | True |
| 3 | 6135 | Engineering | 5 | FALSE | | jbullock | 1/3/2017 | jbullock | 1/3/2017 | True |
| 4 | 6189 | Maintenance | 5 | FALSE | | jbullock | 1/3/2017 | jbullock | 1/3/2017 | True |
| 5 | 6190 | Engineering | 5 | FALSE | | jbullock | 1/3/2017 | jbullock | 1/3/2017 | True |
| 6 | 6207 | Engineering | 5 | FALSE | | jbullock | 1/3/2017 | jbullock | 1/3/2017 | True |
| 7 | 6251 | Engineering | 5 | FALSE | | jbullock | 1/3/2017 | jbullock | 1/3/2017 | True |
| 8 | 6262 | Maintenance | 5 | FALSE | | jbullock | 1/3/2017 | jbullock | 1/3/2017 | True |

Figure 16G (Rules, Row 1, Column 7)

| | A | B | C | D | E | F | G | H |
|---|---|---|---|---|---|---|---|---|
| 1 | ID | RuleName | RuleType | RuleSystemType | RuleEnable | RuleJan | RuleFeb | RuleMar |
| 9 | 6279 | R-OAT > 65 | Analog | Air Handling Unit | TRUE | TRUE | TRUE | TRUE |
| 10 | 6286 | R-OAD and RAD are not tracking | Analog | Air Handling Unit | TRUE | TRUE | TRUE | TRUE |
| 11 | 6295 | R-DAT Control Issue Low | Analog | Air Handling Unit | TRUE | TRUE | TRUE | TRUE |
| 12 | 6101 | R-MAD Open > Min - OAT > 65 | Digital | Air Handling Unit | TRUE | TRUE | TRUE | TRUE |
| 13 | 6108 | R-Cooling Booster Pump 24 Hour Operation | Digital | Air Handling Unit | TRUE | TRUE | TRUE | TRUE |
| 14 | 6116 | R-Building CO2 Sensor Reading Issue | Digital | Air Handling Unit | TRUE | TRUE | TRUE | TRUE |
| 15 | 6118 | R-Average Space Temp Sensor Not Reading Normal | Digital | Air Handling Unit | TRUE | TRUE | TRUE | TRUE |

Figure 16H (Rules, Row 2, Column 1)

| | A | I | J | K | L | M | N | O | P | Q |
|---|---|---|---|---|---|---|---|---|---|---|
| 1 | ID | RuleApr | RuleMay | RuleJun | RuleJul | RuleAug | RuleSep | RuleOct | RuleNov | RuleDec |
| 9 | 6279 | TRUE | TRUE | TRUE | TRUE | TRUE | TRUE | TRUE | TRUE | TRUE |
| 10 | 6286 | TRUE | TRUE | TRUE | TRUE | TRUE | TRUE | TRUE | TRUE | TRUE |
| 11 | 6295 | TRUE | TRUE | TRUE | TRUE | TRUE | TRUE | TRUE | TRUE | TRUE |
| 12 | 6101 | TRUE | TRUE | TRUE | TRUE | TRUE | TRUE | TRUE | TRUE | TRUE |
| 13 | 6108 | TRUE | TRUE | TRUE | TRUE | TRUE | TRUE | TRUE | TRUE | TRUE |
| 14 | 6116 | TRUE | TRUE | TRUE | TRUE | TRUE | TRUE | TRUE | TRUE | TRUE |
| 15 | 6118 | TRUE | TRUE | TRUE | TRUE | TRUE | TRUE | TRUE | TRUE | TRUE |

Figure 16I (Rules, Row 2, Column 2)

| | A | R | S | T | U | V | W |
|---|---|---|---|---|---|---|---|
| 1 | ID | RuleEnableVar | RuleEnableType | RuleEnableValue | RulePrimaryVar | RulePrimaryType | RulePrimaryValue |
| 9 | 6279 | fOATSelected | TRUE | TRUE | fOATReading | TRUE | 71 |
| 10 | 6286 | fRelDamperSelected | TRUE | FALSE | fOADamperPosition | TRUE | 100 |
| 11 | 6295 | fDATControlSelected | TRUE | TRUE | fDATSensorValue | TRUE | 63.26 |
| 12 | 6101 | fOADamperSelected | TRUE | TRUE | R-MAD Position > MAD Minimum | FALSE | TRUE |
| 13 | 6108 | fCoolBoosterChecked | TRUE | FALSE | fCoolingPump24 | TRUE | FALSE |
| 14 | 6116 | fBldgCO2Selected | TRUE | FALSE | R-Building CO2 Sensor Reading High | FALSE | FALSE |
| 15 | 6118 | fSPTAverage | TRUE | FALSE | R-Average Space Sensor Reading High | FALSE | FALSE |

Figure 16J (Rules, Row 2, Column 3)

| | A | X | Y | Z | AA | AB | AC |
|---|---|---|---|---|---|---|---|
| 1 | ID | RuleSecondVar | RuleSecondType | RuleSecondValue | RuleThirdVar | RuleThirdType | RuleThirdValue |
| 9 | 6279 | 65 | FALSE | 65 | 0 | FALSE | 0 |
| 10 | 6286 | fRelDamperPosition | TRUE | 100 | 0 | FALSE | 0 |
| 11 | 6295 | fDATControlSetPoint | TRUE | 55 | 5 | FALSE | 5 |
| 12 | 6101 | R-OAT > 65 | FALSE | TRUE | R-OAT > 65 | FALSE | TRUE |
| 13 | 6108 | fCoolingPump24 | TRUE | FALSE | fCoolingPump24 | TRUE | FALSE |
| 14 | 6116 | R-Building CO2 Sensor Reading Low | FALSE | FALSE | R-Building CO2 Sensor Reading Low | FALSE | FALSE |
| 15 | 6118 | R-Average Space Sensor Reading Low | FALSE | FALSE | R-Average Space Sensor Reading Low | FALSE | FALSE |

Figure 16K (Rules, Row 2, Column 4)

| | A | AD | AE | AF |
|---|---|---|---|---|
| 1 | ID | RuleOperatorOne | RuleOperatorTwo | RuleMessageEnable |
| 9 | 6279 | > | + | FALSE |
| 10 | 6286 | <> | + | TRUE |
| 11 | 6295 | < | - | FALSE |
| 12 | 6101 | AND | AND | TRUE |
| 13 | 6108 | AND | AND | TRUE |
| 14 | 6116 | OR | OR | TRUE |
| 15 | 6118 | OR | OR | TRUE |

Figure 16L (Rules, Row 2, Column 5)

| # | A ID | RuleMessage |
|---|---|---|
| 1 | | |
| 9 | 6279 | The outside air and relief air damper positions are not tracking. Generally on most systems the outside air and relief air dampers move at the same rate. As the outside air damper opens to bring in more outside air the relief damper opens to allow more air to leave the building. Check to see if one or both of the dampers is fixed to a value on the EMS system. If so release the output and verify correct operation. Consult the Cenergistic Technical Team Tools Manual for information on the proper control of economizers. Additional information on this topic can be found in the Honeywell Gray Manual on page 209 titled "Ventilation Control Processes". |
| 10 | 6286 | |
| 11 | 6295 | The outside air damper is open to more than the scheduled minimum position with the outside air temperature above 65 degrees. The only time we want the outside air damper open to more than the minimum position is when we can use the outside air to cool or if the space CO2 is above the space CO2 set point. Check both the CO2 level in the space, return and mixed air for the system to make sure that one of the CO2 sensors is not out of calibration. If you find that one of those sensors is causing the problem then consult with the owner to get the sensor calibrated or replaced. Also check the CO2 set point to insure that it is set to 1,100 PPM. The CO2 set point should be set to 750 PPM above the ambient CO2 level for the location of the client. In most cases the ambient CO2 level will be around 450 PPM. 750 + 450 = 1,100 PPM. If it is not the CO2 sensors or set points then check the economizer OAT lockout. It may be set too high for the client's location. Consult the Cenergistic Technical Team Tools Manual for a list of economizer OAT lockouts for most large cities in the US. |
| 12 | 6101 | |
| 13 | 6108 | The Cooling Coil has an inline Booster Pump installed. It is operating 24 hours a day. Investigate what controls when the booster pump operates. If the pump is controlled it may turn on when the preheat control valve opens to a minimum value. In most cases the booster pump is small so they just leave them running 24 hours a day. The Booster Pump only needs to operate when the coil is being used. Investigate the option to seasonally enable the pump if it is not controlled by EMS. |
| 14 | 6116 | The Building CO2 Sensor is reading a value that is not normal for this type of air handling unit. The sensor needs to be calibrated by a maintenance technician. If the sensor cannot be calibrated then the sensor should be replaced |
| 15 | 6118 | The Average Space Temperature Value is reading a value that is not normal. The Space Temperature Sensors that are included in the average value need to be checked by a maintenance technician. If the sensor that is causing the problem cannot be calibrated then the sensor should be replaced |

Figure 16M (Rules, Row 2, Column 6)

| | A | AH | AI | AJ | AK | AL | AM | AN | AO | AP |
|---|---|---|---|---|---|---|---|---|---|---|
| 1 | ID | RuleMessageType | RuleWeight | Detail | ProposedValue | UserCreated | DateCreated | UserModified | DateModified | Push |
| 9 | 6279 | Engineering | 5 | FALSE | | jbullock | 1/3/2017 | jbullock | 1/3/2017 | True |
| 10 | 6286 | Engineering | 5 | FALSE | | jbullock | 1/3/2017 | jbullock | 1/3/2017 | True |
| 11 | 6295 | Maintenance | 5 | FALSE | | jbullock | 1/3/2017 | jbullock | 1/3/2017 | True |
| 12 | 6101 | Engineering | 5 | FALSE | | jbullock | 1/3/2017 | jbullock | 1/3/2017 | True |
| 13 | 6108 | Engineering | 5 | FALSE | | jbullock | 1/3/2017 | jbullock | 1/3/2017 | True |
| 14 | 6116 | Maintenance | 5 | FALSE | | jbullock | 1/3/2017 | jbullock | 1/3/2017 | True |
| 15 | 6118 | Maintenance | 5 | FALSE | | jbullock | 1/3/2017 | jbullock | 1/3/2017 | True |

Figure 16N (Rules, Row 2, Column 7)

| | A | B | C | D | E | F | G | H |
|---|---|---|---|---|---|---|---|---|
| 1 | ID | RuleName | RuleType | RuleSystemType | RuleEnable | RuleJan | RuleFeb | RuleMar |
| 16 | 6144 | R-Minimum Outside Air Only | Digital | Air Handling Unit | TRUE | TRUE | TRUE | TRUE |
| 17 | 6163 | R-DAT Fixed Set Point - Reset Option | Digital | Air Handling Unit | TRUE | TRUE | TRUE | TRUE |
| 18 | 6206 | R-Average Space RH Sensor Reading Issue | Digital | Air Handling Unit | True | True | True | True |
| 19 | 6237 | R-Building Static Sensor Issue | Digital | Air Handling Unit | TRUE | TRUE | TRUE | TRUE |
| 20 | 6248 | R-Heating Booster Pump 24 Hour Operation | Digital | Air Handling Unit | TRUE | TRUE | TRUE | TRUE |
| 21 | 6280 | R-SPT Control - No Reset | Digital | Air Handling Unit | TRUE | TRUE | TRUE | TRUE |

Figure 16O (Rules, Row 3, Column 1)

| | A<br>ID | I<br>RuleApr | J<br>RuleMay | K<br>RuleJun | L<br>RuleJul | M<br>RuleAug | N<br>RuleSep | O<br>RuleOct | P<br>RuleNov | Q<br>RuleDec |
|---|---|---|---|---|---|---|---|---|---|---|
| 1 | | | | | | | | | | |
| 16 | 6144 | TRUE | TRUE | TRUE | TRUE | TRUE | TRUE | TRUE | TRUE | TRUE |
| 17 | 6163 | TRUE | TRUE | TRUE | TRUE | TRUE | TRUE | TRUE | TRUE | TRUE |
| 18 | 6206 | True | True | True | True | True | True | True | True | True |
| 19 | 6237 | TRUE | TRUE | TRUE | TRUE | TRUE | TRUE | TRUE | TRUE | TRUE |
| 20 | 6248 | TRUE | TRUE | TRUE | TRUE | TRUE | TRUE | TRUE | TRUE | TRUE |
| 21 | 6280 | TRUE | TRUE | TRUE | TRUE | TRUE | TRUE | TRUE | TRUE | TRUE |

Figure 16P (Rules, Row 3, Column 2)

| A<br>ID | R<br>RuleEnableVar | S<br>RuleEnableType | T<br>RuleEnableValue | U<br>RulePrimaryVar | V<br>RulePrimaryType | W<br>RulePrimaryValue |
|---|---|---|---|---|---|---|
| 16 6144 | fMinOASelected | TRUE | FALSE | R-OAD - 0% Open | FALSE | FALSE |
| 17 6163 | fDATControlSelected | TRUE | TRUE | fDATControlSelected | TRUE | TRUE |
| 18 6206 | fSPRHAverageSelected | True | True | R-Average Space RH Sensor High | False | False |
| 19 6237 | fBldgStaticSelected | TRUE | FALSE | R-Building Static Sensor Reading High | FALSE | FALSE |
| 20 6248 | fHeatBoosterChecked | TRUE | FALSE | fHeatingPump24 | TRUE | FALSE |
| 21 6280 | fSpaceControlChecked | TRUE | FALSE | fTrue | TRUE | TRUE |

Figure 16Q (Rules, Row 3, Column 3)

| A | X | Y | Z | AA | AB | AC |
|---|---|---|---|----|----|----|
| ID | RuleSecondVar | RuleSecondType | RuleSecondValue | RuleThirdVar | RuleThirdType | RuleThirdValue |
| 16 6144 | fSupplyFanStatus | TRUE | TRUE | fSupplyFanStatus | TRUE | TRUE |
| 17 6163 | fDATResetSelected | TRUE | FALSE | fDATResetSelected | TRUE | FALSE |
| 18 6206 | R-Average Space RH Sensor Low | False | False | R-Average Space RH Sensor Low | False | False |
| 19 6237 | R-Building Static Sensor Reading Low | FALSE | FALSE | R-Building Static Sensor Reading Low | FALSE | FALSE |
| 20 6248 | fHeatingPump24 | TRUE | FALSE | fHeatingPump24 | TRUE | FALSE |
| 21 6280 | fSpaceDATResetControlChecked | TRUE | FALSE | fTrue | TRUE | TRUE |

Figure 16R (Rules, Row 3, Column 4)

| A | AD | AE | AF |
|---|---|---|---|
| ID | RuleOperatorOne | RuleOperatorTwo | RuleMessageEnable |
| 16  6144 | AND | AND | TRUE |
| 17  6163 | NOT | NOT | TRUE |
| 18  6206 | OR | OR | True |
| 19  6237 | OR | OR | TRUE |
| 20  6248 | AND | AND | TRUE |
| 21  6280 | NOT | AND | TRUE |
Figure 16S (Rules, Row 3, Column 5)

| A ID | AG RuleMessage |
|---|---|
| 16 / 6144 | The fixed minimum outside air damper control option is being used on this air handling unit. Investigate the option of enabling the system to economize when the outside air conditions are appropriate. Consult the Cenergistic Technical Team Tools Manual or Honeywell's Gray Manual for details on the configuration of a dry bulb economizer. |
| 17 / 6163 | This system is using a fixed discharge temperature set point. Investigate if the system has the option to do discharge air reset from zonal load or return air temperature and enabled it. If the system doesn't have DAT reset as an option then use a seasonal discharge air reset strategy. Consult the Cenergistic's Technical Team Tools Engineering Manual for information on how to implement a seasonal discharge air reset program. |
| 18 / 6206 | The Average Space Relative Humidity Value is reading a value that is not normal. The Space Temperature Sensors that are included in the average value need to be checked by a maintenance technician. If the sensor that is causing the problem cannot be calibrated then the sensor should be replaced |
| 19 / 6237 | The Building Static Pressure Sensor is reading a value that is not normal for this type of air handling unit. The sensor needs to be calibrated by a maintenance technician. If the sensor cannot be calibrated then the sensor should be replaced |
| 20 / 6248 | The Heating Coil has an inline Booster Pump installed. It is operating 24 hours a day. Investigate what controls when the booster pump operates. If the pump is controlled it may turn on when the preheat control valve opens to a minimum value. In most cases the booster pump is small so they just leave them running 24 hours a day. The Booster Pump only needs to operate when the coil is being used. Investigate the option to seasonally enable the pump if it is not controlled by EMS. |
| 21 / 6280 | The Air Handler is set up for space temperature control. The system directly controls the heating and cooling stages based on a call for cooling or heating from the space. If the air handling unit serves a zone that includes a large volume space this maybe ok. If the air handling unit serves a group of diverse rooms then this may be less than ideal. The two options that you should explore use either a reset to the supply temperature with limits or the return air temperature to control the unit. I would first try to use space reset of the discharge air temperature control method to control the unit. Use the guidance in the Cenergistic Technical Team Tools Manual or the Honeywell Gray Manual to guide the implementation of this recommendation. |

Figure 16T (Rules, Row 3, Column 6)

| | A | AH | AI | AJ | AK | AL | AM | AN | AO | AP |
|---|---|---|---|---|---|---|---|---|---|---|
| 1 | ID | RuleMessageType | RuleWeight | Detail | ProposedValue | UserCreated | DateCreated | UserModified | DateModified | Push |
| 16 | 6144 | Engineering | 5 | FALSE | | jbullock | 1/3/2017 | jbullock | 1/3/2017 | True |
| 17 | 6163 | Engineering | 5 | FALSE | | jbullock | 1/3/2017 | jbullock | 1/3/2017 | True |
| 18 | 6206 | Maintenance | 5 | False | | jbullock | 02-07-2017 | jbullock | 02-07-2017 | True |
| 19 | 6237 | Maintenance | 5 | FALSE | | jbullock | 1/3/2017 | jbullock | 1/3/2017 | True |
| 20 | 6248 | Engineering | 5 | FALSE | | jbullock | 1/3/2017 | jbullock | 1/3/2017 | True |
| 21 | 6280 | Engineering | 5 | FALSE | | jbullock | 1/3/2017 | jbullock | 1/3/2017 | True |

Figure 16U (Rules, Row 3, Column 7)

BUILDING AUTOMATION AND CONTROL SYSTEM MODELING AND REPORTING

FIELD OF THE INVENTION

The present invention relates to the assessment, control, and optimization of operational set points in a HVAC system.

BACKGROUND OF THE INVENTION

Modern heating, ventilation and air conditioning, and lighting systems of large building complexes or campuses are typically controlled by a central server in communication with many individual hardware controllers that execute temperature and other system set points. Such HVAC systems are often composed of several related subsystems such as boilers, chillers, ventilation systems, chilled water systems, lighting systems, plumbing systems, and energy management systems. Each of these subsystems has various sensors and control units that are periodically calibrated. In a similar way, each of these subsystems has filters and other disposable parts that are designed to be periodically repaired or replaced. Because of the complexity of the subsystems, it is difficult to calibrate and maintain them with optimal efficiency. As a result, energy usage of the systems is often inefficient and wasteful.

SUMMARY OF THE INVENTION

Systems and methods for optimizing the energy usage of a HVAC system are provided. In one embodiment, the disclosed system mathematically models the physical components of the HVAC system and then uses actual system data to project a summary report of system efficiency. The mathematical models include a simplified graphical representation of each subsystem which incorporates a set of physical parameters and sensor inputs directly from the mechanical components of the larger HVAC system. The mathematical models and graphical representations are stored as a set of "rules" in a database. When executed, the rules are assembled and system data from the separate subsystem controllers is imported. Once imported, the data is inserted in the mathematical model to arrive at a set of logical conclusions. The set of logical conclusions is mathematically weighted to arrive at specific instructions for efficiency. The instructions include a set of optimized subsystem set points that are fed back to each subsystem to improve operation and increase total efficiency.

In a first phase of analysis, the system checks thermostat set points related to specific subsystems and generates a report.

In a second phase of analysis, the system checks all mechanical set points for all subsystems then generates a report.

In a third phase of the analysis, the system optimizes the set points and sends them to controllers of each subsystem to change operation of the system.

BRIEF DESCRIPTION OF THE DRAWINGS

FIG. 10 is a data flow diagram for retrieving data of a preferred embodiment.

FIG. 11 is a flow chart of a method for a phase I analysis of a preferred embodiment.

FIG. 12A is a user interface of a dashboard for a phase I analysis of a preferred embodiment.

FIG. 12B is a user interface for setting up a phase I analysis of a preferred embodiment.

FIG. 12C is a chart of a report from a phase I analysis of a preferred embodiment.

FIG. 12D is a table of a report from a phase I analysis of a preferred embodiment.

FIG. 12E is a chart of a report from a phase I analysis of a preferred embodiment.

FIG. 13 is a flow chart of a method for a phase II analysis of a preferred embodiment.

FIG. 14O is a user interface of a terminal digital rule tab of a preferred embodiment.

FIG. 14T is a table of a phase II report of a preferred embodiment.

FIG. 15 is a flow chart of a method for a phase III analysis of a preferred embodiment.

FIGS. 16A through 16U is a table of analog and digital rules of a preferred embodiment.

DETAILED DESCRIPTION

The system and methods described are implemented using digital computer systems. In one aspect of the present disclosure, the systems and methods are implemented on a digital computer having a processor for executing the methods embodied within a set of program instructions. The program instructions are stored in an electronic memory and in digital storage media connected to the digital computer. The digital computer has a user interface system including a display device and a keying device for interacting with a user.

Embodiments of the present invention and its advantages are best understood by referring to the Figures provided. Each of the devices that form the systems described include a processor and memory where the memory includes instructions that, when executed by the processor, cause the devices to perform the steps of the methods described.

Figure 1:
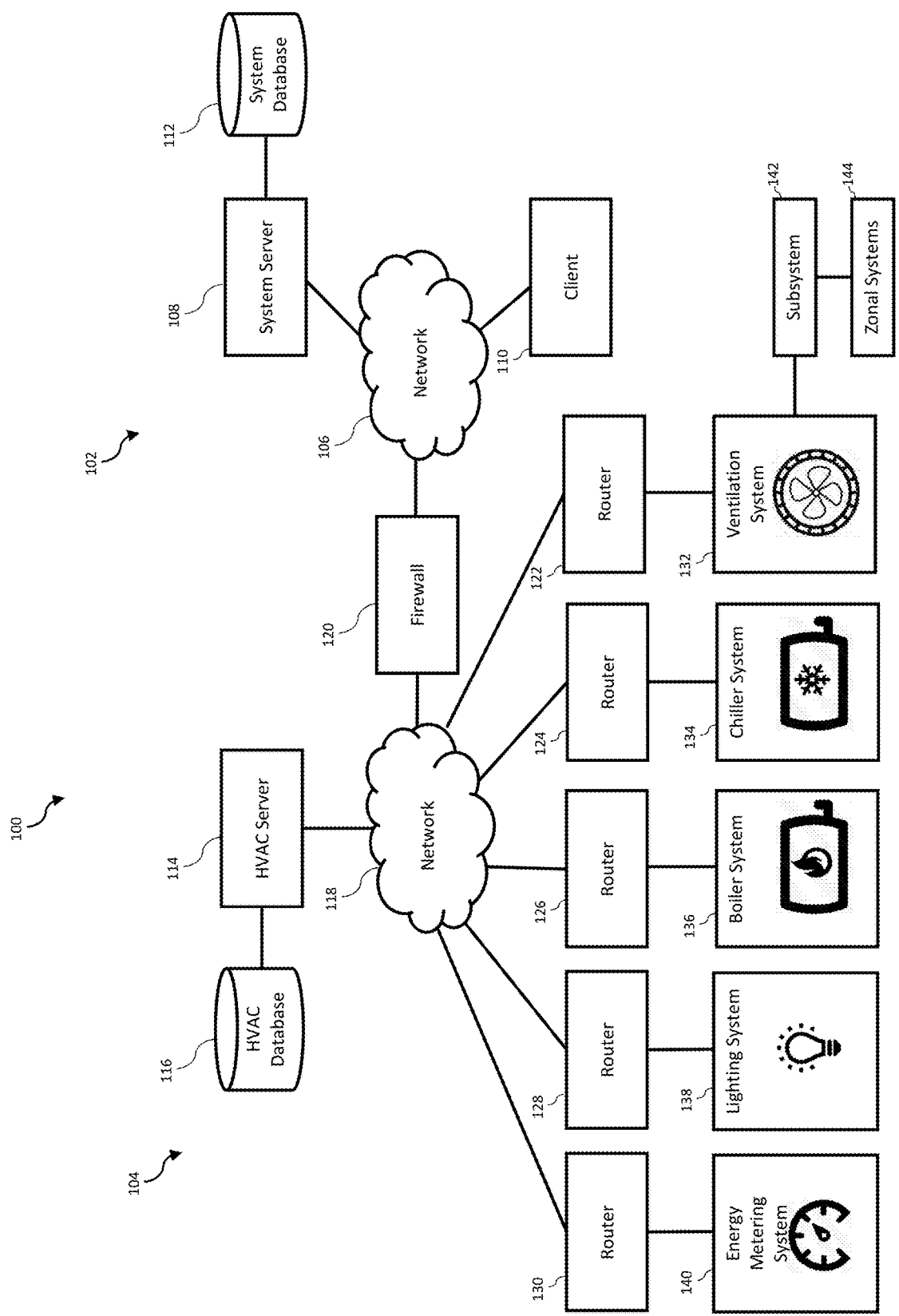
FIG. 1 is a block diagram of a HVAC system in communication with a preferred embodiment of the analysis system.

Referring to FIG. 1, system 100 includes analysis system 102 and HVAC system 104 each connected to network 106.

Analysis system 102 includes system server 108 and system client 110 which are connected to network 106.

System server 108 is connected to system database 112. In one embodiment, system server 108 includes an email server that sends and receives emails from HVAC server 114. Data and models for analysis are stored in system database 112. In one embodiment, system server 108 includes a web server or portal interface that allows system client 110 to interact with analysis system 102. In one embodiment, system database 112 is accessed using a relational database management system (RDBMS) through the use of structured query language (SQL) statements.

System client 110 provides a user interface to system server 108. In one embodiment, system client 110 comprises a web browser that connects to a web server hosted by system server 108 to manage the data gathering, analysis, and reporting.

Exemplary HVAC system 104, which may also be referred to as an energy management system (EMS), includes HVAC server 114. HVAC server 114 is connected to network 118, firewall 120, and routers 122 through 130. In one embodiment, HVAC system 104 utilizes a BACnet network communications protocol and each of routers 122 through 130 are BACnet routers. In this case, HVAC system 104 includes several subsystems including: ventilation system 132, chiller system 134, boiler system 136, lighting system 138, and energy metering system 140. Other systems and subsystems are of course possible such as security subsystems, fire detection subsystems, and control subsystems. Each subsystem can include its own subsystems, such as terminals for defined zones or spaces. Ventilation system 132 includes subsystem 142 and zonal systems 144. In one embodiment, ventilation system 132 of HVAC system 104 provides ventilation for an entire building, subsystem 142 provides ventilation for a floor of a building, and zonal systems 144 are terminals that provide ventilation for defined spaces within the floor of the building.

HVAC server 114 is connected to HVAC database 116. In certain embodiments, HVAC server 114 periodically polls subsystems 132 through 140 for operational and status data that is stored in HVAC database 116.

Firewall 120 is connected between network 106 and network 118. Firewall 120 monitors and controls the incoming and outgoing network traffic of HVAC system 104 based on predetermined security rules.

Router 122 is connected to ventilation system 132. In one embodiment, router 122 allows HVAC server 114 to control the components of ventilation system 132, which includes one or more vents, fans, and servo motors to control the pressurization and air flow in the one or more buildings.

Router 124 is connected to chiller system 134. In one embodiment, chiller system 134 provides cold water for cooling the building. HVAC server 114 controls chiller system 134 by issuing commands that are routed through system network 118 and router 124 to chiller system 134.

Router 126 is connected to boiler system 136. In one embodiment, boiler system 136 provides hot water for heating the building. Boiler system 136 is controlled by HVAC server 114 through commands issued using system network 118.

Router 128 is connected to lighting system 138. In one embodiment, lighting system 138 includes indoor and outdoor lighting systems that can be controlled manually or automatically through HVAC server 114.

Router 130 is connected to energy metering system 140. In one embodiment, energy metering system 140 includes one or more energy meters that measure the energy usage for one or more portions of one or more buildings.

Figure 2:
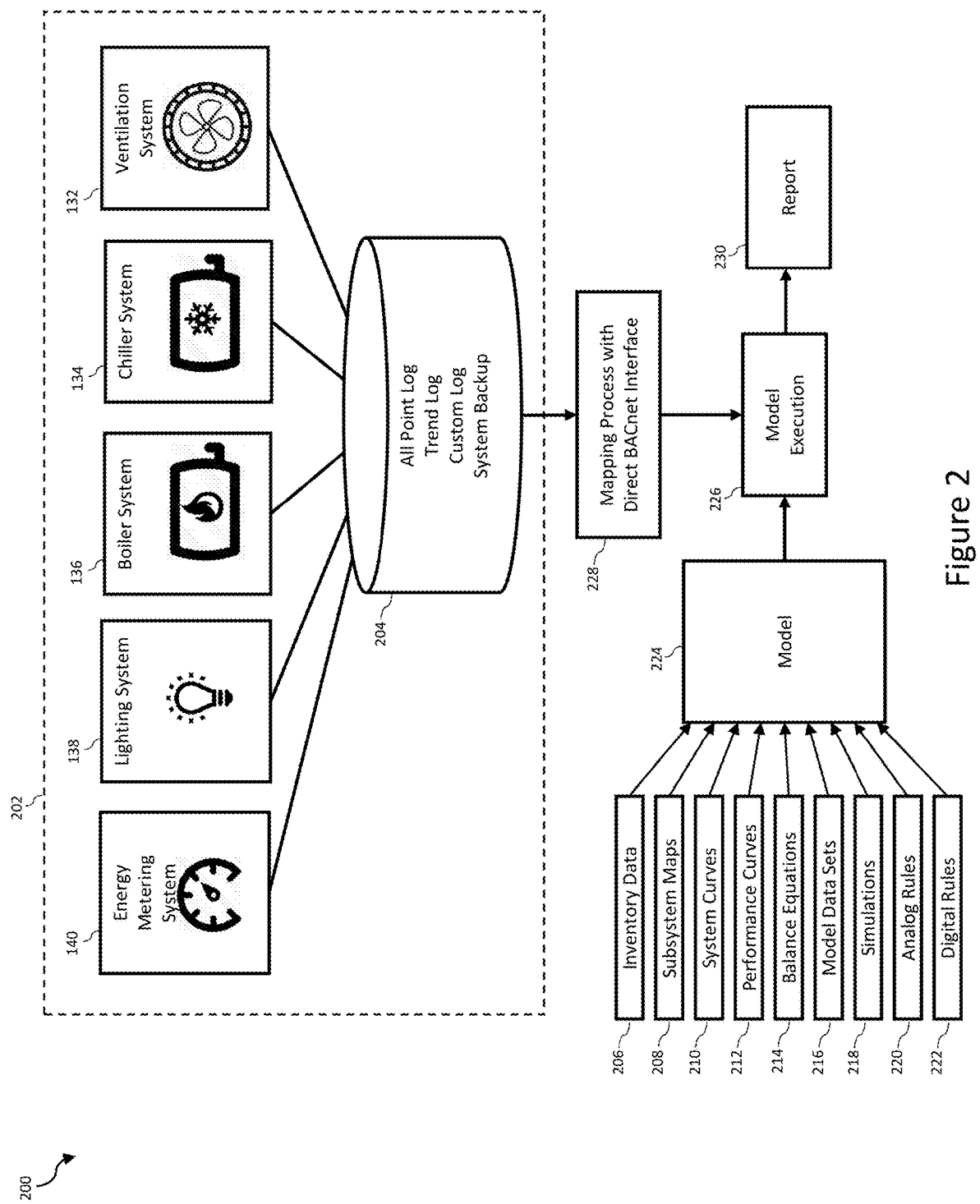
FIG. 2 is a data flow model for the analysis system of a preferred embodiment.

Referring to FIG. 2, a system flow diagram will be described. Building data 202 includes logs 204. Logs 204 includes one or more all point logs, trend logs, custom logs and system backups. An all point log is a record of data from each device and subsystem that makes up the HVAC system 104, including, in this example, ventilation system 132, chiller system 134, boiler system 136, lighting system 138, and energy metering system 140. Trend log stores trend information, such as periodic average temperatures, periodic energy consumption, and periodic hot and cold water usage. Custom logs include additional information that the owner or maintainer of HVAC system 104 has programmed the system to store, including system measurements, maintenance information, and purchase information. The system backups include the programs that run on the individual subsystems so that they can be reset or restored. The system backups also include backups of the data and log files generated by the system. Typically the data of logs 204 are in tabular form and includes an entry for each of the sensors and settings for each piece of equipment in the HVAC system 104 along with a date and a time for each entry. Other data can include position information for ducting and flow controls, power consumption, and failure mode sensors.

To generate and execute model 224, several types and sources of data are used. This data includes inventory data 206, subsystem maps 208, system curves 210, performance curves 212, balance equations 214, model data sets 216, simulations 218, analog rules 220, and digital rules 222.

Inventory data 206 identifies each of the components of the systems of the building. Inventory data 206 includes component name, model number, serial number, date of manufacture, date of installation, and component maintenance logs.

Subsystem maps 208 are graphical pictures of the major physical components of each subsystem arranged in a functional order. They will be further described later. Each of the physical components is defined by a set of physical parameters for each subsystem manufacturer. The subsystem maps are associated with rules that are used to predict the energy efficiency of each subsystem based on the specific physical parameters.

System curves 210 are supplied for one or more components of the HVAC system 104. System curves 210 include fan curves for fans of ventilation system 132 and pump curves for the pumps in chiller system 134 and boiler system 136.

Balance equations 214 for HVAC air and water systems identify the balance between the various sources and uses of air and water. For example, an equation used to measure the percent of outside air delivered is:

$$\% \ OA = \frac{(MA - RA)}{(MA - OA)} \times 100\% \qquad \text{Eq. 1}$$

where:
%  OA is the percentage of outside air delivered;
MA is the temperature of the mixed air;
RA is the temperature of the return air; and,
OA is the temperature of the outside air.

This equation is used to derive one or more analog rules 220 and digital rules 222 that, when tested against data measurements provided by the HVAC system 104, provide an indication of whether the system is functioning properly.

Model data sets 216 are used with model 224 to generate example outputs for the HVAC system 104 that are used to create analog rules 220 and digital rules 222.

Simulations 218 simulate various components and systems of the overall HVAC system 104 and are used to derive one or more analog rules 220 and digital rules 222.

"Analog rules" 220 include numerical and logical equations which use the physical parameters of the subsystems as numerical variables to arrive at conclusions about the operation of each subsystem.

"Digital rules" 222 include logical equations which compare the results of the analog rules to identify inconsistencies in behavior of the operation of the subsystems that can be rectified to improve the overall HVAC system 104 energy efficiency.

Model 224 is used to analyze the data generated by the components of the HVAC system 104. Model 224 comprises analog rules 220 and digital rules 222 that are derived from inventory data 206, subsystem maps 208, system curves 210, performance curves 212, balance equations 214, model data sets 216, and simulations 218.

Execution 226 of model 224 imports the data from logs 204 utilizing mapping process 228 and substitutes the data into the variables required by the rules, equations, and curves of model 224. In a preferred embodiment, data from the HVAC system 104 is loaded into one or more analog rules 220, which are evaluated. After evaluation of analog rules 220, digital rules 222 are evaluated using data from the HVAC system 104 and outputs from the evaluation of analog rules 220. The outputs from the evaluation of analog rules 220 and digital rules 222 are associated with textual descriptions that are included in report 230.

Report 230 is generated by model execution 226. In one embodiment, report 230 identifies the components and subsystems of the HVAC system 104 that need to be calibrated, serviced, or replaced. In another embodiment, report 230 includes updated set points for the subsystems. For example, the updated set points might include temperature settings for chiller system 134 that raise the water temperature set point during non-peak hours of building usage to reduce energy consumption.

Referring to FIGS. 3, 4, 5, and 6 a preferred set of subsystem maps will be described. The subsystem maps are generalized graphical representations of HVAC and power systems for each building. The graphical representations are made up of "blocks" that represent various individual mechanical components. The blocks are connected by "lines" that represent flow paths for a working fluid or an energy transfer. The blocks are associated with a set of equations in the model that relate set points and sensor readings to expected behavior of each mechanical component.

Figure 3:
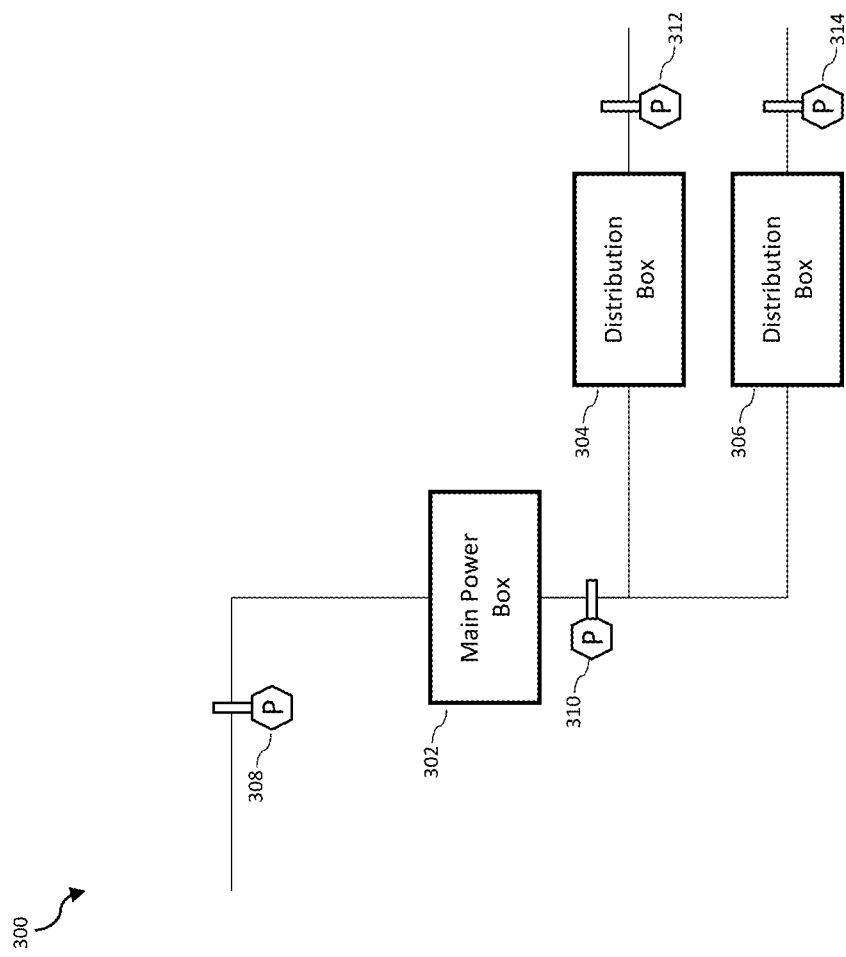
FIG. 3 is a diagram of a lighting system of a preferred embodiment.

Referring to FIG. 3, lighting system 300 includes main power box 302, distribution box 304, and distribution box 306 as well as power meters 308 through 314.

Power meter 308 measures the input power received from the main supply line. Power meter 310 measures the power out of main power box so that discrepancies between power meter 308 and power meter 310 can be used to identify supply problems.

Power meters 312 and 314 measure the power through distribution boxes 304 and 306 so that discrepancies between readings from power meter 310 and power meters 312 and 314 can be used to identify problems.

Figure 4:
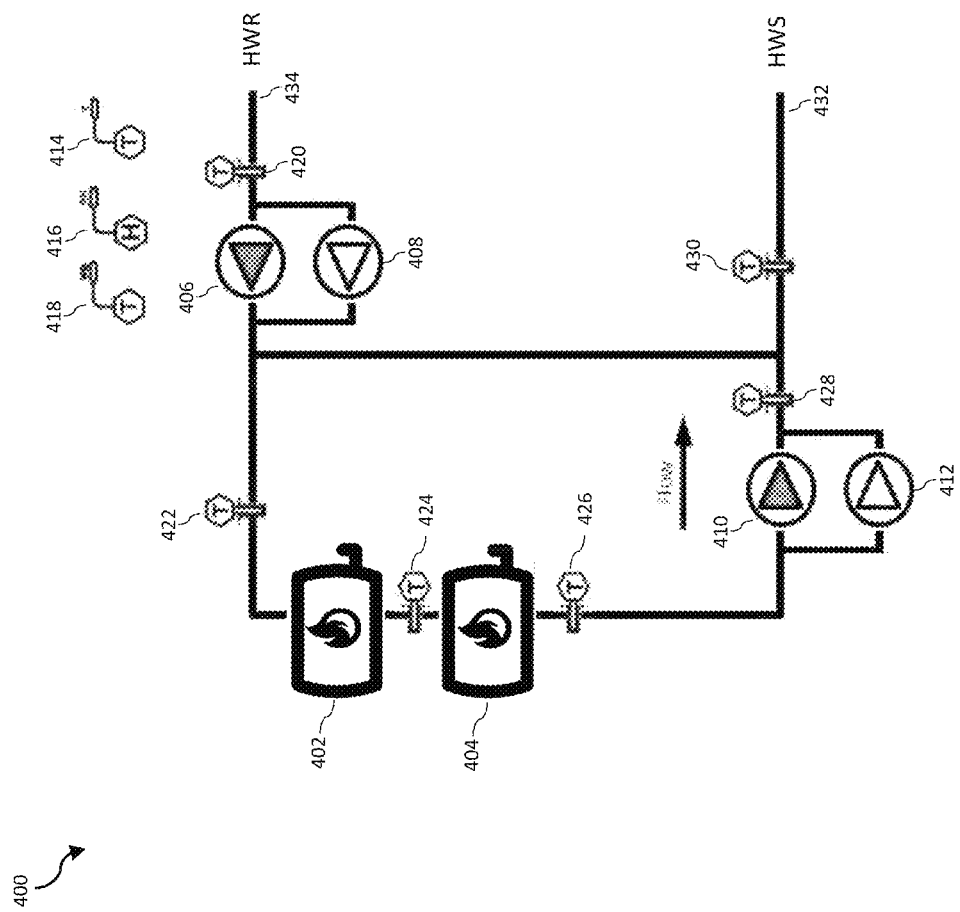
FIG. 4 is a diagram of a boiler system of a preferred embodiment.

Referring to FIG. 4, boiler system 400 is shown. Boiler system 400 includes boilers 402 and 404, pumps 406 through 412, and sensors 414 through 430. Boiler system 400 supplies hot water to hot water supply 432, which is returned at hot water return 434.

Boilers 402 and 404 heat water received from hot water return 434 to supply hot water to hot water supply 432.

Pumps 406 through 412 drive the water through the system. Pumps 406 and 408 drive water from hot water return 434 into boilers 402 and 404. Pumps 410 and 412 drive hot water from boilers 402 and 404 to hot water supply 432.

Temperature sensor 414 measures the dry bulb outside air temperature at boiler system 400. Humidity sensor 416 measures the relative humidity of the outside air at boiler system 400. Wet bulb temperature sensor 418 measures the wet bulb temperature of the outside air near boiler system 400.

Temperature sensors 420 through 430 measure the water temperature at various points in boiler system 400. Combinations of the measurements from different sensors can be used to check other parts of the system. In one embodiment, readings from temperature sensors 422 and 424 are used to verify boiler 402 is working properly.

Figure 5:
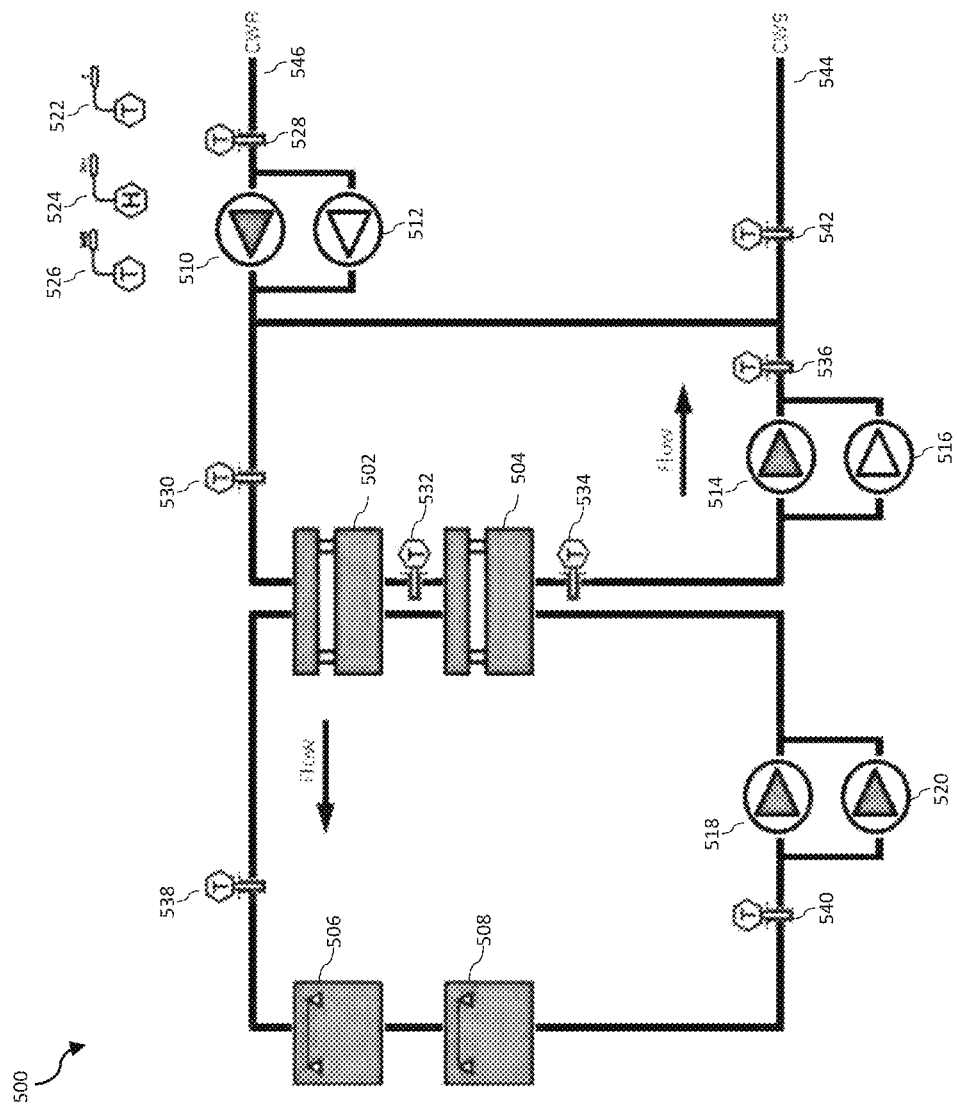
FIG. 5 is a diagram of a chiller system of a preferred embodiment.

Referring to FIG. 5, chiller system 500 is shown. Chiller system 500 includes chillers 502 and 504, water towers 506 and 508, pumps 510 through 520, and sensors 522 through 542. Chiller system 500 supplies cold water to cold water supply 544, which is returned at cold water return 546.

Chillers 502 and 504 chill water received from cold water return 546 to supply cold water to cold water supply 544.

Pumps 510 through 520 drive the water through the system. Pumps 510 and 512 drive water from cold water return 546 into chillers 502 and 504. Pumps 518 and 520 push water through chillers 504 and 502 and pull water through water towers 506 and 508. Pumps 514 and 516 drive cold water from chillers 502 and 504 to cold water supply 544.

Temperature sensor 522 measures the dry bulb outside air temperature at chiller system 500. Humidity sensor 524 measures the relative humidity of the outside air at chiller system 500. Wet bulb temperature sensor 526 measures the wet bulb temperature of the outside air near chiller system 500.

Temperature sensors 528 through 542 measure the water temperature at various points in chiller system 500. Combinations of the measurements from different sensors can be used to check other parts of the system. In one embodiment, readings from temperature sensors 530 and 532 are used to verify chiller 502 is working properly.

Figure 6:
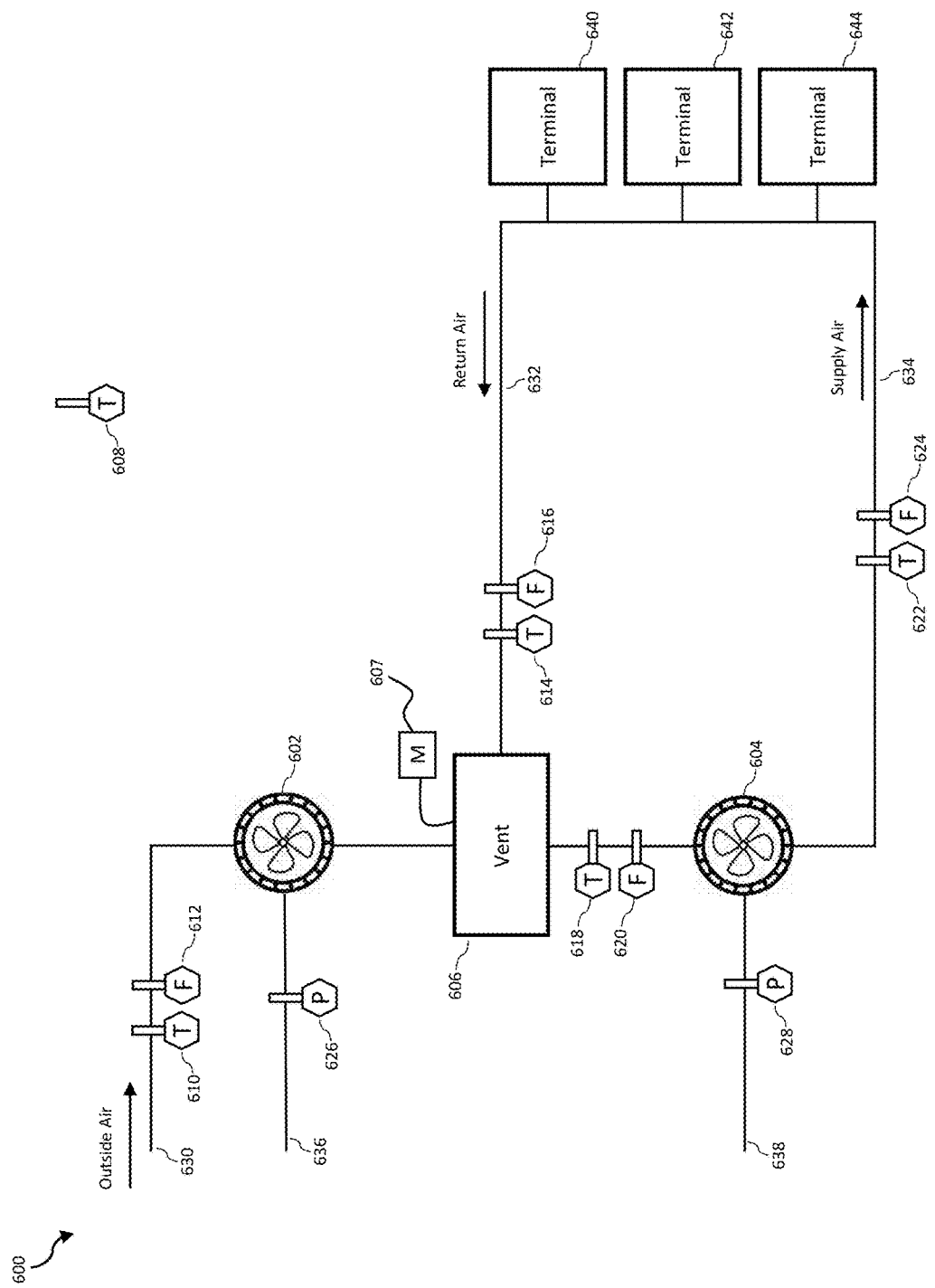
FIG. 6 is a diagram of a ventilation system of a preferred embodiment.

Referring to FIG. 6, ventilation system 600 is described. Fans 602 and 604 move air through ventilation system 600. Fan 602 provides a flow of outside air from duct 630 and is powered with electrical conduit 636. Fan 604 provides the flow of supply air through duct 634 and is powered with electrical conduit 638. The power provided to fans 602 and 604 are respectively measured by power sensors 626 and 628.

Vent 606 is used to mix outside air from duct 630 with return air from duct 632 to provide sufficient fresh air to the system. Sensor setting 607 provides a position set point.

Temperature sensor 608 measures the dry bulb outside air temperature near ventilation system 600.

Sensors 610 through 624 measure the temperature and flow of air at various points in ventilation system 600. Combinations of the measurements from different sensors can be used to check other parts of the system. In one embodiment, readings from flow sensors 620 and 624 in combination with power sensor 628 are used to verify that fan 604 is working properly.

Terminals 640, 642, and 644 form a subsystem within the ventilation system 600. In a preferred embodiment, each of terminals 640, 642, and 644 includes components for a single zone, e.g. an office, within a building.

Figure 7:
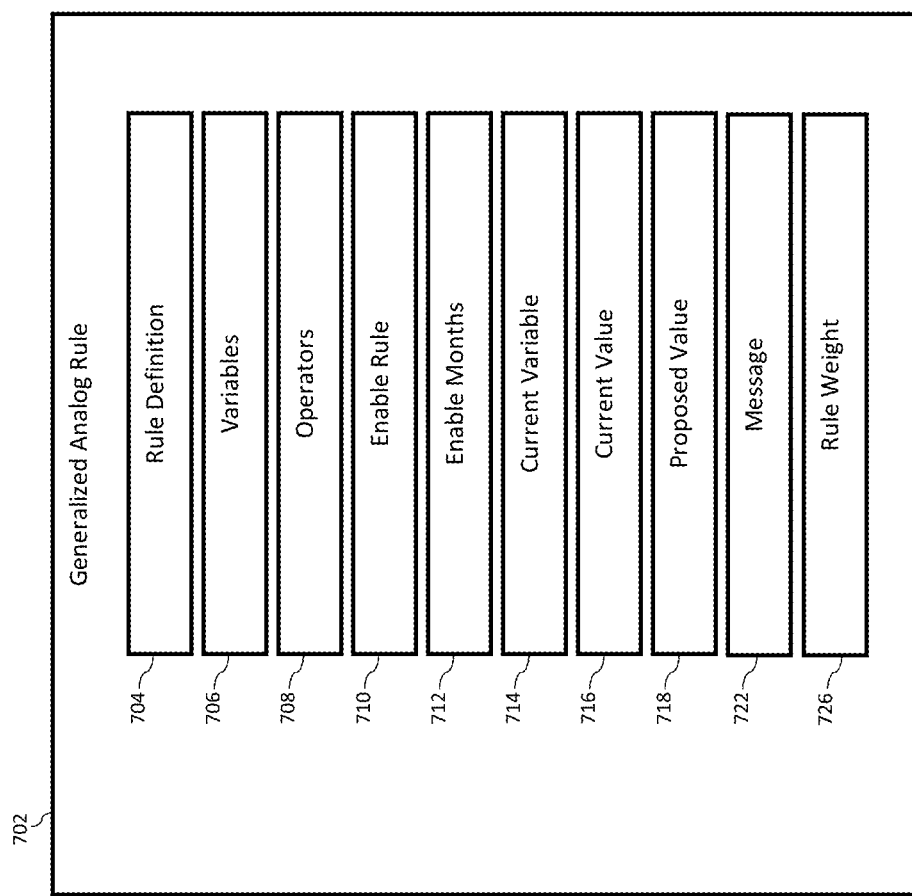
FIG. 7 is a diagram of generalized analog rule of a preferred embodiment.

Referring to FIG. 7, generalized analog rule 702 is described. In one embodiment, analog rule 702 is one of a set of analog rules that are stored in the system database. The set of analog rules relate to measured values in the system.

Rule definition 704 provides the actual mathematical equation used by the analysis model to arrive at a result.

Variables 706 identify variables used by the rule. Each variable comprises one of a constant value that is predefined, a measured value that is determined from building system data, and a calculated value. One or more of variables 706 is associated with a set of keywords used to identify records in the all points log.

Operators 708 identify operators used to compare and combine the variables. The operators include a set of common mathematical operators. Each analog rule can have up to three variables that are combined using up to two operators. The second and third variables are combined using the second operator and the combination is compared against the primary variable using the first operator. Operators include the group comprising "<", ">", "=<", ">=", "=", "!=", "< >", "+", "−", and "OR".

Enable rule 710 identifies the variable used to determine whether analog rule 702 is enabled. In one embodiment, analog rule 702 is enabled when the value of enable variable 710 is a logical "true" value. When enabled, analog rule 702 will be included in the model. When not enabled the rule will not be included in the model. The variable is associated with a user interface element, such as a checkbox, so that the value of the user interface element determines whether the rule will be enabled and evaluated.

Enable months 712 identifies months of the year in which the rule will be applied. In one embodiment, each field is a binary value that is either "true" or "false" when the rule is analyzed by the model for that month. When "false" the rule is not analyzed for that month.

Current variable 714 identifies the variable in the system used for a current value of analog rule 702.

Current value 716 is a field that identifies a current value for the current variable.

Proposed value 718 is a field that identifies a hypothetical value recommended by the system to be the new value of the current variable.

Message 722 is a field used to store a text string related to the rule. For example, a text string may identify the meaning of the rule and actions to take when the rule is evaluated.

Rule weight 726 is a field that identifies a rule weight used by the model to determine which rules are more important than other rules.

The table below includes several exemplary analog rules used by models of the system, where V1 is the primary variable, O1 is the first operator, V2 is the second variable, O2 is the second operator, and V3 is the third variable:

| Analog Rule Name | Variables and Operators | Message |
| --- | --- | --- |
| R-OAT < CurrentOAT − 5 | V1: OATReading<br>O1: <<br>V2: CurrentOATReading<br>O2: −<br>V3: 5 | The outside air temperature sensor is reading more than five degrees from the current outside air temperature. Have maintenance calibrate the sensor and verify that it is protected from direct sunlight with a solar shield. If that doesn't correct the issue then replace or relocate the sensor. |
| R-OAWBT < CurrentOAWBT − 5 | V1: OAWBTReading<br>O1: <<br>V2: CurrentOAWBTReading<br>O2: −<br>V3: 5 | The outside air wet bulb temperature sensor is reading more than five degrees from the current outside air wet bulb temperature. Have maintenance calibrate the sensor and verify that it is protected from direct sunlight with a solar shield. If that doesn't correct the issue, then replace or relocate the sensor. |
| R-Economizer OAT Lockout > 72 | V1: fEconoOATLockout<br>O1: ><br>V2: 72<br>O2: +<br>V3: 0 | The dry bulb economizer outside air lockout is set to above 72 degrees. This is set higher than normal for most areas of the country. Only in extremely dry parts of the country would this setting apply. Consult the Cenergistic Technical Team Tools Engineering Guide for the proper DB economizers outside air temperature lockouts for the location of the client. |
| R-Mixed Air Set Point < 55 | V1: fEconoOADBSetPoint<br>O1: <<br>V2: 55<br>O2: +<br>V3: 0 | The dry bulb economizer set point is set to below 55 degrees. Generally the system only makes 55 degree air for cooling so setting |

-continued

| Analog Rule Name | Variables and Operators | Message |
|---|---|---|
| | | the mixed air economizer's set point to below 55 wastes energy. Consult the Cenergistic Technical Team Tools Engineering Manual for proper dry bulb economizers settings for various locations in the United States |

Figure 8:
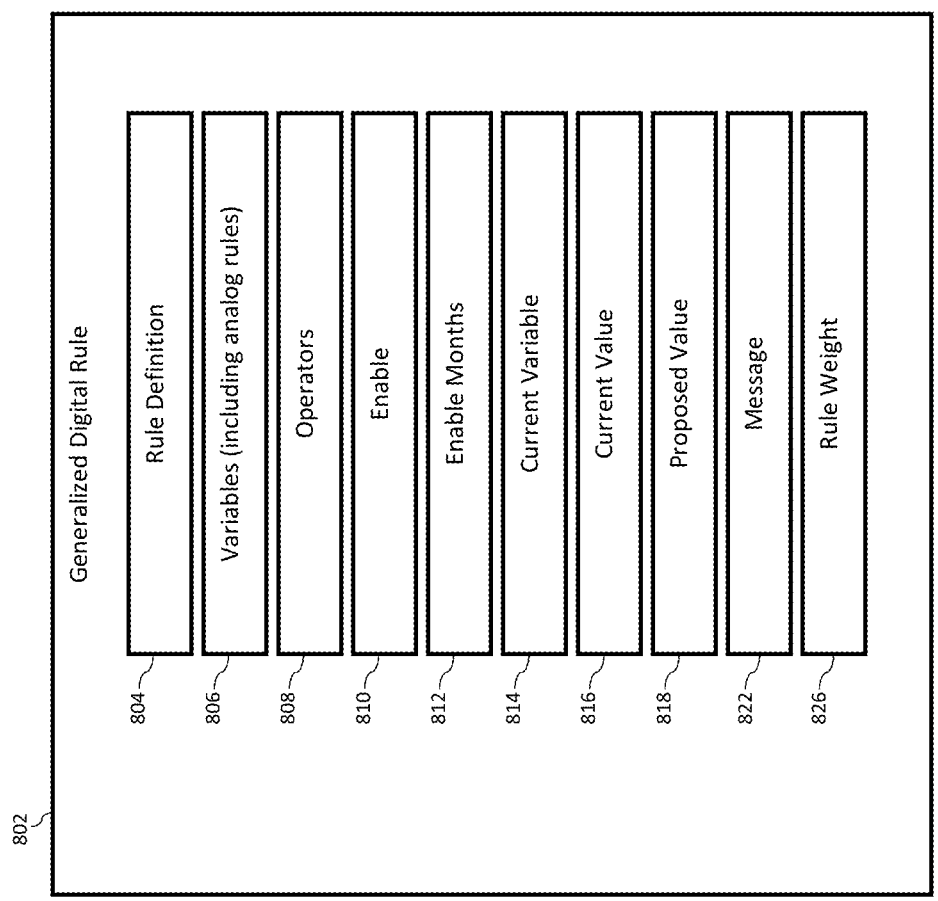
FIG. 8 is a diagram of generalized digital rule of a preferred embodiment.

Referring to FIG. 8, generalized digital rule 802 is a record stored in the database. In one embodiment, each digital rule can have up to three variables that are combined using up to two operators. The primary, second, and third variables include one or more Boolean and numeric values that are combined with Boolean functions, comparison functions, and algebraic operators.

Rule definition 804 stores the actual digital rule to be applied by the analysis system 102.

Variables 806 identify variables used by the rule. The result of each analog rule 702 can be included as a variable used by digital rule 802. Each variable can be a constant value, a measured value, and a calculated value. In one embodiment, one or more of variables 806 comprises the keyword used to identify physical readings present in the all points log.

Operators 808 identify operators used to compare and combine the variables. The operators include mathematical operators, logical operators, and comparison operators. Mathematical operators include operators for addition (+), subtraction (−), multiplication (× or *), and division (÷). Logical operators include operators for logical and (AND), logical or (OR), exclusive or (XOR), negative and (NAND), negative or (NOR), and negative exclusive or (NXOR). Comparison operators include operators for less than (<), greater than (>), less than or equal to (<=), greater than or equal to (>=), equal to (=), and not equal to (!= or <>).

Enable 810 identifies the variable used to determine whether digital rule 802 is enabled. When enabled, digital rule 802 will be executed by the model. When not enabled, the rule will not be executed. A user interface element, such as a checkbox, is associated with the variable to allow the value or state of the user interface element to control whether the digital rule will be evaluated.

Enable months 812 identifies months for which the rule will be executed.

Current variable 814 is a field that identifies the variable in the system used for a current value of digital rule 802.

Current value 816 is a field that identifies a current value for the current variable.

Proposed value 818 is a field that identifies a suggested value for the current value.

Message 822 is a field used to define a text string describing the meaning of the rule and identifying actions to take related to the rule.

Rule weight 826 is a field that identifies a weight of the rule.

The table below includes examples of digital rules used by the system, where V1 is a primary variable, O1 is a first operator, V2 is a second variable, O2 is a second operator, and V3 is a third variable:

| Digital Rule Name | Variables and Operators | Message |
|---|---|---|
| R-OAT No Response | V1: R-OAT > 125<br>O1: OR<br>V2: R-OAT < 0<br>O2: OR<br>V3: R-OAT < 0 | The outside air temperature sensor is reading no response. The Value it is displaying is out of range. It needs to be repaired or replaced by maintenance |
| R-OACFM Control Failure | V1: R-OACFM Control Set Point High Failure<br>O1: OR<br>V2: R-OACFM Control Set Point Low Failure<br>O2: OR<br>V3: R-OACFM Control Set Point Low Failure | The outside air CFM control Program is not controlling the outside air CFM to within 100 CFM of the desired CFM set point. The system needs to be checked by a qualified technician to see why it is not capable of proper control. Consult the Cenergistic Technical Team Tools Manual for information on the components that make-up the outside air CFM control. |
| R-MAD Open > Min − OAT > 65 | V1: R-MAD Position > MAD Minimum<br>O1: AND<br>V2: R-OAT > 65<br>O2: AND<br>V3: R-OAT > 65 | The outside air damper is open to more than the scheduled minimum position with the outside air temperature above 65 degrees. The only time we want the outside air damper open to more than the minimum position is when we can use the outside air to cool or if the space CO2 is above the space CO2 set point. Check both the CO2 level in the space, return and mixed air for the system to make sure that one of the CO2 sensors is not out of calibration. If you find that one of those sensors is causing the problem then consult with the owner to get the sensor calibrated or replaced. Also check the CO2 set point to insure that it is set to 1,100 PPM. The CO2 set point should be set to 750 PPM above the ambient CO2 level for the location of the client. In most cases the ambient CO2 level will be around 450 PPM. 750 + 450 = 1,100 PPM. If it is not the CO2 sensors or set points then check the economizer OAT lockout. It may be set too high for the client's location. Consult the Cenergistic Technical Team Tools Manual for a list of economizer OAT lockouts for most large cities in the US. |
| R-Minimum Outside Air Only | V1: R-OAD − 0% Open<br>O1: AND<br>V2: fSupplyFanStatus<br>O2: AND<br>V3: fSupplyFanStatus | The fixed minimum outside air damper control option is being used on this air handling unit. Investigate the option of enabling the system to economize when the outside air conditions are |

| Digital Rule Name | Variables and Operators Message |
|---|---|
| | appropriate. Consult the Cenergistic Technical Team Tools Manual or Honeywell's Gray Manual for details on the configuration of a dry bulb economizer. |

Figure 9:
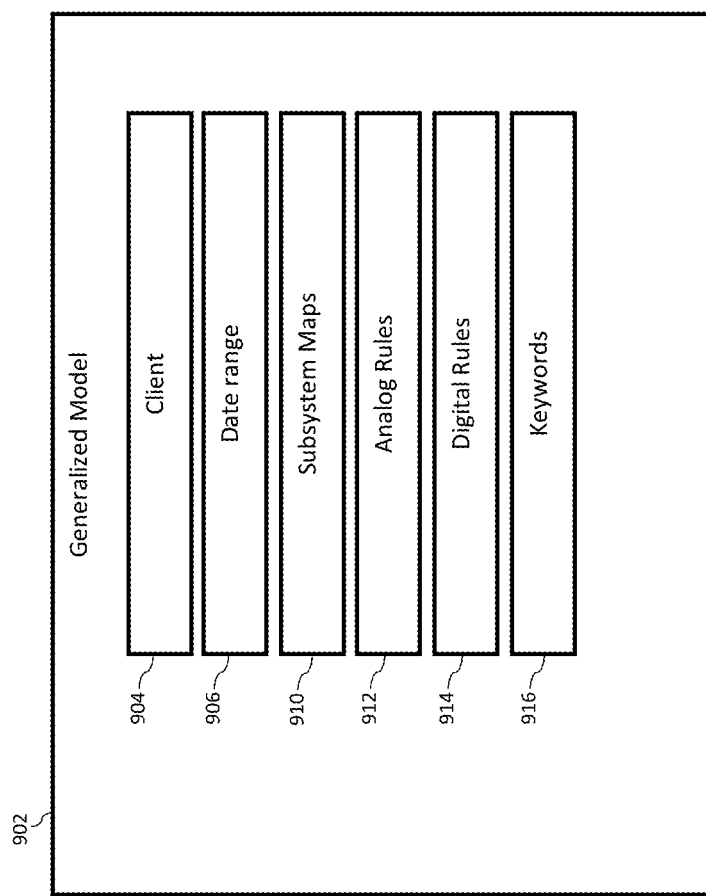
FIG. 9 is a diagram of a generalized model of a preferred embodiment.

Referring to FIG. 9, generalized model 902 is described. Model 902 is a record stored in the system database and includes fields 904 through 916.

Client 904 is a string that identifies the building associated with the model.

Date range 906 identifies a set of dates between which the model will analyze input data.

Subsystem maps 910 identifies the subsystem maps in the model on which to perform an analysis.

Analog rules 912 includes one or more of analog rules 702.

Digital rules 914 includes one or more of digital rules 802.

Keywords 916 include the keywords that are used to identify data that is related to a specific piece of equipment in the building system. In one case, the data includes variables used in one or more digital and analog rules.

Referring to FIG. 10, data flow diagram 1000 is described. Diagram 1000 shows an example of the acquisition of an all points log from the HVAC server 114 by the system server.

At step 1002, system server 108 generates a request for the all points log. In a preferred embodiment, the request is in a form of an email which contains a unique command code in the body of the email. In this way, the request can bypass the security settings of the BACnet protocol.

At step 1004, a request manager is loaded onto HVAC server 114. The request manager filters and validates incoming requests so that authorized requests are properly serviced.

At step 1006, HVAC server 114 screens emails that are sent to HVAC server 114. The emails are screened for authorized requests.

At step 1008, system server 108 sends the email data request to HVAC server 114.

At step 1010, the HVAC server 114 decodes an email request that is an authorized request. In a preferred embodiment, the unique command code is a number that includes a hash of the subsystem identifier, an equipment identifier, and any variable requested. The request manager decodes the hash and loads the appropriate subsystem API request in the subsystem data.

At step 1012, HVAC server 114 sends the API request to BACnet router 126. It should be understood that, in a preferred embodiment, many other requests may be sent to one or more routers for each subsystem at the same time.

At step 1022, BACNet router 126 forwards the data request to the chosen subsystem.

At step 1024, this requested data is generated or located by the subsystem controller.

At step 1026, the requested data is uploaded to BACNet router 126.

At step 1030, the requested data is passed from BACNet router 126 to HVAC server 114.

At step 1032, an email is generated by the request manager on the HVAC server 114 that includes the requested data. In one embodiment, the requested data is hashed with the subsystem name, a date, time, and a variable name for the requested data.

At step 1034, HVAC server 114 sends the email.

At step 1036, the data is converted from the native format into a format suitable for the analysis system 102. In one embodiment, the data from HVAC server 114 is provided in an email in a plain text log file as a part of an all points log, which is formatted into a set of commands in the form of structured query language (SQL) statements.

At step 1038, the formatted data is sent from system server 108 and is received by system database 112.

At step 1040, the formatted data is stored by system database 112 for use by the model during model execution.

Referring to FIG. 11, method 1100 will be described. Method 1100 includes steps involved in analyzing a model according to phase I.

At step 1102, method 1100 retrieves data from the all points log. In one embodiment, the all points log is sent or downloaded using an email through the firewall between the HVAC system 104 and the analysis system 102, as described above.

At step 1104, a date range is selected.

At step 1106, a subsystem map is selected to be analyzed.

At step 1108, the database is queried to get a list of subsystems and keywords that are associated with the subsystems as required for the analog and digital rules.

At step 1110, a set of rules is selected. For the phase I analysis, a first digital rule is selected which tests thermostat set points of each thermostat in the subsystem against a prescribed set point for each date and time. A second digital rule is selected to check the temperature readings of each temperature sensor against a known standard at each date and time analyzed. In each case, each rule returns a "true" or a "false" for each sensor, each date, and each time.

At step 1112, keywords are identified that are associated with the selected rule. The keywords appear in the name fields of the all points log to identify records that contain data defined as variables in the rule.

At step 1114, the data from the HVAC system 104 is sorted by the selected keywords to identify the data records related to the selected rule.

At step 1116, the rule is applied to each of the identified records. In one embodiment, the application of the rule comprises comparing current readings of the temperature sensors with trusted values for the actual temperature. For example, if the rule is:

$$T_1 = T_2 \qquad \text{Eq. 2}$$

Where,
$T_1$=True Outside Air Temperature for Sensor A
$T_2$=Actual Outside Air Temperature Then, if the sensor is properly calibrated the rule will return "true". If not, then the rule will return "false". At this step, the actual data from the all points log is loaded into the equation and the expression is evaluated for each day and hour specified.

At step 1118, the analysis system 102 counts each time that the rule is applied and each time the rule returns "true" or "false" to identify how many times the rule is passed or failed.

At step 1120, the number of times the rule returned "true" is divided by the total number of times that the rule was applied to determine a ratio or the compliance rate. The compliance rate indicates the percentage of the hours that the system returned "true".

At step 1122, a report is generated in one embodiment. The report includes the ratio and provides the instructions included in message 822 if any data points did not pass the rule. The ratio or compliance rate is a function of the actions identified (data points that did not pass the rule) and the points processed (the total number of data points tested) according to the formula:

$$\text{Compliance Rate} = 1 - \frac{\text{Actions Identified}}{\text{Points Processed}} \quad \text{Eq. 3}$$

Which is equivalent to:

$$\text{Compliance Rate} = \frac{\text{Points Processed} - \text{Actions Identified}}{\text{Points Processed}} \quad \text{Eq. 4}$$

Alternatively, a failure rate may be displayed, which is 1–Compliance Rate or $$\text{Failure Rate} = \frac{\text{Actions Identified}}{\text{Points Processed}} \quad \text{Eq. 5}$$

At optional step 1124, historical ratios are retrieved. The phase I analysis is performed at different dates. Each time the analysis is performed, its output is recorded. If there is any historical data available for the phase I analysis it is retrieved by the system.

At optional step 1126, the system generates a report with current and historical ratios that shows changes in the efficiency of the system over time.

Referring to FIG. 12A, user interface 12000 will be discussed. User interface 12000 is a phase I dashboard. User interface 12000 includes user interface elements 12002 to 12042.

Button 12004 allows for selecting simulation settings. Button 12006 allows for managing which buildings are excluded from the model.

Buttons 12008 to 12018 allow for the selection of a type of mechanical system by manufacturer. This is important because the rules and variables associated with the different equipment in each subsystem are often different. For example, a thermostat manufactured by JCI may have variable names that appear differently in the all points log than those manufactured by Siemens. Similarly, the rules to test the proper set point for a thermostat may require different tolerances from manufacturer to manufacturer.

Selection of one of buttons 12024 through 12038 identifies the type of phase I analysis to perform and selection of button 12042 performs the selected analysis. Button 12024 is associated with a rule for testing outside air sensors. Button 12026 is associated with a rule for testing the cooling set points of the system during occupied hours. Button 12028 is associated with a rule for testing cooling set points of the system during unoccupied hours. Button 12030 is associated with a rule for testing discharge air set points. Button 12032 is associated with a rule for testing dehumidification set points. Button 12034 is associated with a rule for checking heating set points during occupied hours. Button 12036 is associated with a rule for testing heating set points during unoccupied hours. Button 12038 is associated with a rule for checking non-standard equipment of the system.

Selecting button 12040 opens a dialog box to setup data import. The dialog box allows for identifying the path and file name to the data files for the simulation.

Referring to FIG. 12B phase I model control interface 12100 will be described. The phase I model control selects a subsystem to be modeled, rules for the model, and data to be executed by the model.

Buttons 12106 through 12120 select a type of system.

Box 12122 select a type of "point" to edit. "Points" are the sensors and set points of the system. In one embodiment, the points include temperature sensors, dehumidification set points, occupied cooling set points, unoccupied cooling set points, occupied heating set points, unoccupied heating set points, and discharge air temperature set points. Box 12122 includes a dropdown list of points (sensors or set points) that have been defined for a model. Box 12122 includes elements four: "Outside Air Temperature Sensor" that contains the settings for the processing performed when button 12024 of FIG. 12A was selected, "Dehumidification Set Point" that contains the settings for the processing performed when button 12032 of FIG. 12A was selected, "Occupied Cooling Set Point" that contains the settings for the processing performed when button 12026 of FIG. 12A was selected, "Unoccupied Cooling Set Point" that contains the settings for the processing performed when button 12028 of FIG. 12A was selected, "Occupied Heating Set Point" that contains the settings for the processing performed when button 12034 of FIG. 12A was selected, "Unoccupied Heating Set Point" that contains the settings for the processing performed when button 12036 of FIG. 12A was selected, and "DATSetPoint" that contains the settings for the processing performed when button 12030 of FIG. 12A was selected.

Box 12128 allows for a description of the point type. In one embodiment, box 12128 receives and displays a text string that identifies the type of point. Sensor types include temperature sensors that return a numeral value. These sensors are subject to calibration and often return incorrect readings. Sensors also include flow meters like mass air ratio. These sensors also return numeral values and are subject to calibration. Other types of sensors include pressure sensors and humidity sensors.

Set points include thermostat settings that are used to control equipment in the system.

The high limit set in box 12130 and the low limit set in box 12132 are used for checking set points of the devices of the building automation and control system. The high limit is the highest passing value for the point being checked and is used when checking the set points of the devices of the building automation and control system. Low limit is the lowest passing value for the point being checked and is used when checking the set points of the devices of the building automation and control system.

The actual value set in box 12134 and the deviation set in box 12136 are used for checking the sensors of the building automation and control system. The actual value is the value that a sensor value is checked against. When the sensor is an outside air temperature sensor, the actual value is the actual outside air temperature that will be used to check whether the sensor is providing an accurate reading. The deviation identifies how close a sensor reading must be to the actual value in order to pass.

Box 12138 includes a collection of keywords. When a keyword from the list is encountered in a line of data in the points log, then that line of data is processed according to the point selected. For example, the keyword "OATS" identifies that the record is associated with an outside air temperature sensor for a specific machine identified in the subsystem map. Additional keywords are added to the list in box 12138 by typing the new keyword into box 12140 and pressing button 12142.

Referring to FIG. 12C, a phase I report is described. Report 12200 shows the number of actions identified, the number of points tested against the applicable rule, and the compliance rate for four different dates. In this example, four pairs of bars are shown. The left-most bar in each pair is the number of "actions identified", which is the number of data points that did not pass the rule and require action to be taken. The right-most bar in each pair is the total number of points tested against the rule. The pass ratio or compliance rate for each pair is shown as a percentage number.

FIG. 12D, an alternate embodiment of a phase I report is described that includes table 12300.

Column 12302 includes a text string that identifies the subsystem being tested.

Column 12304 identifies the type of point tested.

Column 12306 identifies a text string showing corrective action.

Column 12308 contains a keyword matched in the point address.

Column 12310 includes the value of the system for the point.

Column 12312 identifies an updated setting or target value for the set point.

Column 12314 identifies a date by which action should be taken to set the value equal to the target value.

Column 12316 identifies a string code for the point identified. Preferred status codes include "W" for working, "R" for rejected, "C" for completed, "O" for completed and ongoing.

Referring to FIG. 12E, report 12400 shows an alternate embodiment of a phase I report. In this embodiment, occupied cooling set points for all points in the system were analyzed. Over 1000 points had a set point of 73, which is one unit below the target value of 74. Less than 200 points were set at the target value 12408. Target value 12408 identifies the target value against which the points of the system were compared. In this example, target value 12408 is a target occupied cooling set point set at 74.

Referring to FIG. 13, method 1300 will be described. Method 1300 is an example of steps involved in analyzing a model according to phase II.

At step 1302, the analysis system 102 retrieves or downloads the all points log.

At step 1304, a date range is selected for the analysis.

At step 1306, one or more subsystem maps is selected for analysis.

At step 1308, rules and keywords that are associated with the phase II analysis are defined. The rules include analog and digital rules. The keywords are used to identify specific machines and sensors in the all points data log.

At step 1310, one or more rules are selected for analysis.

At step 1312, the database is queried for the keywords that are associated with the selected rules.

At step 1314, the keywords are used to sort the all points log. A table is created containing records that match the keywords. The records in the table contain the data that will be substituted in the variables of the selected rules.

At step 1316, the data from the table is substituted into the variables and the rules are applied. Each time a rule is applied or analyzed the rule returns a "true" or "false".

At step 1318, the analysis system 102 counts the number of times each of the rules was applied and the number of true and false outcomes where a "true" result means that the rule was not passed and that an action needs to be taken and where a "false" result means that the rule was passed with no action needed.

At step 1320, a comparison is made of the number of "true" results to the total number of times that the rules were applied. A ratio is created by taking 1 minus the total number of "true" results divided it by the total number of rule applications to generate a compliance rate. Alternative embodiments calculate a "fail" ratio by taking the total number of "fail" results and dividing it by the total number of rule applications.

At step 1322, the pass ratio and the fail ratio are provided by the analysis system 102 in a report displayed or printed on a screen of a client device.

Figure 14A:
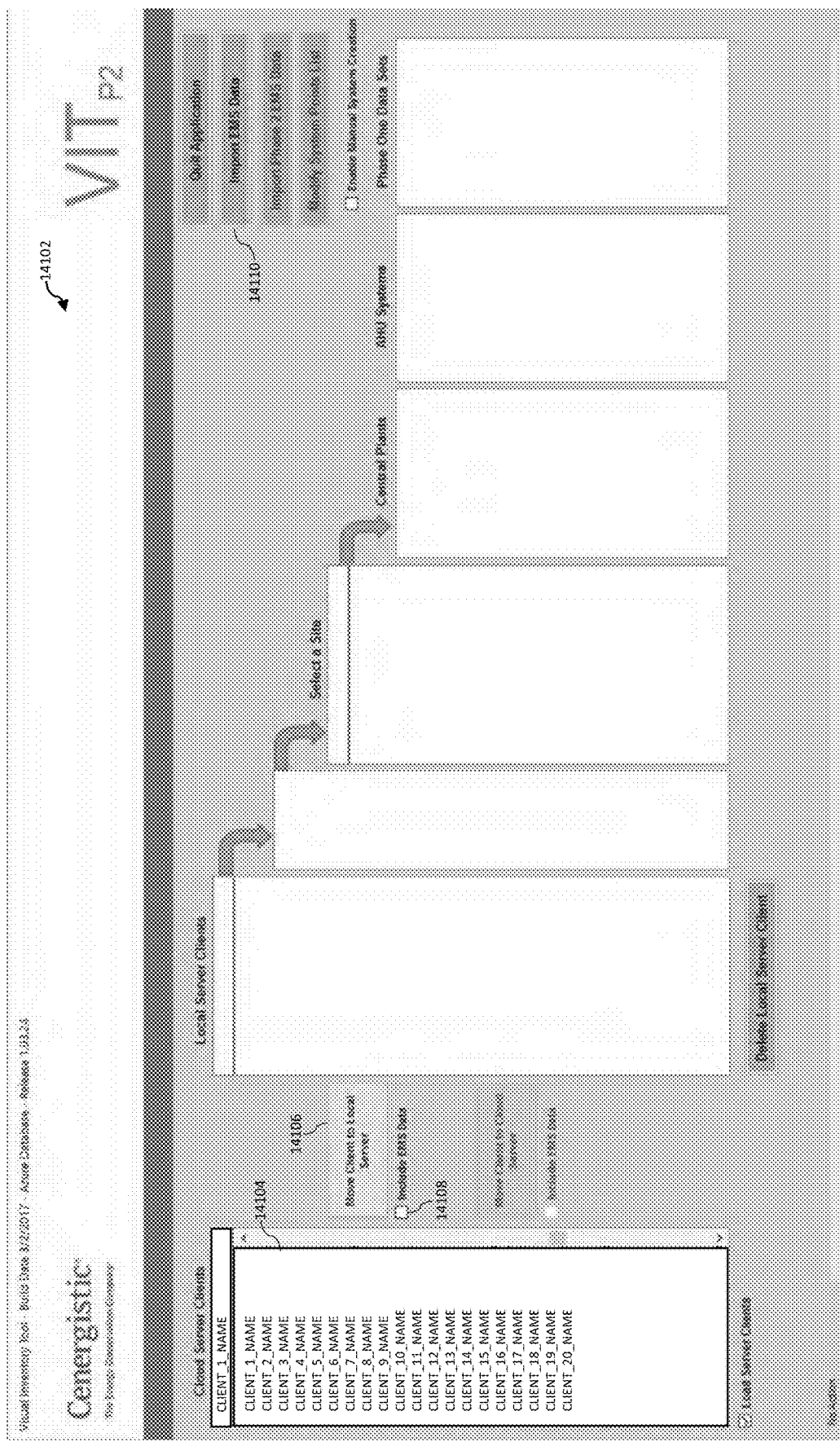
FIGS. 14A through 14E are user interfaces for initiating a phase II analysis of a preferred embodiment.

Referring to FIG. 14A, user interface 14102 displayed on system client 110 initiates the analysis process. A client whose data is stored on the cloud, e.g., in system database 112, is selected using box 14104. The client data is then moved to system client 110 upon activating button 14106. If box 14108 is selected, then any EMS data stored on the cloud will also be transferred to system client 110. Additional EMS data can be imported directly from HVAC server 114 when there is a BACnet connection available. To do so, button 14110 is selected, which brings up user interface 14202 of FIG. 14B.

Figure 14B:
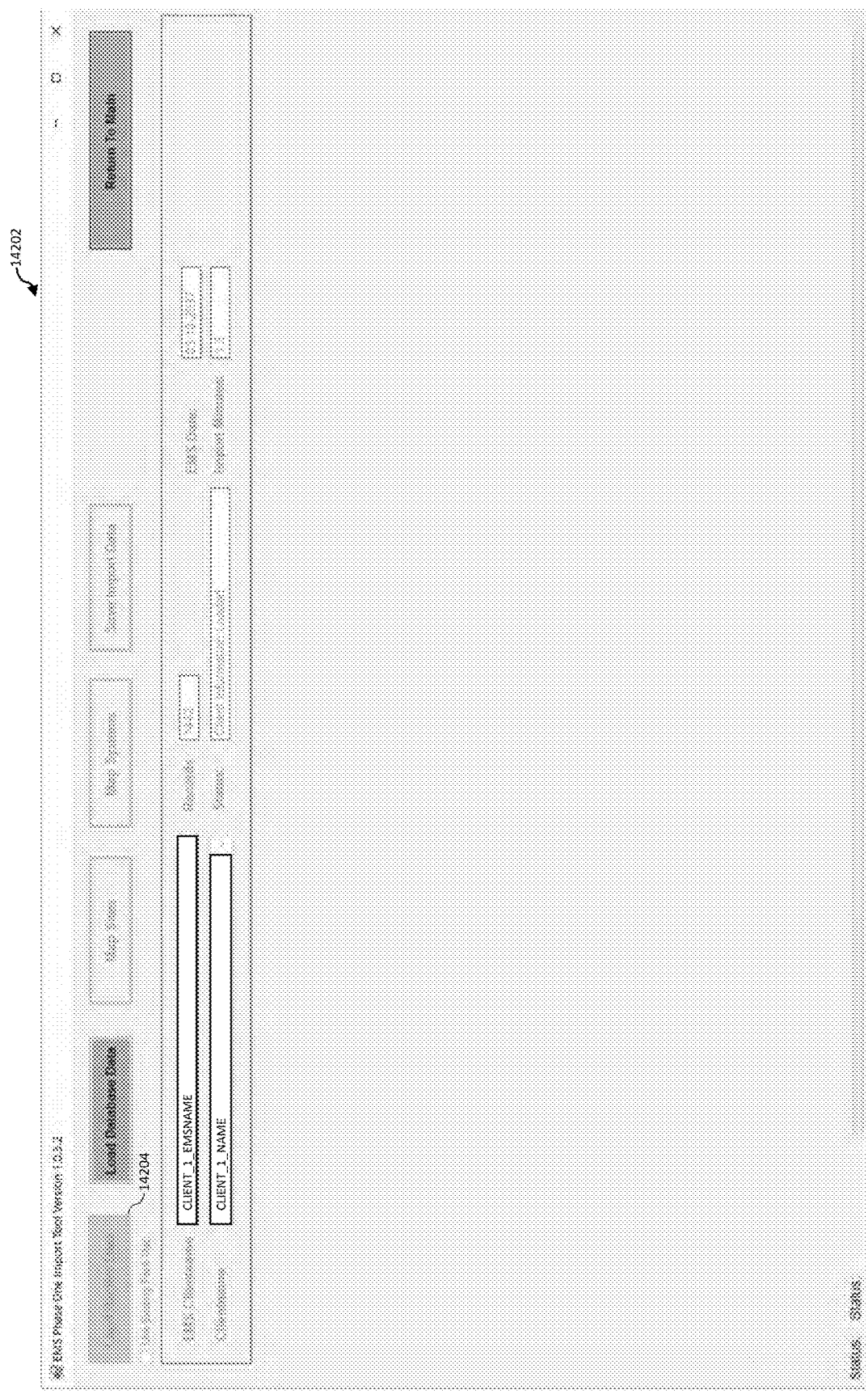

Referring to FIG. 14B, user interface 14202 allows EMS data to be imported from HVAC system 104. System client 110 is connected to HVAC server 114 through one or more of network 106 and network 118 and HVAC server 114 has BACNet connections to systems 132 through 140. Button 14204 was selected to load data from HVAC system 104.

Figure 14C:
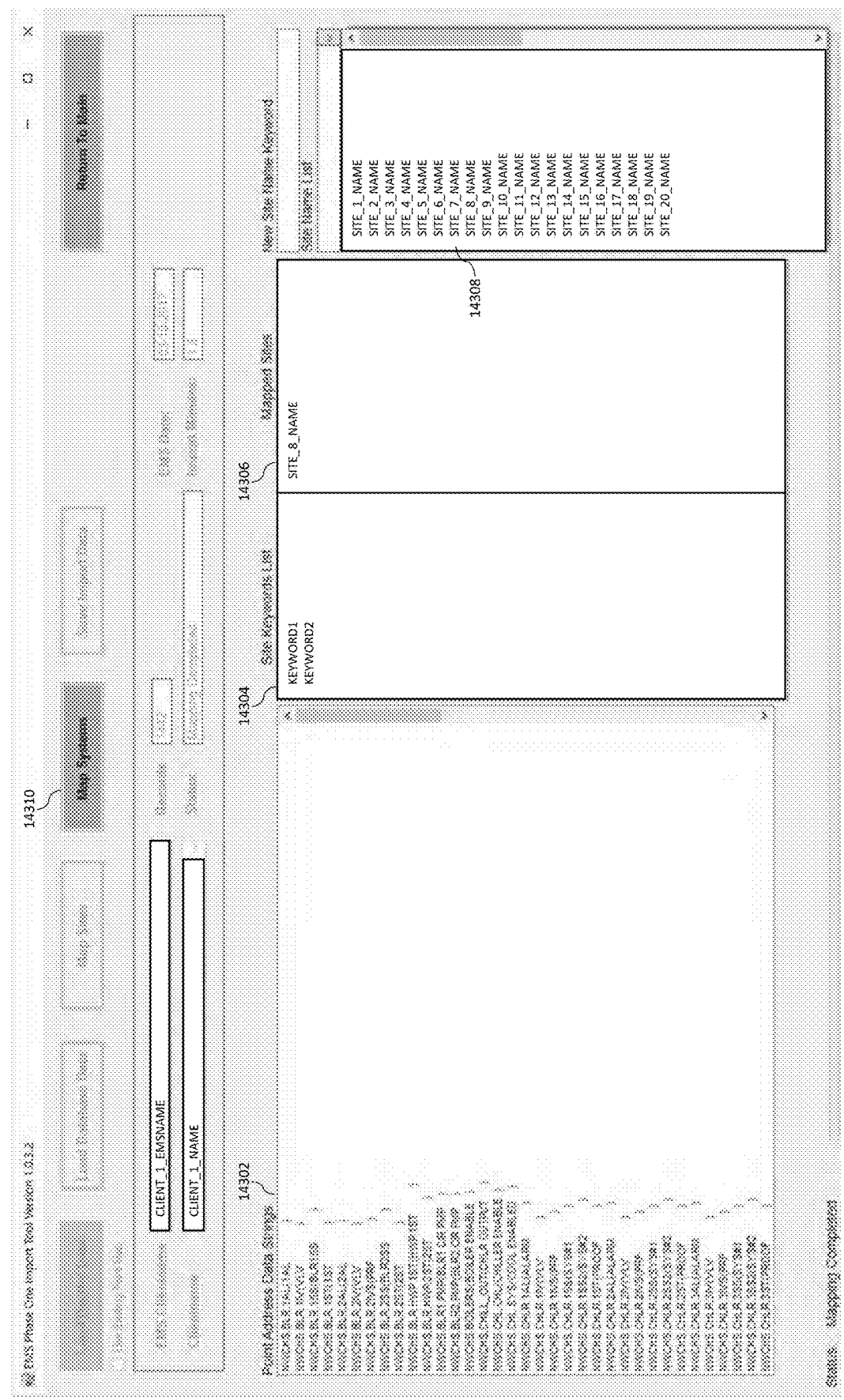

Referring to FIG. 14C, a full set of EMS data has been loaded and the point address data strings are mapped to the sites of the client.

Point address data strings list 14302 includes the point address data strings for all the points in the HVAC system 104 that provide EMS data, such as for each sensor and set point of each piece of equipment included in HVAC system 104. Each of the point address data strings are originally created by the owner of the equipment and there may be several names used in the point address data strings to refer to a single building or site. For example, chiller system 134 may use the string "RECBUILDING" to refer to a recreational center building while boiler system 136 uses the string "RECREATIONBLDG" to refer to the same building. Point address data strings list 14302 is filtered to only show strings that include strings in site keywords list 14304.

Mapped sites list 14306 includes the name of each site that is mapped to point address data strings list 14302 and site keywords list 14304. Site list 14308 includes the name of each site associated with the current client.

After loading the EMS data, point address data strings list 14302 is filtered with site keywords list 14304, which are identified by a user. After filtering point address data strings list 14302 by site keywords list 14304, one or more sites from site list 14308 are selected and added to mapped sites list 14306 to bind the filtered set of strings in point address data strings list 14302 to the sites identified in mapped sites list 14306. Selecting button 14310 allows for mapping the point address data strings to particular systems, as described in FIG. 14D.

Figure 14D:
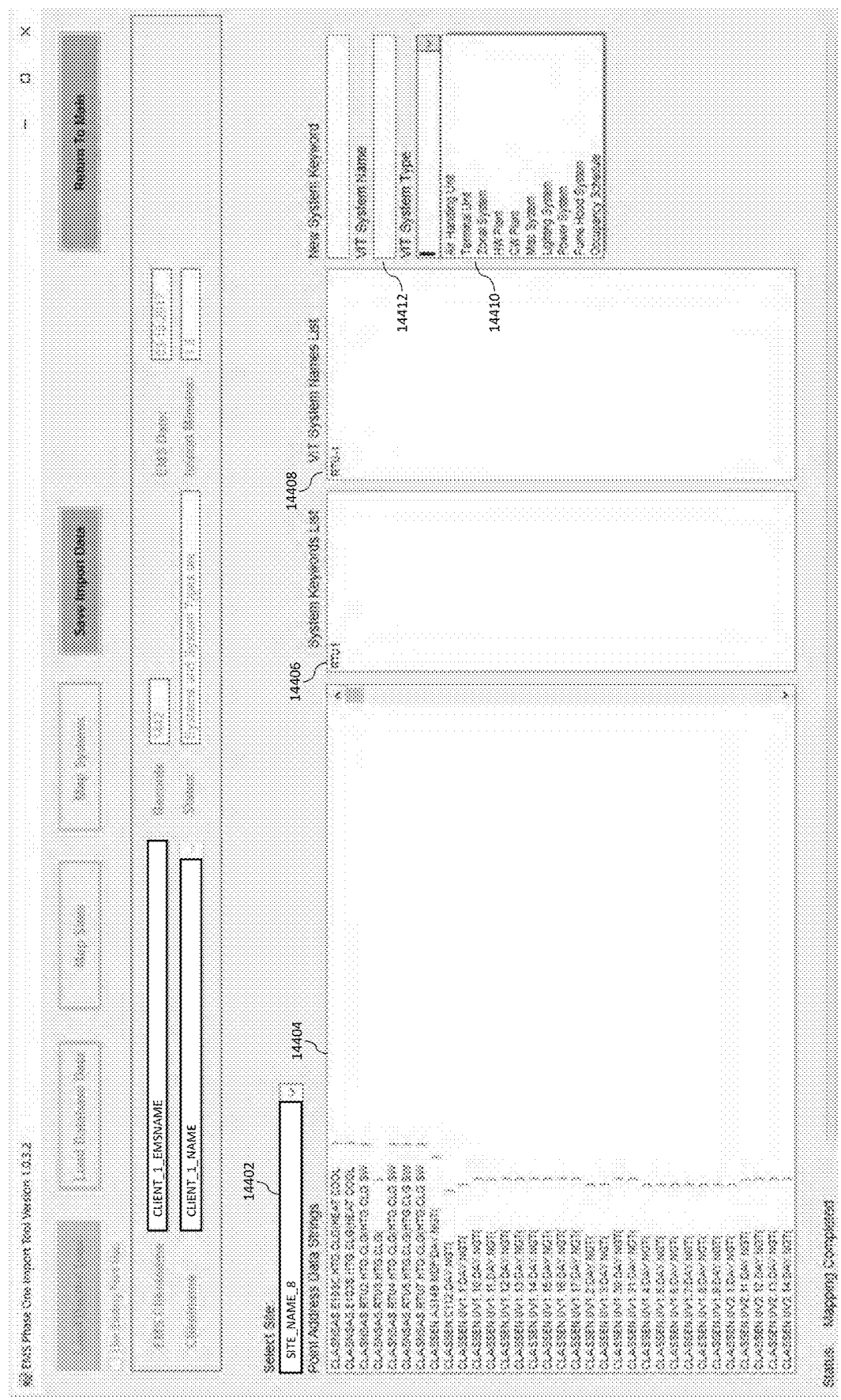

Referring to FIG. 14D, after mapping the point address data strings to particular sites, the point address data strings are mapped to specific systems of the particular sites. Site name 14402 identifies the current site that is selected and being mapped. Point address data strings list 14404 identify the points in the HVAC system 104 that provide data.

System keywords list 14406 includes one or more keywords used to filter the strings in point address data strings list 14404. System names list 14408 identifies one or more systems to which the strings in point address data strings list 14404 will be mapped. System types list 14410 identifies the type of system.

After selecting site name 14402 with a list box, point address data strings list 14404 is populated with all of the strings mapped to site name 14402. Point address data strings list 14404 is then filtered with the strings in system keywords list 14406 so that each filtered string that remains in point address data strings list 14404 includes one or more of the strings in system keywords list 14406.

A system type is then selected and named by selecting the type from system types list 14410 and entering a name into box 14412. Pressing enter after typing a name into box 14412 adds the name to system names list 14408, associates the selected type to the name, and maps the filtered strings from point address data strings list 14404 to the name, such as RTU-1.

Figure 14E:
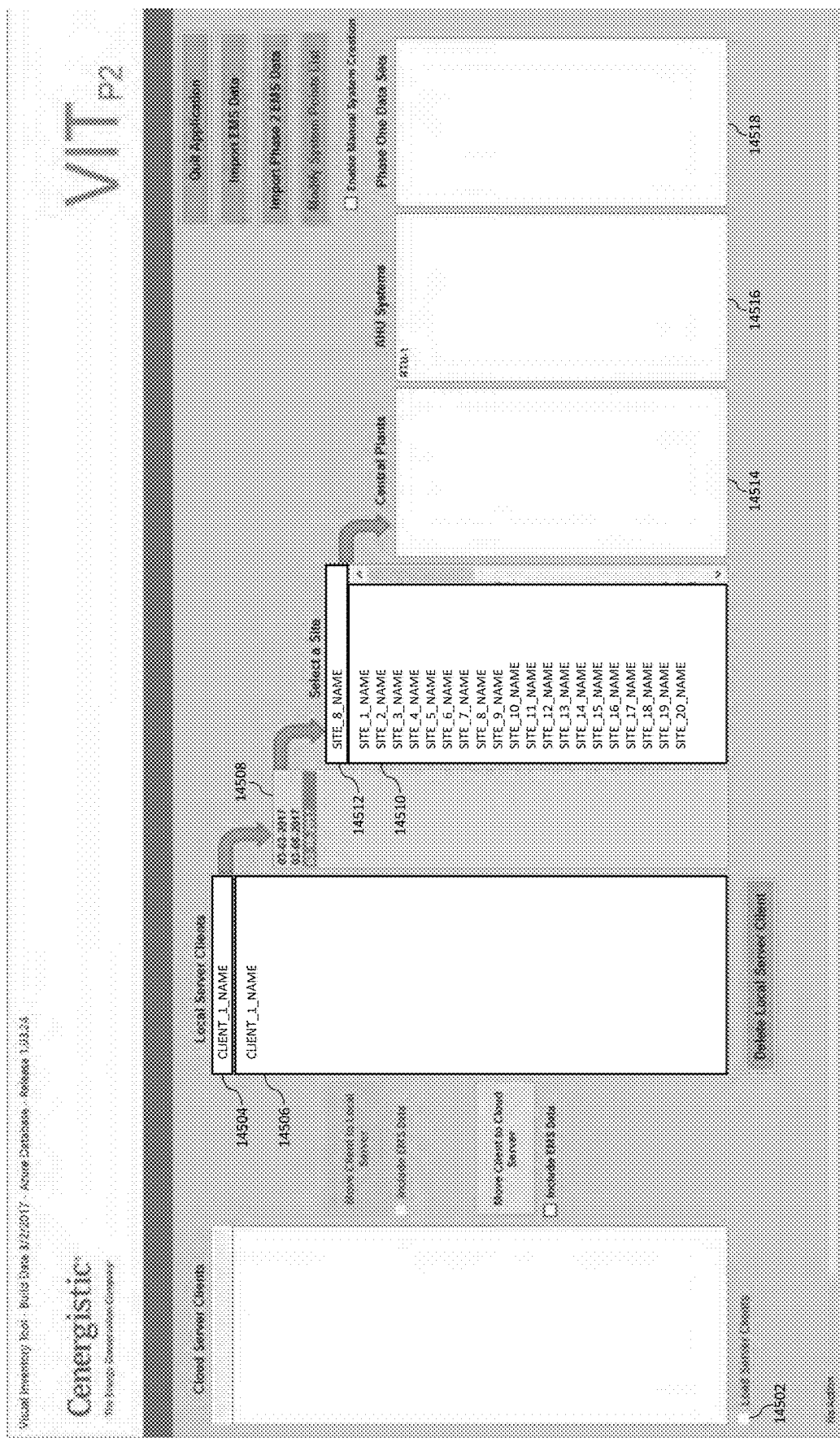

Referring to FIG. 14E, user interface 14102 is updated after importing the EMS data. Box 14502 is unchecked so that the list of cloud server client is empty. Client 14504 from local server clients list 14506 is selected. EMS data selection list 14508 allows for the selection of a set of EMS data that is associated with selected client 14504. After selecting a set of EMS data, site list 14510 is populated with all of the sites associated with the selected set of EMS data. Site 14512 is selected from site list 14510, which causes the population of central plants list 14514, systems list 14516, and phase one data set list 14518. Double clicking on a string in systems list 14516 initiates the analysis of the system identified by the selected string.

Figure 14F:
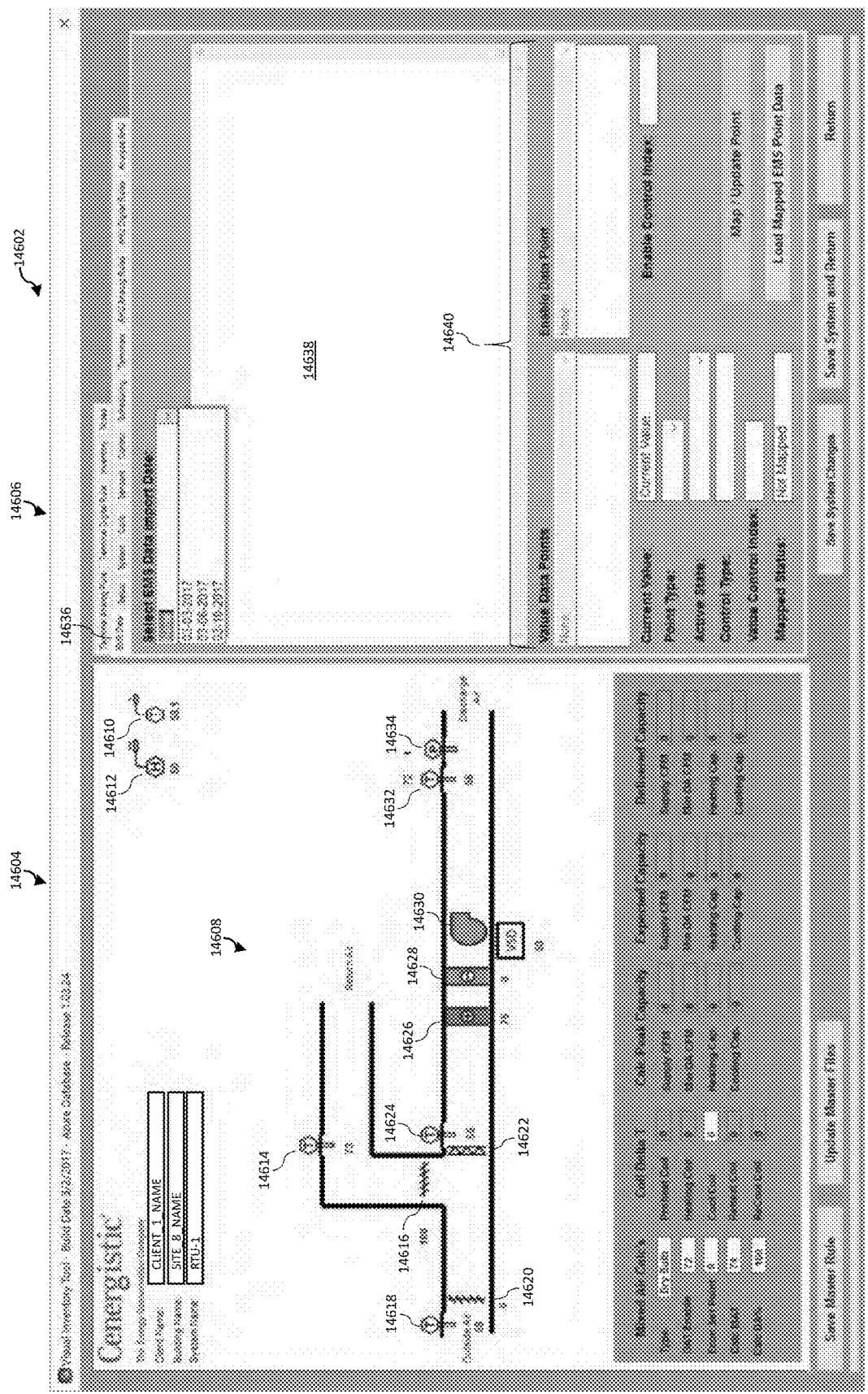
FIG. 14F is a user interface for selecting data to use in the simulation of a preferred embodiment.
Figure 14G:
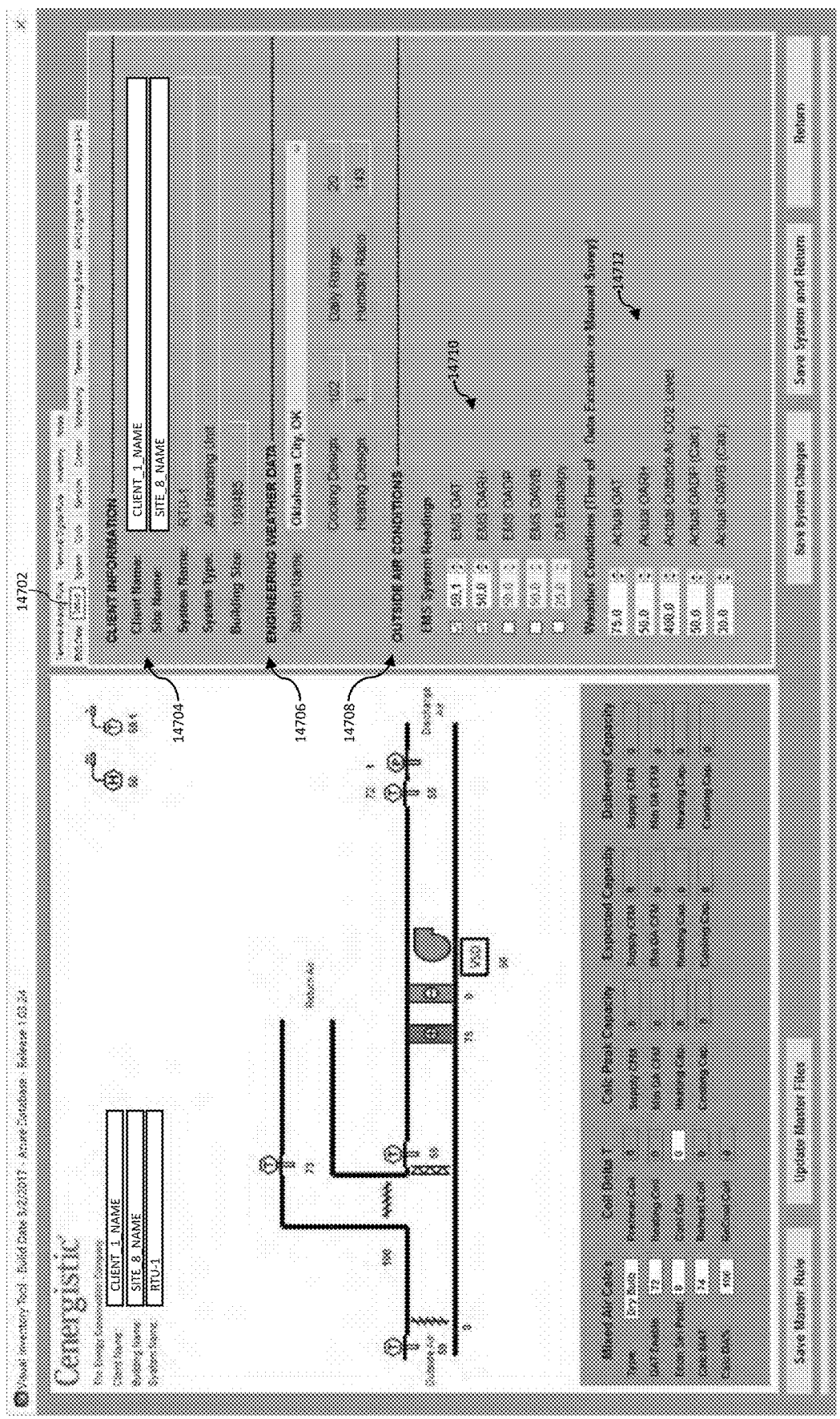
FIG. 14G is a user interface of a setup tab of a preferred embodiment.
Figure 14H:
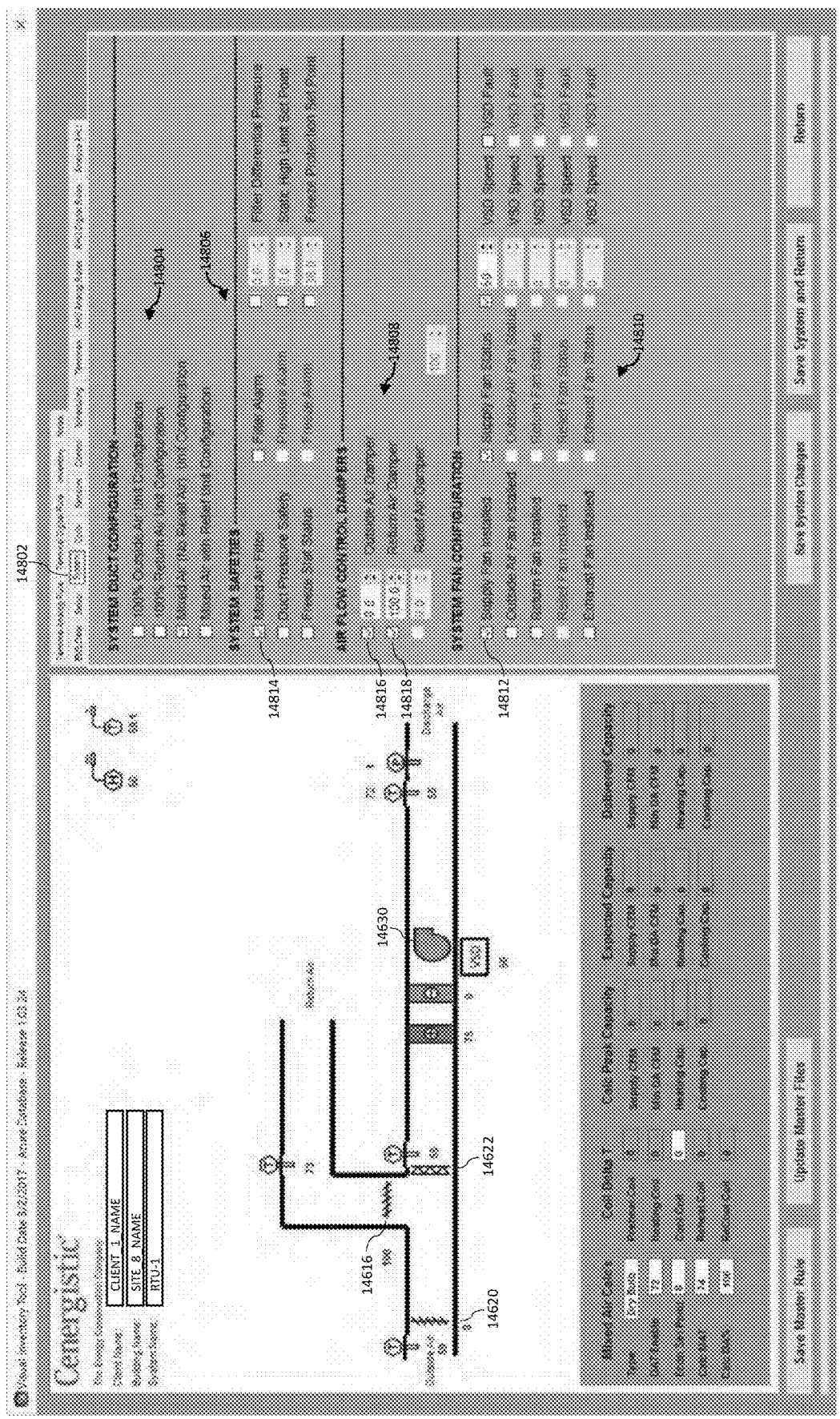
FIG. 14H is a user interface of a system tab of a preferred embodiment.
Figure 14I:
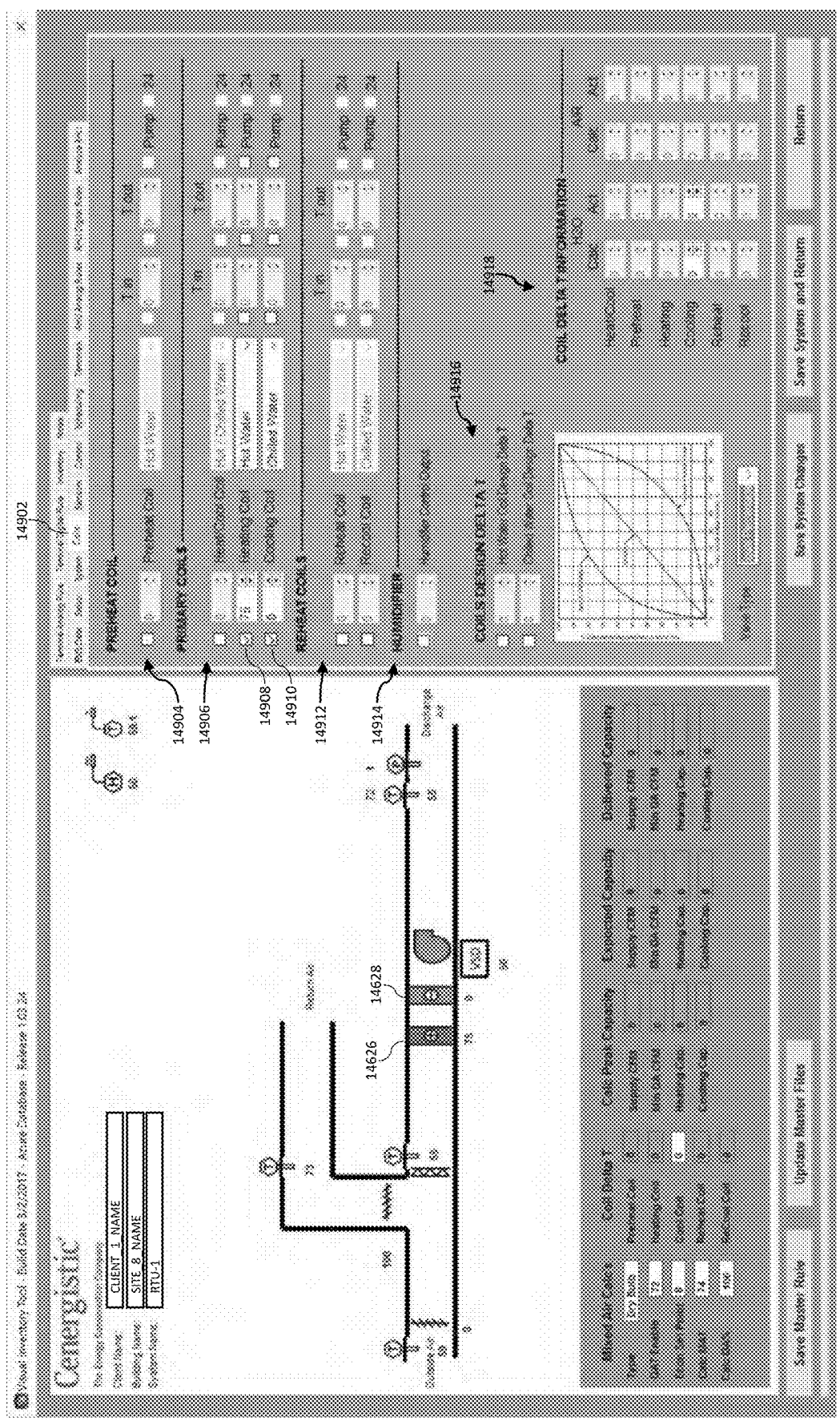
FIG. 14I is a user interface of a coils tab of a preferred embodiment.
Figure 14J:
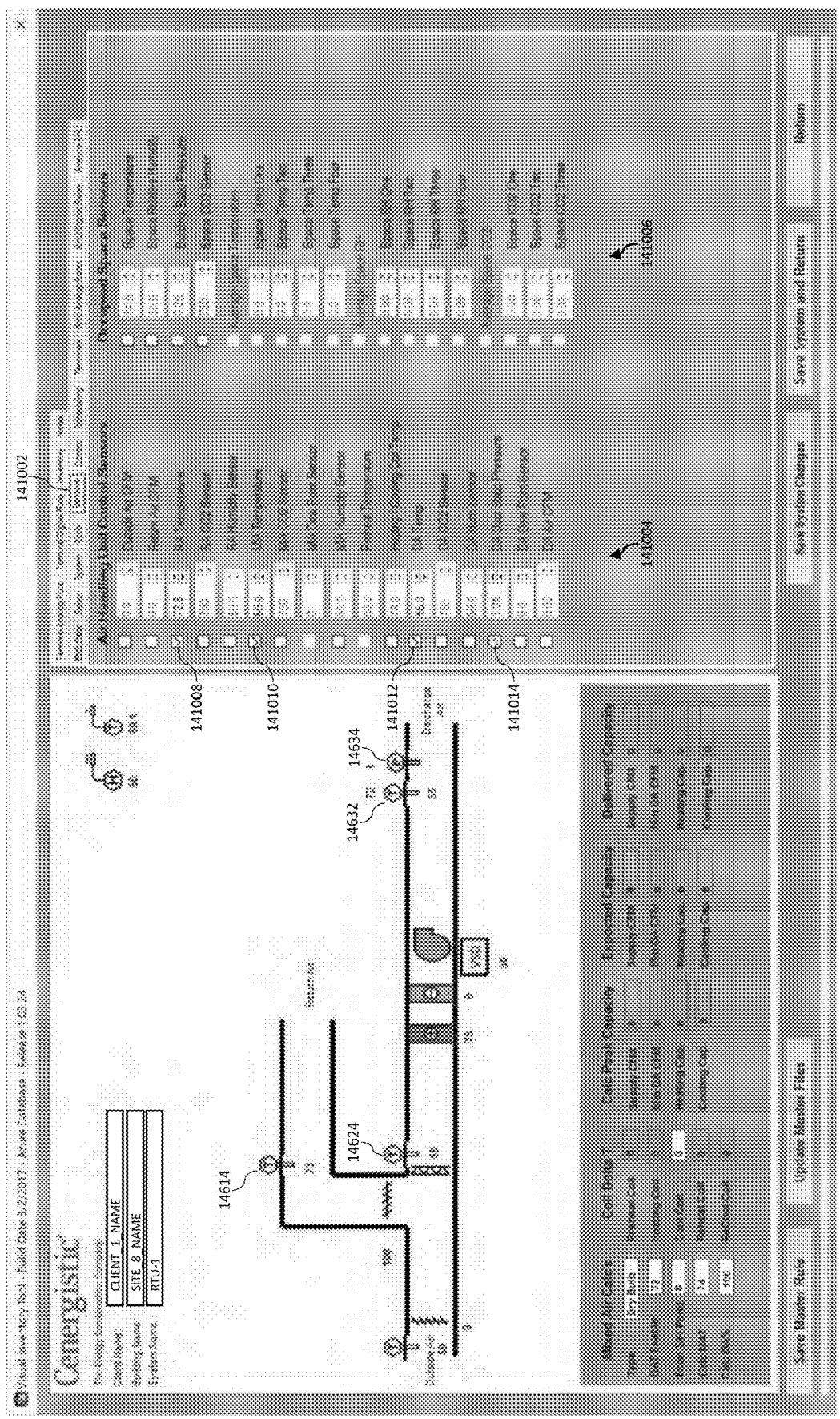
FIG. 14J is a user interface of a sensors tab of a preferred embodiment.
Figure 14K:
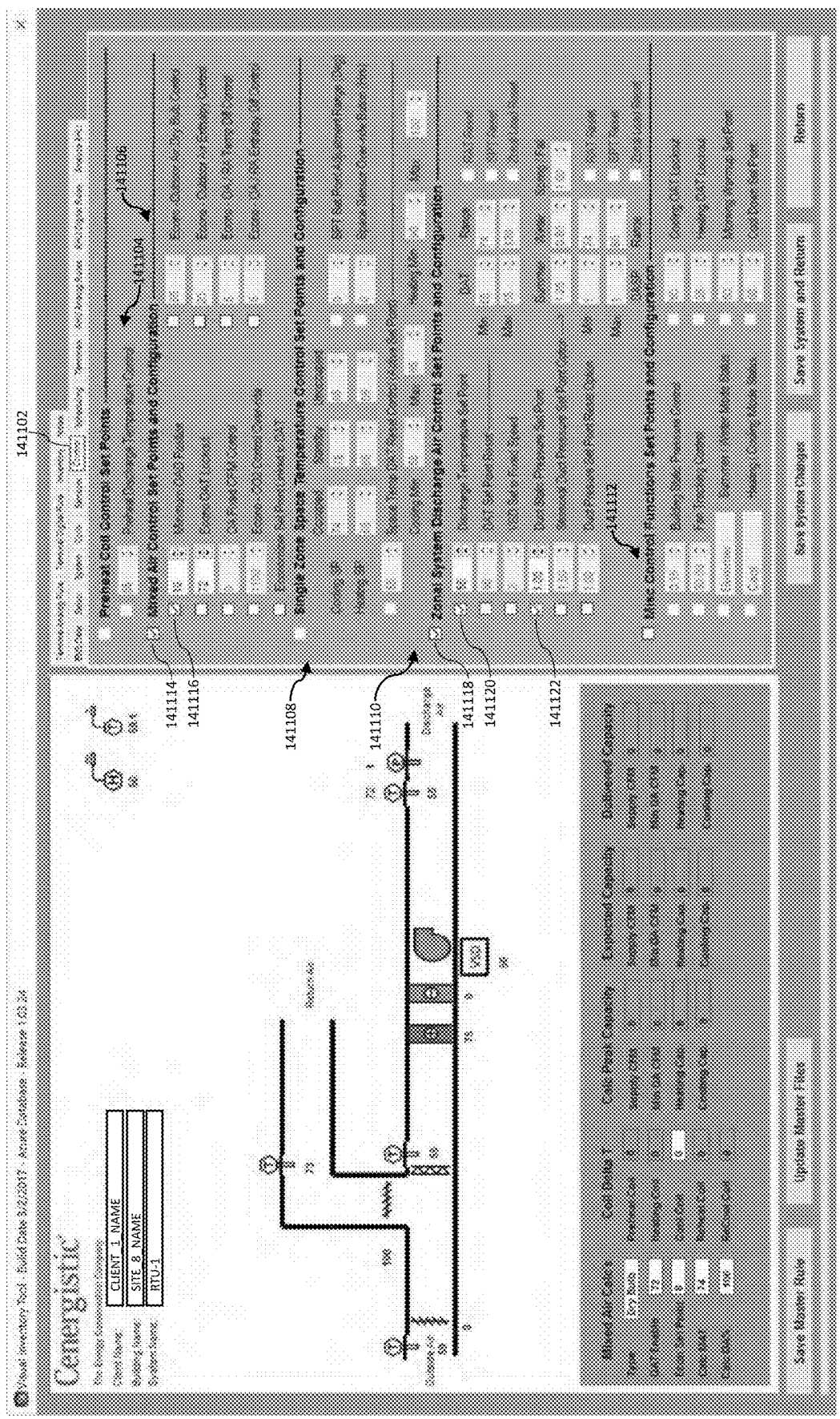
FIG. 14K is a user interface of a control tab of a preferred embodiment.
Figure 14L:
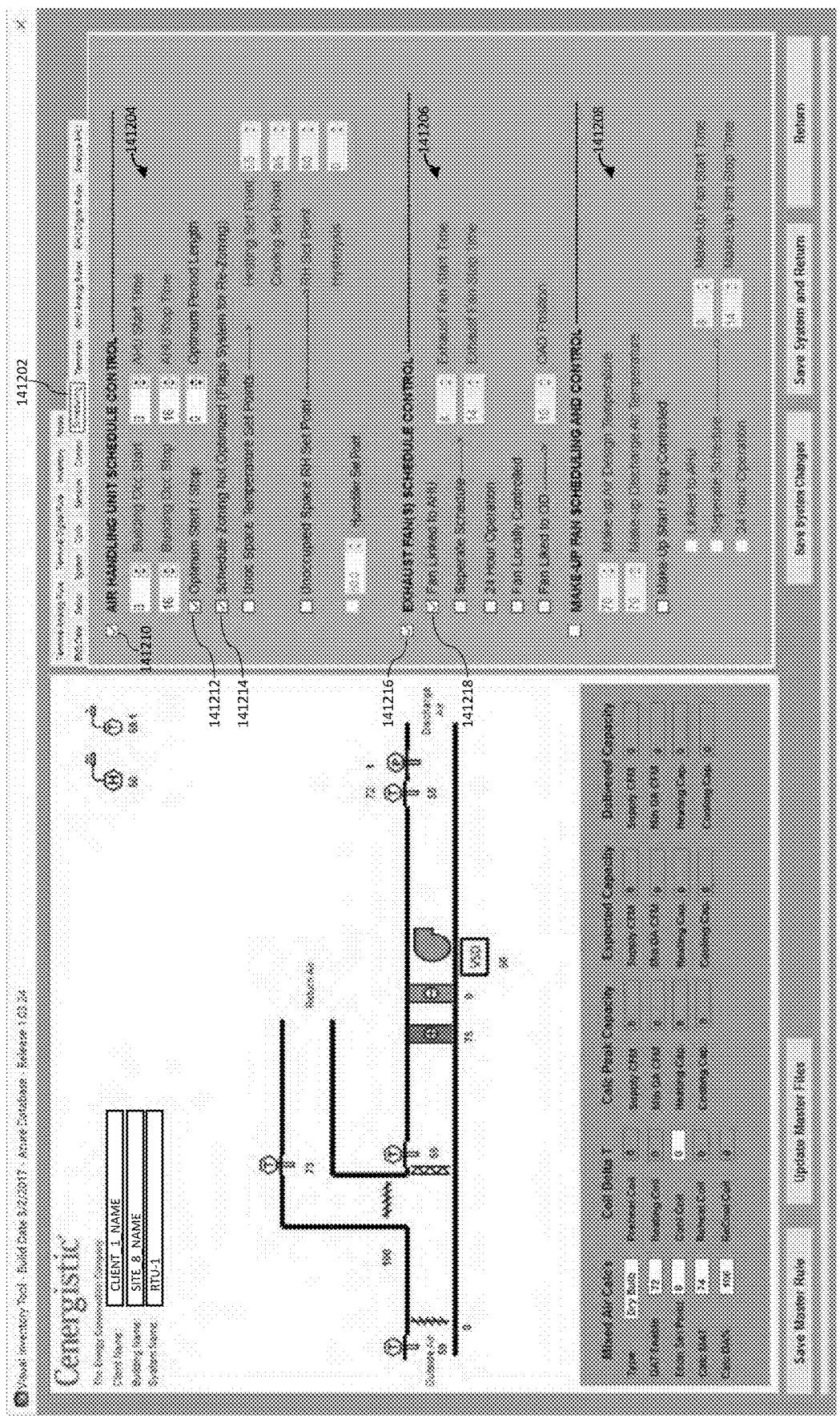
FIG. 14L is a user interface of a scheduling tab of a preferred embodiment.
Figure 14M:
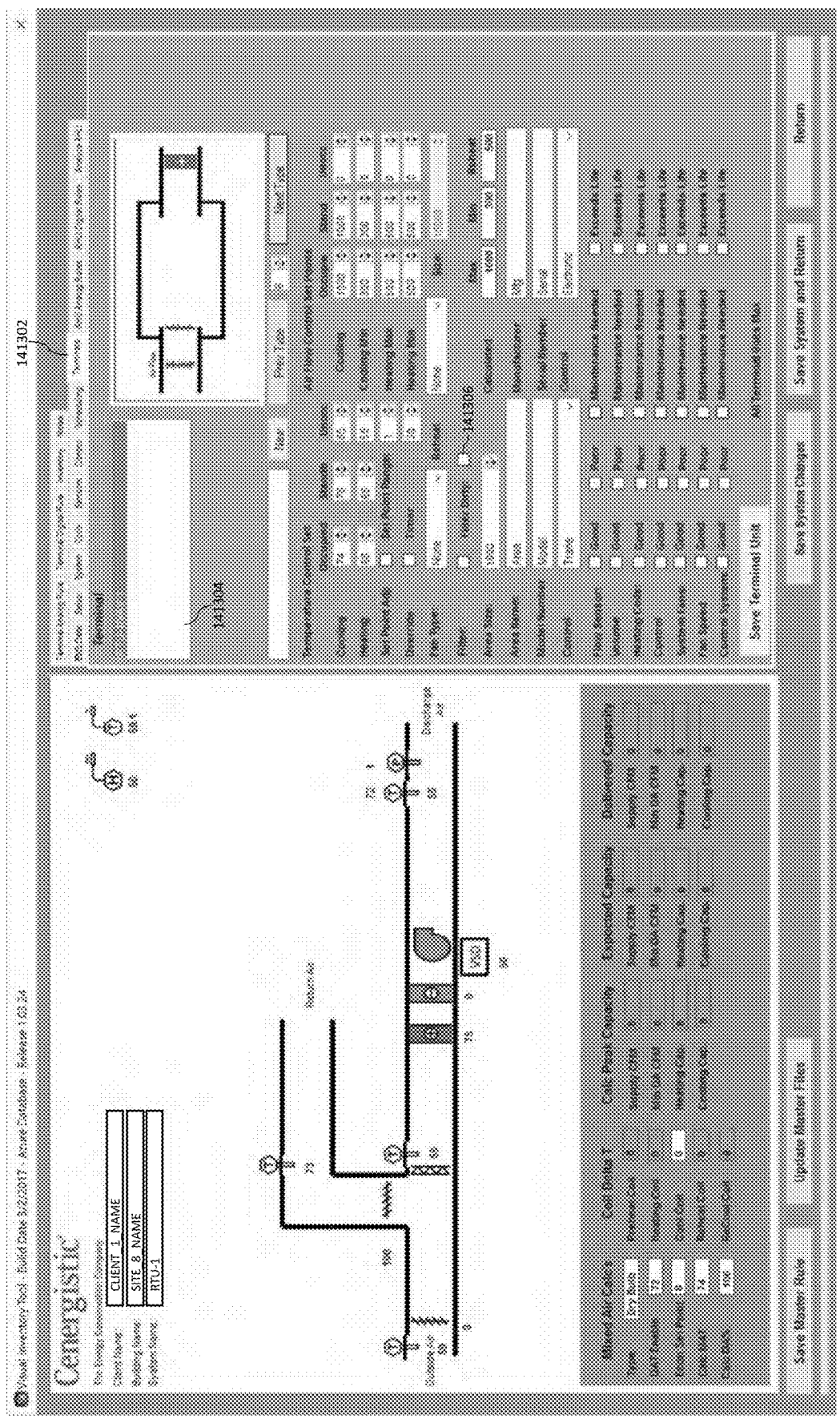
FIG. 14M is a user interface of a terminals tab of a preferred embodiment.
Figure 14N:
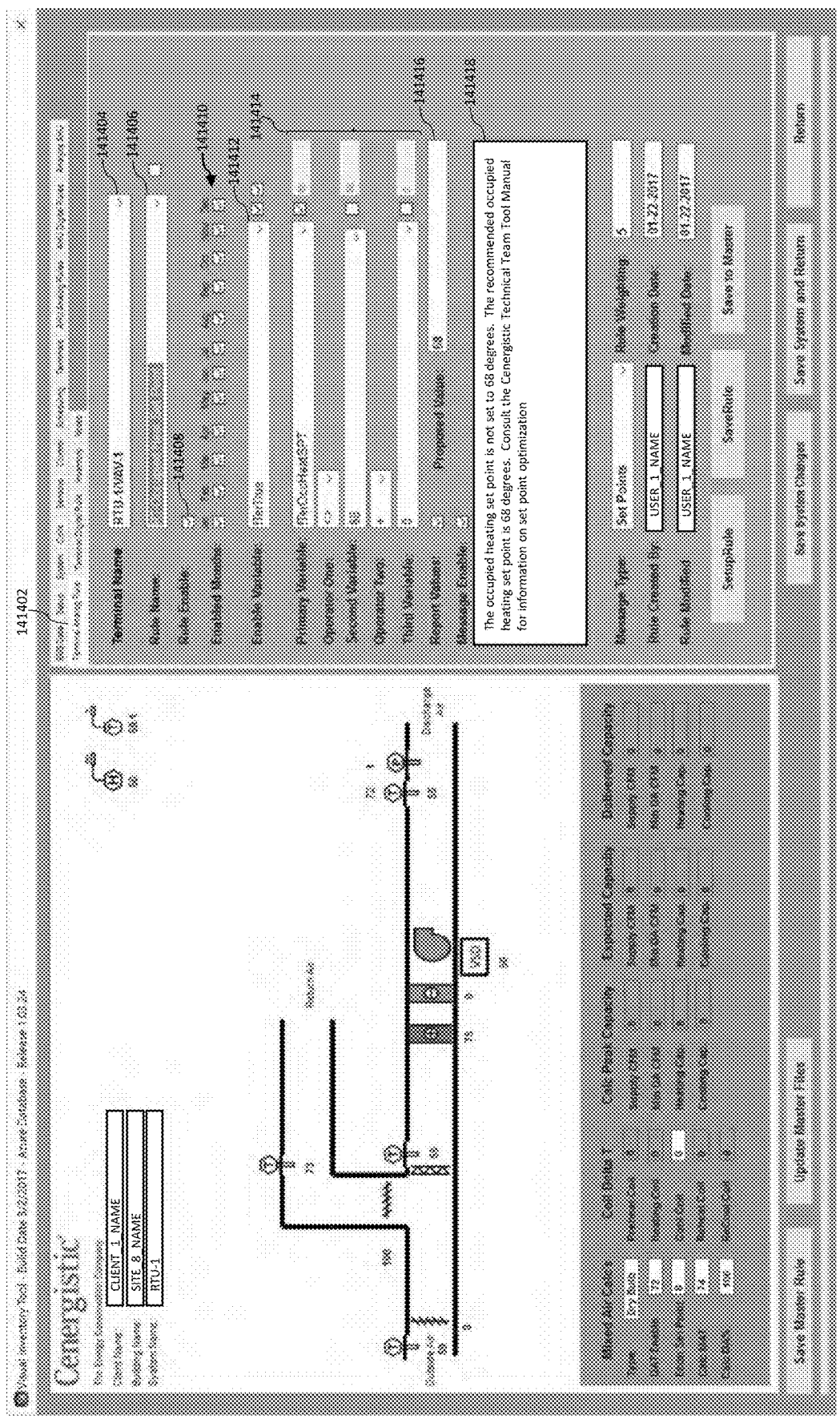
FIG. 14N is a user interface of a terminal analog rule tab of a preferred embodiment.
Figure 140:
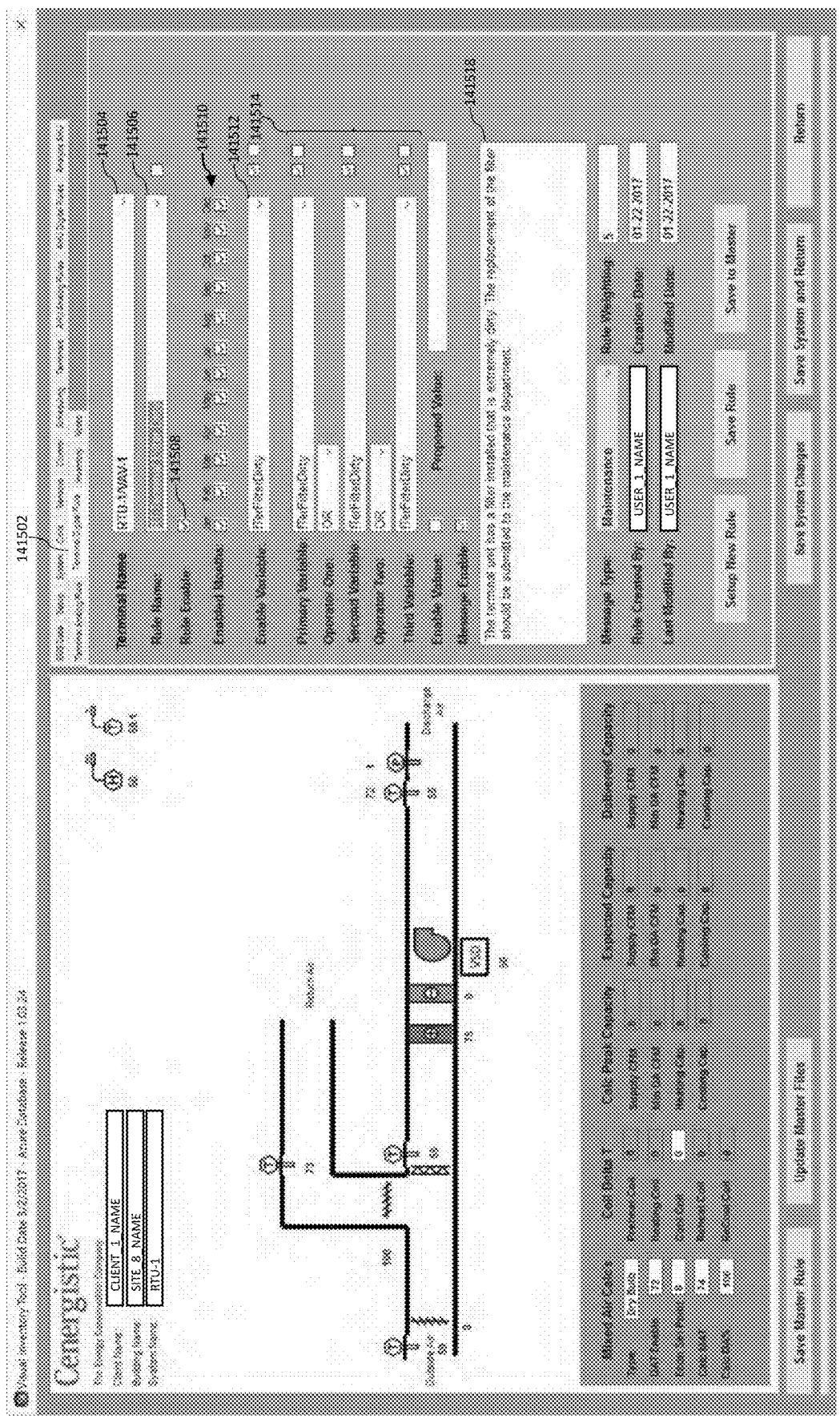
Figure 14P:
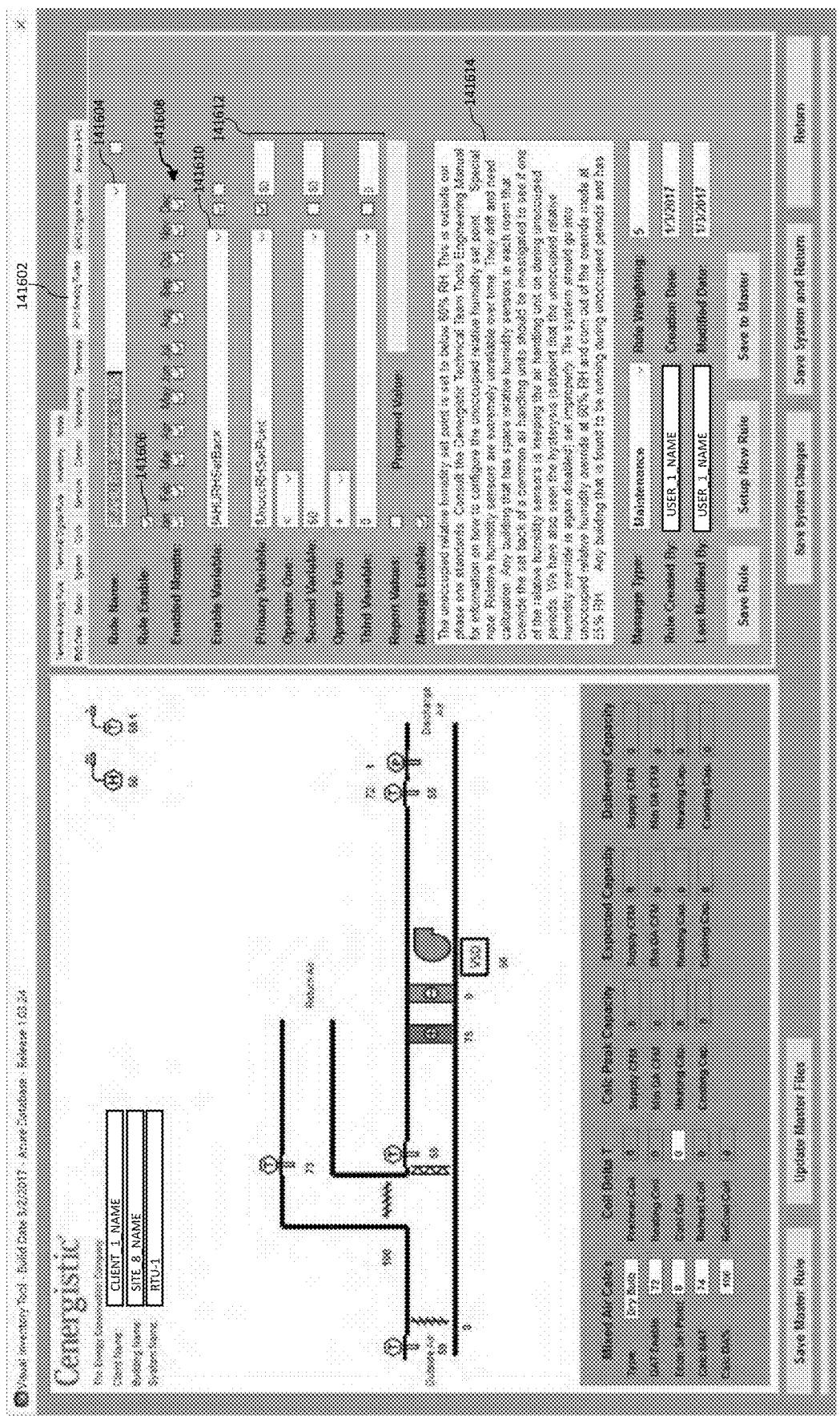
FIG. 14P is a user interface of a system analog rule tab of a preferred embodiment.
Figure 14Q:
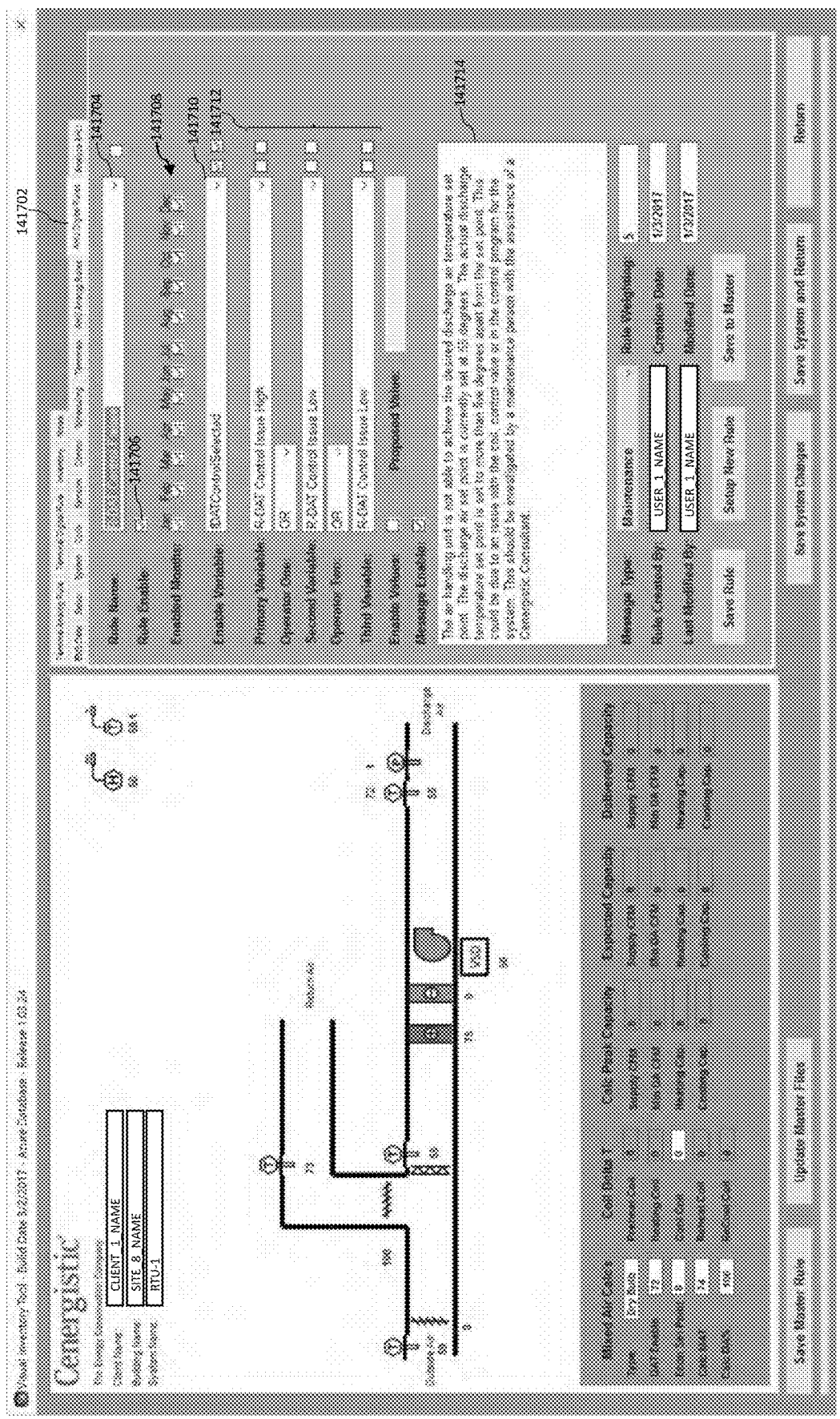
FIG. 14Q is a user interface of a system digital rule tab of a preferred embodiment.
Figure 14R:
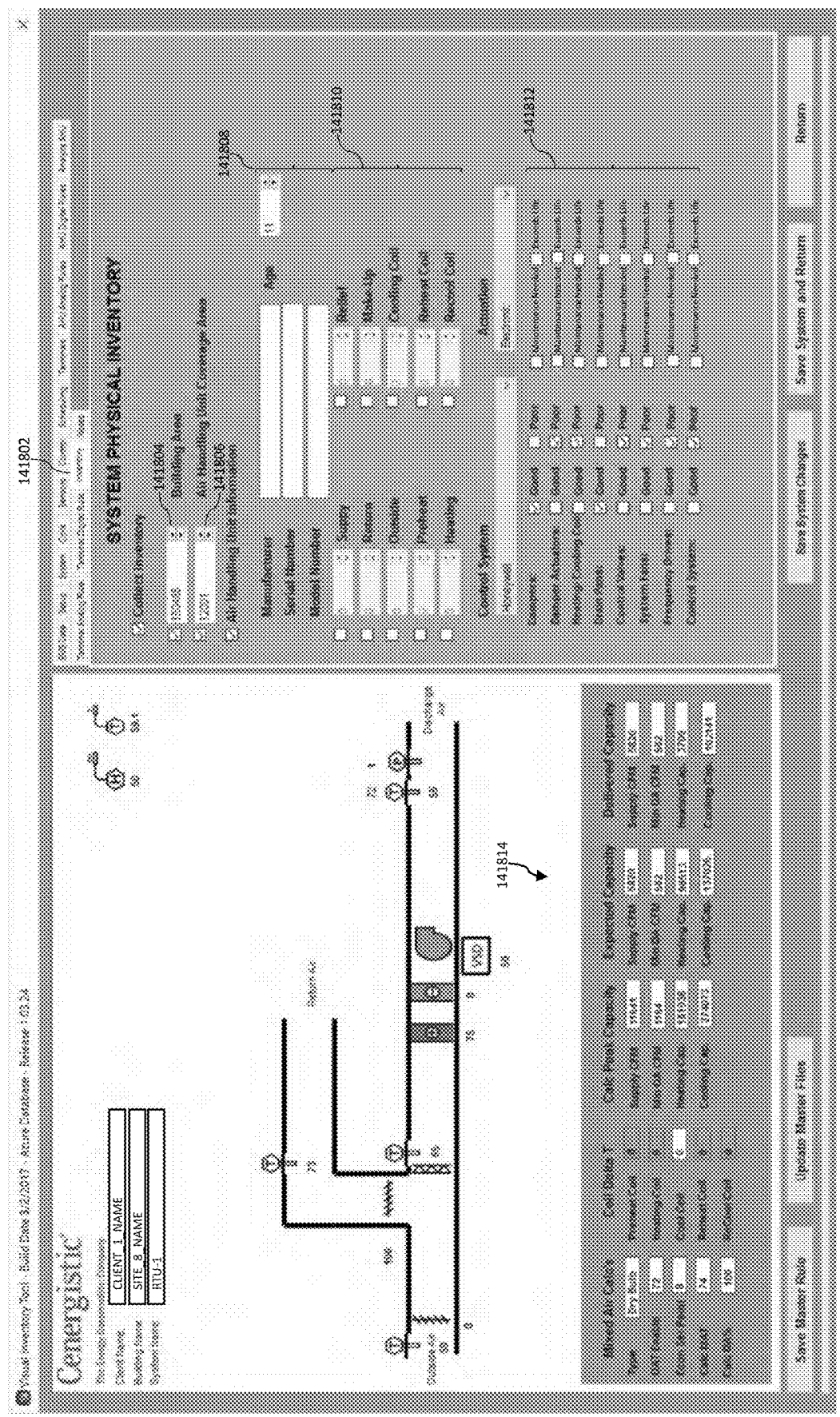
FIG. 14R is a user interface of an inventory tab of a preferred embodiment.
Figure 14S:
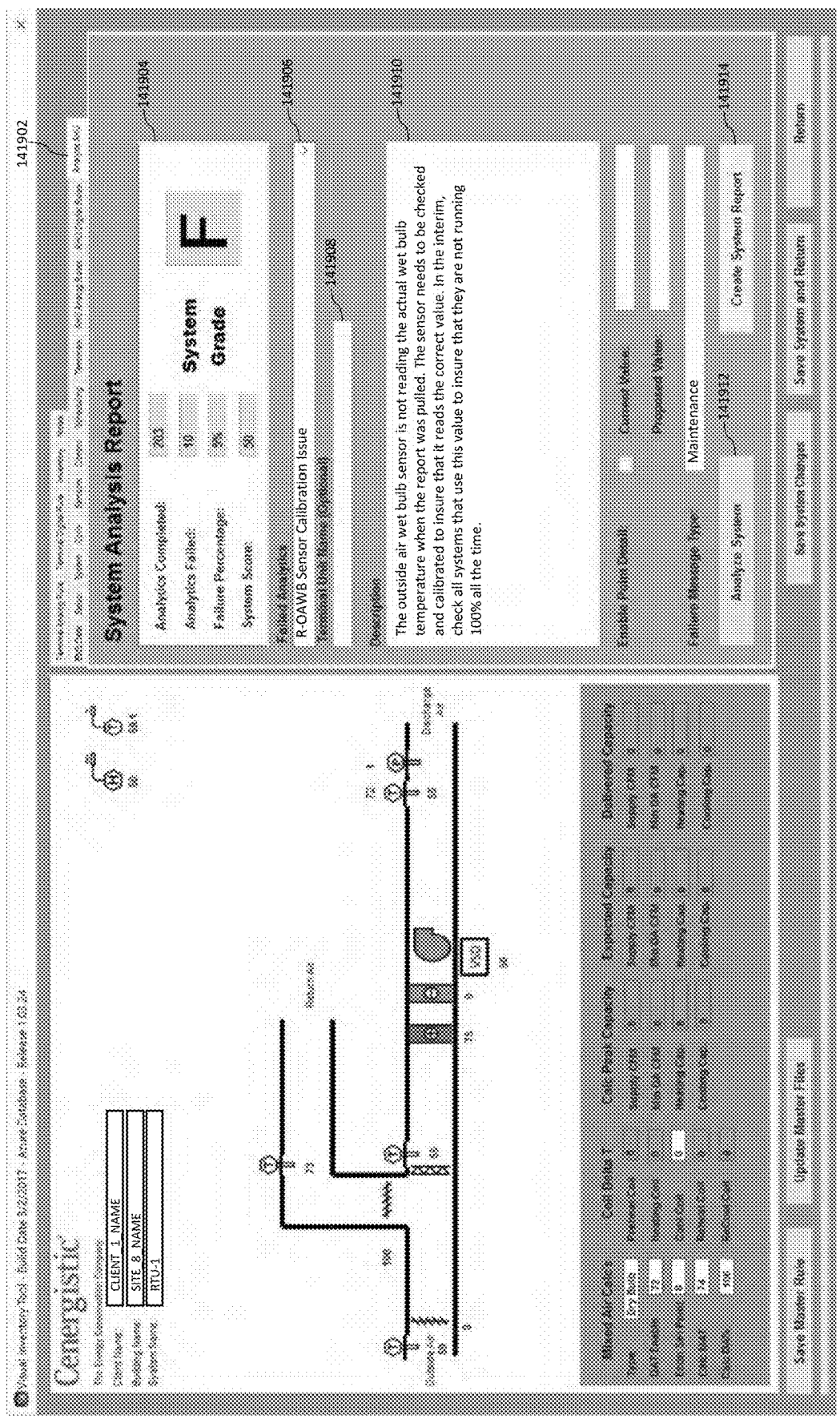
FIG. 14S is a user interface of an analysis tab of a preferred embodiment.

FIGS. 14F through 14S show one example of a user interface to control the simulation of a system or subsystem of HVAC system 104. As shown, the simulation of an air handling unit, such as ventilation system 132, is being controlled with the user interface. The system can simulate the other systems and subsystems of HVAC system 104 with a similar user interface that includes system specific elements. Certain tabs and certain controls of the tabs are specific to the type of system being simulated, while other tabs and controls are generic to all systems. For example, system tab 14802 and sensors tab 141002 of the embodiment shown include user interface controls that are specific to an air handling unit and may not be shown for a chiller system. Analog rules tab 141602 and digital rules tab 141702 are generic for the different types of systems even though the rules that are constructed with analog rules tab 141602 and digital rules tab 141702 are specific to the selected type of system.

Referring to FIG. 14F, user interface 14602 controls the analysis of the selected system. User interface 14602 includes view window 14604 and control window 14606.

View window 14604 displays an image of system 14608, which will be analyzed. System 14608 includes temperature sensor 14610, humidity sensor 14612, temperature sensor 14614, damper 14616, temperature sensor 14618, damper 14620, filter 14622, temperature sensor 14624, heating coil 14626, cooling coil 14628, and fan 14630.

Temperature sensor 14610 and humidity sensor 14612 measure the temperature and humidity of the outside air. Temperature sensor 14614 measures the temperature of the return air. Damper 14616 controls how much return air is being allowed into the system. Temperature sensor 14618 measures the outside air temperature and damper 14620 controls how much outside air can flow into the system. Filter 14622 filters the air flowing through system 14608. Heating coil 14626 and cooling coil 14628 heat or cool the air. Fan 14630 moves air through system 14608. Temperature sensor 14632 and pressure sensor 14634 measure the temperature and pressure of the discharge air.

Control window 14606 includes several tabs. Selection of EMS data tab 14636 shows the display used to select which set of EMS data to analyze. The points from the EMS data are mapped to corresponding portions of system 14608. In one embodiment, the points from the EMS data are listed in box 14638 and then mapped using the controls in boxes 14640.

Referring to FIG. 14G, setup tab 14702 identifies the client information, engineering weather data, and outside air conditions. The Client Information section 14704 identifies the client name, site name, system name, the system type, and the building size. The Engineering Weather Data section 14706 identifies the name of the weather station used for the model, which should be the closest weather station to the actual system, and identifies the cooling design days, heating design days, daily range, and humidity ratio for the building. The Outside Air Conditions section 14708 includes controls 14710 and 14712 related to the outside air conditions. EMS system readings are prepopulated but can be overridden using EMS controls 14710. Weather data supplied by the weather station is downloaded from the internet and is used to populate weather controls 14712. The weather data can be overridden using weather controls 14712.

Referring to FIG. 14H, system tab 14802 includes several controls used to specify one or more subsystems. In the embodiment shown, the user interface elements of system tab 14802 relate to an air handling unit, different controls would be provided for different types of units, such as for chiller systems, heater systems, and lighting systems. The System Duct Configuration section 14804 allows for the selection of the type of air handling as one of a 100% outside air unit configuration, a 100% return air unit configuration, a mixed air unit with no relief air configuration, and a mixed air with relief unit configuration. The System Safeties section 14806 includes widgets for identifying safety systems that are part of the air handling unit. The Air Flow Control Dampers section 14808 includes user interface elements to identify and control the air dampers of the system. The System Fan Configuration section 14810 allows for the identification of the configurations of the fans of the system, which can include a supply fan, an outside air fan, a return fan, a relief fan, and an exhaust fan. Each fan can have a status, a speed, an identification of whether the fan includes a variable speed drive (VSD), and whether there is a fault reported by the fan. In the embodiment shown, the system is an air handling unit that includes supply fan 14630, which is specified by checking box 14812. No other fans are included with this system so that the boxes below box 14812 are not checked. If other fans were included, additional boxes would be checked and an icon of the selected fan would appear in view window 14604 as a part of system 14608. Incorporation of mixed air filter 14622, outside air damper 14620, and return air damper 14616 into the model for the system is controlled by selecting boxes 14814, 14816, and 14818 respectively. Each system for each client can be different and system tab 14802 allows the model to be customized to the actual components in the system of a particular client.

Referring to FIG. 14I, coils tab 14902 includes graphical controls that identify and adjust components and settings related to the heating and cooling coils of the system. The Preheat Coil section 14904 includes user interface widgets for specifying a preheat coil, which is not selected. The Primary Coils section 14906 allows for the control of the simulation of the primary coils of the system. As shown, heating coil 14626 is included in the simulation by checking box 14908 and cooling coil 14628 is included in the simulation by checking box 14910. The Reheat Coils section 14912 controls the simulation with respect to any reheat coils that are part of HVAC system 104. Control of simulation of a humidifier in the system is had through the Humidifier section 14914. The Coils Design Delta T section 14916 includes user interface elements for specifying the temperature change (delta T) that the heating and cooling coils were designed for and also identifies the type of valve as one of quick opening, linear, and equal percentage. The Coil Delta T Information section 14918 calculates the heating and cooling that should be realized by the system based on the design delta T and valve type, which can be compared to the actual heating and cooling amounts observed in the system. One or more rules are used to compare the calculated and actual values to determine if the system is working properly. Each of the components can be added to the model of the system based on whether the real-life system includes those components by selecting the appropriate check box. Each component that is included is associated with one or more rules that affect the total system output and can be analyzed.

Referring to FIG. 14J, sensors tab 141002 several graphical user interface elements that are used to control which sensors will be included in the simulation of the system. The Air Handling Unit Control Sensors section 141004 includes user interface elements that identify several sensors that can be included in the system being simulated, including sensors for outside air cubic feet per minute (CFM), return air cubic feet per minute, return air (RA) temperature, return air CO2, return air humidity, mixed air (MA) temperature, mixed air CO2, mixed air dew point, mixed air humidity, preheat temperature, heating/cooling coil temperature, discharge air (DA) temperature, discharge air humidity, discharge air duct static pressure, discharge air dew point, and discharge air cubic feet per minute. The Occupied Space Sensors section 141006 allows for control of the simulation of additional sensors, including space temperature, space relative humidity, building static pressure, space CO2, average space temperatures, average space relative humidities, and average space CO2 levels. Box 141008 enables return air temperature sensor 14614, box 141010 enables mixed air temperature sensor 14624, box 141012 enables discharge air temperature sensor 14632, and box 141014 enables discharge air duct static pressure sensor 14634. The remaining boxes are unchecked so that their respective sensors are not included in the simulation and are not shown in the view of the model. Actual data from the system is available for each of the sensors and is prepopulated into the user interface elements on sensor tab 141002. This prepopulated data can be adjusted for the simulation using the user interface elements on sensor tab 141002.

Referring to FIG. 14K, control tab 141102 includes user interface elements for controlling the set points and configurations of the components of the system. The Preheat Coil Control Set Points section 141104 allows for setting the preheat discharge temperature control. The Mixed Air Control Set Points and Configuration section 141106 includes user interface elements related to setting and identifying the set points and configurations of a minimum outside air damper (OAD) position, an econo outside air temperature (OAT) setting, an outside air fixed cubic feet per minute control setting, an econo CO2 control override setting, an econo outdoor air dry bulb control setting, an econo outdoor air enthalpy control setting, an econo outside air/return air (OA/RA) temperature difference control, and an OA/RA enthalpy difference control. The Single Zone Space Temperature Control Set Points and Configuration section 141108 includes user interface controls for specifying the cooling and heating set points for when the building is status is one of occupied, standby, and unoccupied. The Zonal System Discharge Air Control Set Points and Configuration section 141110 includes widgets for controlling the set points and configurations as shown in FIG. 14K that are related to the zones that are serviced by the system. The Miscellaneous Control Functions Set Points and Configurations section 141112 provides elements, as shown in FIG. 14K, which control other portions of the system. As shown, Box 141114 is selected to identify that the simulation can include one or more mixed air control set points and configurations. Of the mixed air controls set points and configurations, box 141116 is selected to specify the minimum outside air damper position. Selection of box 141118 indicates that the simulation can include zonal system discharge air control set points and configurations. The set points and configuration for discharge air includes a discharge temperature set point, which is included in the simulation by checking box 141120, and includes a duct static pressure set point that is included in the simulation by selecting box 141122.

Referring to FIG. 14L, scheduling tab 141202 provides settings for identifying the operational schedule for the system. The Air Handling Unit Schedule Control section 141204 allows for control of the building schedule, including the occupancy start and stop times, the air handling unit start and stop times, and the other settings shown in FIG. 14L. The Exhaust Fan Schedule Control section 141206 provides user interface elements for controlling the schedules of exhaust fans, which can be linked to the schedule of the air handling unit. The Make-Up Fan Scheduling and Control section 141208 has user interface widgets to control the make-up fan schedule. Selection of box 141210 indicates that the simulation will include a schedule for control of the air handling unit system. The schedule includes building occupancy start and stop times in addition to air handling unit start and stop times. Box 141212 is selected to indicate that an optimum start and stop time is used. Selecting box 141214 indicates that the schedule zoning has not been optimized, such that the system may need to be re-zoned. By selecting box 141216, it is indicated that the exhaust fans also follow a schedule. Selection of box 141218 indicates that the schedule for the exhaust fans is linked to the schedule of the air handling unit (AHU).

Referring to FIG. 14M, terminals tab 141302 allows for editing the settings for multiple terminals of the air handling unit that is being simulated. Each terminal is associated with a zone that is serviced by the air handling unit. As shown in FIG. 14M, several controls are included for specifying the configurations and settings related to one or more zones. Box 141304 includes a list of strings that identify each terminal to be used in the simulation of the air handling unit. For each terminal, a plurality of settings can be edited, including temperature control set points and air flow control set points. Each terminal can be associated with a specific area, size, and equipment information. The condition of various parts of the terminal can also be specified as good, poor, maintenance needed, and exceeds life. Each piece of information captured on terminals tab 141302 is associated with one or more records of a database for the analysis system 102. For example, box 141306 is linked to a record named "fTerFilterDirty" so that when box 141306 is checked, fTerFilterDirty is set to true, which can be used by one or more digital rules of the system as explained below. The other pieces of information specified on terminals tab 141302 can each be used by one or more analog rules and digital rules.

Referring to FIG. 14N, terminal analog rule tab 141402 allows for the creation of analog rules that are associated with the terminals of the system. The terminal is selected with box 141404, which includes a drop down list of the terminals identified in box 141304 of FIG. 14M. The name of the rule is specified with box 141406 and whether or not the rule is enabled is specified with box 141408. Boxes 141410 identify which months of the year for which the rule is enabled. Enable variable 141412 identifies the name of the variable that enables the usage of the rule by the simulation. Controls 141414 are used to set the names of the primary, second, and third variables along with the first operator and second operator. For example, the primary variable is "fTerOccHeatSPT", operator one is "< >", and the second variable is "68". This rule checks to see if the occupied heating set point is not equal to 68 degrees. Box 141416 provides a proposed value for the set point associated with this rule. Box 141418 includes a message that explains the result of the rule and how to correct the issue related to the rule. All of the information captured on terminal analog rule tab 141402 is stored in a record of a database.

Referring to FIG. 14O, terminal digital rule tab 141502 provides the user controls for setting up a digital rule for a terminal. Box 141504 identifies the terminal that is associated with the current rule and box 141506 identifies the name of the rule. The digital rule is enabled when box 141508 is selected and the months for which the digital rule is active is set by boxes 141510. Box 141512 is used to identify the enablement variable for the digital rule, which must be true in order for the digital rule to be processed. Boxes 141514 are used to set the variables and operators for the digital rule. The primary, second, and third variables for this example are each set to "fTerFilterDirty" and operators one and two are set to "OR" so that if the fTerFilterDirty variable is true, then this rule will identify that the system has not passed this rule. Box 141518 provides a message that can be displayed when the rule is not passed and explains the significance of the rule and how to address the situation.

Referring to FIG. 14P, analog rules tab 141602 allows for the specification of the information needed for an analog rule of the system. Box 141604 is used to select and identify the name of the rule. The rule is enabled when box 141606 is selected. The months for which the rule will be active are set using boxes 141608. Box 141610 identifies the variable that enables processing of the rule by the system. The primary, second, and third variables along with operators one and two are set using boxes 141612. Box 141614 includes a message to be shown when the rule does not pass and explains how to address the issue. For the example shown, the rule checks to see if the primary variable "fUnoccRHSetPoint" is less than ("<") a constant of 60, which is 60% relative humidity. The message explains that the system did not pass the rule because humidity set point associated with the rule is set too low, i.e., below 60%.

Referring to FIG. 14Q, digital rules tab 141702 includes user interface elements and controls for setting up a digital rule for the system. Box 141704 is used to identify the name of the rule. Box 141706 is selected to enable the rule. Boxes 141708 are individually selected to identify the months for which the rule will be enabled. Boxes 141712 are used to identify the variables and operators used to determine if the system passes the rule and box 141714 includes a message for when the rule is not passed that explains how to address the situation. For example, the primary variable is set to "R-DAT Control Issue High", the second variable is set to "R-DAT Control Issue Low", and the third variable is superfluous and set to "R-DAT Control Issue Low". Operators one and two are logical OR operators so that the rule will be true (i.e., the system will not pass) if either "R-DAT Control Issue High" or "R-DAT Control Issue Low" evaluate to true. When the system does not pass, the message in box 141714 can be displayed to explain that the desired discharge air temperature set point is either too low or too high compared to the actual discharge air temperature set point.

Referring to FIG. 14R, inventory tab 141802 allows inventory data to be collected about the system. The inventory data includes an identification of the building area in box 141804, identification of the coverage area in box 141806. The manufacturer name, serial number, model number, and system age are set in boxes 141808. Ages for each of the sub systems can be supplied using boxes 141810. The condition of each of the subsystems is identified with boxes 141812.

Area 141814 shows a simulation of the system capacity based on the size of the system based on the buildings information, the area covered by the systems, and the engineering weather data for the site. The system uses the performance curves of the system devices along with the data values to predict the point on the performance curve the system should be when the data was captured. It then uses engineering calculations (air balance calculations) to verify that the unit is delivering the correct amount of capacity. Area 141814 shows the calculated the peak capacity of the system, the expected capacity of the system, and the delivered capacity of the system. Discrepancies between the expected capacity and the delivered capacity helps to identify if there are issues with the system and helps to quantify the impact of those issues. As shown, the delivered heating and cooling capacities are below the expected heating and cooling capacities.

Referring to FIG. 14S, analysis tab 141902 allows for the initiation of the system analysis and shows the results of the analysis. Area 141904 shows analysis information related to the number of rules that are passed or not passed. The analysis information includes an identification of the number of analytics (rules) that were analyzed, the number of analytics that did not pass, the percentage of analytics that did not pass, a system score, and a letter grade based on the system score. Letter grades are based on the system score as follows:

| Letter Grade | System Score |
| --- | --- |
| A | 90-100 |
| B | 80-89 |
| C | 70-79 |
| D | 60-69 |
| F | <60 |

Box 141906 allows for the selection of a rule that was not passed. If the rule identified in box 141906 is associated with a terminal, then box 141908 identifies the associated terminal. Box 141910 displays the message associated with the rule identified in box 141906. Button 141912 is selected to start the analysis based on all of the information captured about the system. Selection of button 141914 generates a report that identifies all of the rules that were not passed along with messages associated with those rules.

Figure 14T:
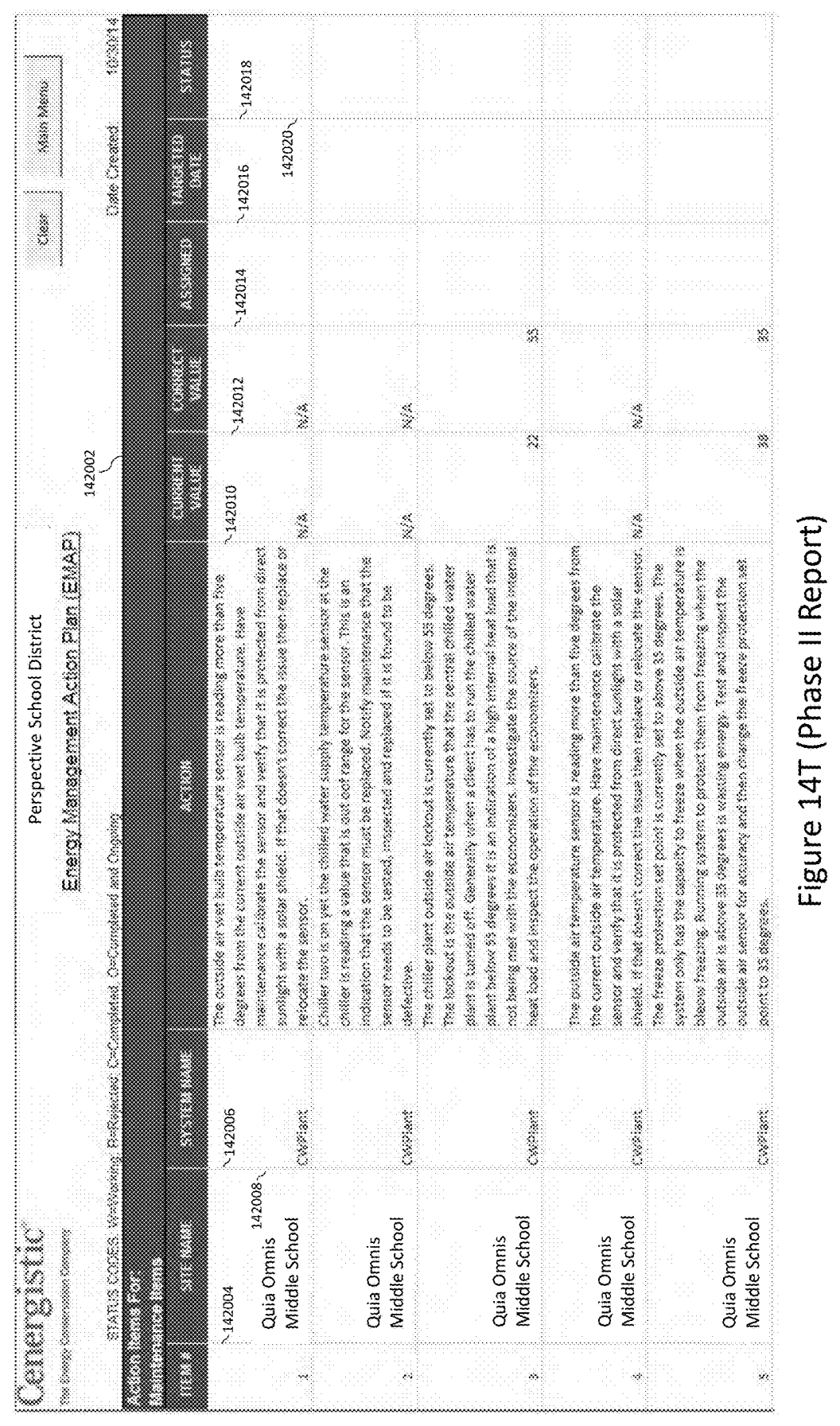

Referring to FIG. 14T, is an example of a phase II report generated after the analysis.

Table 142002 includes a record of the report. Each row of table 142002 is associated with a rule that the system did not pass. Column 142004 identifies an item number for each rule. Column 142006 provides the site name of the system that was analyzed. Column 142008 identifies the name and type of system. Column 142010 provides the message associated with the rule that was not passed. Column 142012 provides a current value, if any, that was tested by the rule. Column 142014 provides a correct value for the rule associated with the action item. Column 142016 identifies an assignment for who should resolve the issue identified by the rule. Column 142018 provides a targeted date for when the action item should be completed. Column 142020 provides the status of the action item or rule, which can be one of "W" for working, "R" for rejected, "C" for completed, and "O" for completed and ongoing.

Referring to FIG. 15, method 1500 will be described. Method 1500 is the steps involved in analyzing a model according to a phase III analysis. The phase III analysis is used to optimize thermostat and other set points and control data back to the machines and components of HVAC system 104.

At step 1502, the analysis system 102 derives updated settings and set points to one or more settings and set points. In one embodiment, the updated settings and set points are derived from a phase II model analysis. In this embodiment, each of the rules that did not "pass" is selected. Recommended settings and set points are selected from the information text fields as the updated settings. In this way, a feedback loop is established between the HVAC system 104 and the analysis system 102. Each time the phase II model is analyzed, the settings and set points can be varied in the text fields. As the settings and set points are varied the "pass" ratio is increased thereby increasing the overall efficiency of the HVAC system 104.

At step 1504, the all points log is changed to include updates to the settings and set points.

At step 1506, the rules selected for the phase II analysis are applied again to the data with the suggested updates.

At step 1508, the analysis system 102 counts the number of times the rules are applied, the number of times the rules are passed, and the number of times the rules are failed.

At step 1510, the total number of times the rules are applied are compared to the total number of times that the rules were passed to generate the pass ratio for the system in the phase III analysis.

At step 1512, a report is generated. The report preferably shows efficiency improvement over time.

At step 1514, commands are generated to update the building automation control system settings. In one embodiment, a server of the HVAC system 104 exposes an application program interface (API). The commands generated by the analysis system 102 are in accordance with the API of each subsystem. In an alternate embodiment, the commands are coded to the requirements of each particular subsystem.

At step 1516, the commands are uploaded the HVAC server 114.

At step 1518, the commands are implanted by the HVAC server 114. In this step, the commands are downloaded through the reviews to each subsystem.

At step 1520, the instructions are executed by each subsystem.

Referring to FIGS. 16A through 16U, table 1600 includes a set of analog and digital rules of a preferred embodiment. FIGS. 16A through 16U form a single table, laid out as shown below, that includes both analog and digital rules. FIGS. 16A through 16G form a top third portion of table 1600, FIGS. 16H through 16N form a middle third portion, and FIGS. 16O through 16U form a bottom third portion of table 1600.

| FIG. 16A | FIG. 16B | FIG. 16C | FIG. 16D | FIG. 16E | FIG. 16F | FIG. 16G |
|---|---|---|---|---|---|---|
| FIG. 16H | FIG. 16I | FIG. 16J | FIG. 16K | FIG. 16L | FIG. 16M | FIG. 16N |
| FIG. 16O | FIG. 16P | FIG. 16Q | FIG. 16R | FIG. 16S | FIG. 16T | FIG. 16U |

The table of FIGS. 16A through 16U includes columns A through AP, rows 1 through 21, values for ten analog rules in rows 2 through 11, and values for ten digital rules in rows 12 through 21. Each row of table 1600 represents a record in a database for a rule. Data in table 1600 is set and displayed using the user interface of FIGS. 14P and 14Q for analog and digital rules, respectively. The ID column stores a unique identifier for each rule.

Referring to columns A through Q shown in FIGS. 16A-16B, 16H-16I, and 16O-16P, the RuleName column (column B in FIGS. 16A, 16H, and 16O) identifies the name of the rule and is stored as a string. Values in the RuleName column are set using box 141604 for analog rules and box 141704 for digital rules. The RuleType column (column C in FIGS. 16A, 16H, and 16O) identifies if a rule is an analog rule or digital rule. The RuleSystemType column (column D in FIGS. 16A, 16H, and 16O) indicates the type of system the rule is associated with, which in one embodiment is one of an air handling unit, a chiller unit, a boiler unit, a lighting unit, and an energy metering unit. The RuleEnable column (column E in FIGS. 16A, 16H, and 16O) identifies if the rule is enabled for the current simulation and is set with box 141606 for an analog rule and box 141706 for a digital rule. The columns RuleJan through RuleDec (columns F-Q in FIGS. 16A-16B, 16H-16I, and 16O-16P) indicate the months for which the rule is enabled. The values in columns RuleJan through RuleDec are set using boxes 141608 for an analog rule and boxes 141708 for a digital rule.

In columns R through T of FIGS. 16C, 16J, and 16Q, the RuleEnableVar, RuleEnableType, and RuleEnableValue columns identify the variable and the required value for the variable in order for the rule to be processed. RuleEnableVar is set with box 141610 for an analog rule and box 141710 for a digital rule. The check boxes to the right of box 141610 on FIG. 14P and box 141710 on FIG. 14Q control the binary values of RuleENableType and RuleENableValue.

Referring to columns U through AE in FIGS. 16C-16E, 16J-16L, and 16Q-16S, the RulePrimaryVar, RulePrimaryType, and RulePrimaryValue columns (columns U-W in FIGS. 16C, 16J, and 16Q) identify the name, type and value of the primary variable for the rule. The name, type, and value identified in the RuleSecondVar, RuleSecondType, and RuleSecondValue columns (columns X-Z in FIGS. 16D, 16K, and 16R) are linked to the second variable. The third variable is defined with the name, type, and value in the RuleThirdVar, RuleThirdType, and RuleThirdValue columns (columns AA-AC in FIGS. 16D, 16K, and 16R). Operators one and two are defined with the values in the RuleOperatorOne and RuleOperatorTwo columns (columns AD-AE in FIGS. 16E, 16L, and 16S). The values for the variable and operator columns are linked to and set with boxes 141612 of FIG. 14P for analog rules and with boxes 141712 of FIG. 14Q for digital rules.

The RuleMessageEnable column (column AF in FIGS. 16E, 16L, and 16S) is used to identify whether a message will be displayed if the rule does not pass. The RuleMessage column (column AG in FIGS. 16F, 16M, and 16T) contains the message that is displayed when the rule does not pass and RuleMessageEnable is set to true. Values in the RuleMessage column are set with boxes 141614 and 141714 of FIGS. 14P and 14Q. The RuleMessageType column (column AH in FIGS. 16G, 16N, and 16U) identifies the type of message, which help to identify the type of service needed to address an issue that arises when a rule does not pass. Message types include Engineering and Maintenance.

Referring to FIGS. 16G, 16N, and 16U, a weight for the priority of the rule is stored in the RuleWeight column (column AI). The Detail column (column AJ in FIGS. 16G, 16N, and 16U) stores a binary variable that identifies if additional detail is required for the rule. The ProposedValue column (column AK) is used to store a suggested value related to the rule. For example, if the rule tests whether a setpoint of the system is too low, the value in the ProposedValue column identifies a recommended value for that setpoint. The UserCreated and DateCreated columns (columns AL and AM) identify the name of the user that created the rule along with the date the rule was created. The UserModified and DateModified columns (columns AN and AO) are used to store values that identify the last user that modified the rule and the date of the last modification. The Push column (column AP) stores a binary value that indicates whether the output of the rule should be pushed out by the system when the rule does not pass.

While this invention has been described in reference to a preferred embodiment along with other illustrative embodiments, this description is not intended to be construed in a limiting sense. Various modifications and combinations of the illustrative embodiments, as well as other embodiments of the invention, will be apparent to persons skilled in the art upon reference to the description. The invention is not limited to the embodiments disclosed herein and could be implemented, for example, as a software program suitable for any of: a spreadsheet, a web application, a stand-alone computer application, a programmable calculator application or a smart phone application. It is therefore intended that the appended claims encompass any such modifications or embodiments.

The invention claimed is:

1. A method executed on a server in communication with a HVAC system and with a client device, the method comprising:
    receiving data from an HVAC system;
    receiving a selection of a subsystem to be analyzed;
    receiving a selection of an analog rule to be analyzed;
    receiving a selection of a digital rule to be analyzed, the digital rule including a logical equation which compares results from an application of the analog rule to identify behavior of the subsystem that can be changed to improve efficiency;
    generating a test result based on the data, the subsystem, and the analog rule;
    generating a report based on the test result; and,
    generating a command to update a set of building automation and control system settings based on the data, the subsystem, the analog rule, and the digital rule comprising:
        optimizing a set point of the subsystem; and,
        sending the optimized set point to a controller of the subsystem.

2. The method of claim 1, further comprising:
    receiving a selection of one or more keywords associated with the digital rule; and,
    generating filtered data by filtering the data with the one or more keywords.

3. The method of claim 2, further comprising:
    applying the digital rule to the filtered data to generate the test result; and,
    generating a first bar chart from the test result that includes a histogram.

4. The method of claim 3, further comprising:
    retrieving a historical test result; and,
    generating a second bar chart from the test result and the historical test result.

5. The method of claim 1, further comprising:
    receiving a selection of a client associated with cloud server client data;
    moving the cloud server client data from a cloud server to a local server;
    identifying the HVAC system with the cloud server client data;
    receiving a selection of one or more keywords associated with the data from the HVAC system; and,
    receiving a selection of a site of the client that is associated with the HVAC system.

6. The method of claim 5, further comprising:
    mapping a point address data string of the data to the site using the one or more keywords; and,
    mapping the point address data string to the HVAC system.

7. The method of claim 6, further comprising:
    receiving a selection of a primary variable of the digital rule;
    receiving a selection of a second variable of the digital rule;
    receiving a selection of a third variable of the digital rule;
    receiving a selection of a first operator of the digital rule; and,
    receiving a selection of a second operator of the digital rule.

8. The method of claim 7, further comprising:
    receiving a message that is displayed when the test result indicates that the digital rule has not been passed.

9. The method of claim 8, further comprising:
    combining the second variable with the third variable using the second operator to form an intermediate result; and,
    combining the first variable with the intermediate result using the first operator to form the test result.

10. The method of claim 9, further comprising:
    incorporating the message into a table that is incorporated into the report when the test result indicates that the digital rule was not passed.

11. The method of claim 1, wherein optimizing the set point of the subsystem further comprises mathematically weighting a set of logical conclusions to derive an efficiency instruction.

12. The method of claim 11, further comprising exposing an application program interface of the subsystem after the step of generating the report and before the step of generating a command.

13. The method of claim 12, wherein the set point of the subsystem is a thermostat set point.

14. A system comprising:
a server in communication with a HVAC system and with a client device;
the server comprising a processor and a memory;
the memory comprising instructions that when executed by the processor cause the server to:
receive data from an HVAC system;
receive a selection of a subsystem to be analyzed;
receive a selection of an analog rule to be analyzed;
receive a selection of a digital rule to be analyzed, the digital rule including a logical equation which compares results from an application of the analog rule to identify behavior of the subsystem that can be changed to improve efficiency;
generate a test result based on the data, the subsystem, and the analog rule;
generate a report based on the test result; and,
generate a command to update building automation and control system settings based on the data, the subsystem, the analog rule, and the digital rule comprising:
optimize a set point of the subsystem; and,
send the optimized set point to a controller of the subsystem.

15. The system of claim 14, wherein the instructions further cause the server to:
receive a selection of one or more keywords associated with the digital rule; and,
filtering the data with the one or more keywords.

16. The system of claim 15, wherein the instructions further cause the server to:
apply the digital rule to the filtered data to generate the test result; and,
generating in the report a first bar chart from the test result that includes a histogram.

17. The system of claim 16, wherein the instructions further cause the server to:
retrieve a historical test result; and,
including in the report a second bar chart from the test result and the historical test result.

18. The system of claim 14, wherein the instructions further cause the server to:
receive a selection of a client associated with cloud server client data;
move the cloud server client data from a cloud server to a local server;
identify the HVAC system with the cloud server client data; and,
receive a selection of one or more keywords associated with the cloud server client data.

19. The system of claim 18, wherein the instructions further cause the server to:
map a point address data string of the cloud server client data to the site using the one or more keywords; and,
map the point address data string to the HVAC system.

20. The system of claim 19, wherein the instructions further cause the server to:
receive a selection of a primary variable of the digital rule;
receive a selection of a second variable of the digital rule;
receive a selection of a third variable of the digital rule;
receive a selection of a first operator of the digital rule; and,
receive a selection of a second operator of the digital rule.

21. The system of claim 20, wherein the instructions further cause the server to:
receive a message that is displayed when the test result indicates that the digital rule has not been passed.

22. The system of claim 21, wherein the instructions further cause the server to:
combine the second variable with the third variable using the second operator to form an intermediate result; and,
combine the first variable with the intermediate result using the first operator to form the test result.

23. The system of claim 22, wherein the instructions further cause the server to:
incorporate the message into a table that is incorporated into the report when the test result indicates that the digital rule was not passed.

24. The system of claim 14, wherein optimizing the set point of the subsystem further comprises mathematically weighting a set of logical conclusions to derive an efficiency instruction.

25. The system of claim 24, wherein the instructions further cause the server to:
expose an application program interface of the subsystem after the step of generating the report and before the step of generating a command.

26. The system of claim 25, wherein the set point of the subsystem is a thermostat set point.

* * * * *